US008868535B1

(12) United States Patent
Paiz

(10) Patent No.: US 8,868,535 B1
(45) Date of Patent: *Oct. 21, 2014

(54) SEARCH ENGINE OPTIMIZER

(76) Inventor: Richard Paiz, North Miami Beach, FL (US)

(*) Notice: Subject to any disclaimer, the term of this patent is extended or adjusted under 35 U.S.C. 154(b) by 178 days.

This patent is subject to a terminal disclaimer.

(21) Appl. No.: 13/247,964

(22) Filed: Sep. 28, 2011

Related U.S. Application Data

(63) Continuation-in-part of application No. 12/785,122, filed on May 21, 2010, now Pat. No. 8,386,456, which is a continuation-in-part of application No. 12/778,228, filed on May 12, 2010, now Pat. No. 8,239,229, which is a continuation-in-part of application No. 11/584,941, filed on Oct. 23, 2006, now Pat. No. 7,809,659, which is a continuation-in-part of application No. 10/852,394, filed on May 24, 2004, now abandoned, which is a continuation-in-part of application No. 10/603,963, filed on Jun. 25, 2003, now Pat. No. 6,842,511, which is a continuation-in-part of application No. 09/544,238, filed on Apr. 7, 2000, now Pat. No. 6,614,893, said application No. 12/785,122 is a continuation-in-part of application No. 10/926,446, filed on Aug. 25, 2004, now Pat. No. 7,050,813, and a continuation-in-part of application No. 12/146,420, filed on Jun. 25, 2008, now Pat. No. 7,908,263, and a continuation-in-part of application No. 11/584,271, filed on Oct. 20, 2006, now abandoned, which is a continuation-in-part of application No. 10/852,394, filed on May 24, 2004, now abandoned, which is a continuation-in-part of application No. 10/603,963, filed on Jun. 25, 2003, now Pat. No. 6,842,511, which is a continuation-in-part of application No. 09/544,238, filed on Apr. 7, 2000, now Pat. No. 6,614,893, said application No. 12/778,228 is a continuation-in-part of application No. 10/926,267, filed on Aug. 25, 2004, now abandoned, which is a continuation-in-part of application No. 09/514,940, filed on Feb. 28, 2000, now Pat. No. 7,058,601, said application No. 12/778,228 is a continuation-in-part of application No. 12/764,934, filed on Apr. 21, 2010, now Pat. No. 8,676,667, which is a continuation-in-part of application No. 11/223,226, filed on Sep. 9, 2005, now abandoned, and a continuation-in-part of application No. 11/085,678, filed on Mar. 21, 2005, now abandoned, which is a continuation-in-part of application No. 09/819,174, filed on Mar. 27, 2001, now abandoned, said application No. 12/778,228 is a continuation-in-part of application No. 12/764,934, filed on Apr. 21, 2010, now Pat. No. 8,676,667, said application No. 12/764,934 is a continuation-in-part of application No. 11/223,226, filed on Sep. 9, 2005, now abandoned, which is a continuation-in-part of application No. 10/135,493, filed on Apr. 30, 2002, now abandoned.

(60) Provisional application No. 60/184,537, filed on Feb. 24, 2000, provisional application No. 60/193,160, filed on Mar. 28, 2000, provisional application No. 60/289,033, filed on May 4, 2001.

(51) Int. Cl.
G06F 17/30 (2006.01)
G06F 7/00 (2006.01)

(52) U.S. Cl.
CPC .................. G06F 17/30864 (2013.01)
USPC .......................... 707/706; 707/741

(58) Field of Classification Search
USPC .............. 707/711, 741, 736, 706, 705
See application file for complete search history.

(56) References Cited

U.S. PATENT DOCUMENTS 5,706,497 A * 1/1998 Takahashi et al. ............. 395/605
2002/0042793 A1 * 4/2002 Choi ................................ 707/6

Primary Examiner — Marc Somers
(74) Attorney, Agent, or Firm — Allen D. Hertz, P.A.; Allen D. Hertz

(57) ABSTRACT

A method of executing a word search on a computer with a software program mimicking the human brain by adding knowledge, understanding and wisdom to simulate deductive reasoning to create a language based equation and a geospatial based equation includes the steps of assigning a unique value from lowest to highest to lowest; organizing and distributing the Internet environment into quality partitions from lowest to highest establishing a glyph database; processing the impact of a managerial hierarchical related group of index relationships to create an equation that shrinks the search environment; organizing and distributing the Internet using human brain tendencies; and modifying each the request by: identifying for each static and dynamic request the best suited search pattern within the search pattern database and automatically sending the preprocessed results to the end of a user's browser as output.

32 Claims, 50 Drawing Sheets

SEARCH ENGINE OPTIMIZER

CROSS REFERENCE TO RELATED APPLICATIONS

This Continuation-In-Part Utility application claims the benefit of co-pending U.S. Non-Provisional patent application Ser. No. 12/785,122, filed on May 21, 2010 which claims the benefit of the following applications:
a. U.S. Non-Provisional patent application Ser. No. 12/146,420, (now issued as U.S. Pat. No. 7,908,263), filed on Jun. 25, 2008;
b. co-pending U.S. Non-Provisional patent application Ser. No. 12/778,228, filed on May 12, 2010, which claims priority to co-pending U.S. Non-Provisional patent application Ser. No. 12/764,934, filed on Apr. 21, 2010, which claims priority to U.S. Non-Provisional patent application Ser. No. 11/584,941, (now issued as U.S. Pat. No. 7,809,659), filed on Oct. 23, 2006, which claims priority to U.S. Non-Provisional patent application Ser. No. 10/852,394 (abandoned), filed on May 24, 2004, which claims priority to U.S. Provisional Application Ser. No. 60/184,537 filed on Feb. 24, 2000;
c. co-pending U.S. Non-Provisional patent application Ser. No. 10/926,267, filed on Aug. 25, 2004, which claims priority to U.S. Non-Provisional patent application Ser. No. 09/514,940 (now issued as U.S. Pat. No. 7,058,601) filed on Feb. 28, 2000, which also claims priority to U.S. Provisional Application Ser. No. 60/193,160 filed on Mar. 28, 2000;
d. co-pending U.S. Non-Provisional patent application Ser. No. 11/223,226, filed on Sep. 9, 2005, which claims priority to U.S. Non-Provisional patent application Ser. No. 10/135,493 (abandoned), filed on Apr. 30, 2002, which claims priority to U.S. Provisional Application Ser. No. 60/289,033 filed on May 4, 2001;
e. co-pending U.S. Non-Provisional patent application Ser. No. 11/584,271 filed on Oct. 20, 2006, which claims priority to U.S. Non-Provisional patent application Ser. No. 10/926,446 (now issued as U.S. Pat. No. 7,050,813), filed on Aug. 25, 2004, which claims priority to U.S. Non-Provisional patent application Ser. No. 10/603,963 (now issued as U.S. Pat. No. 6,842,511), filed on Jun. 25, 2003, which claims priority to U.S. Non-Provisional patent application Ser. No. 09/544,238 (now issued as U.S. Pat. No. 6,614,893), filed on Apr. 7, 2000, which claims priority to U.S. Provisional Application Ser. No. 60/184,537 filed on Feb. 24, 2000; and
f. co-pending U.S. Non-Provisional patent application Ser. No. 11/085,678 filed on Mar. 21, 2005, which claims priority to U.S. Non-Provisional patent application Ser. No. 09/819,174 (abandoned), filed on Mar. 27, 2001, which claims priority to U.S. Provisional Application Ser. No. 60/193,160 filed on Mar. 28, 2000;
g. all of which are incorporated herein in their entireties.

BACKGROUND OF THE INVENTION

1. Field of the Invention

The present invention relates generally to an Internet Search Engine Optimizer method and system, hereinafter referred as Optimizer. More particularly, the present invention relates to an interface product that works independently and in parallel with a browser client and search engine supercomputer server architecture that gathers, analyzes and distills input information interactively. The Optimizer analyses the end user's input and converts it into a search pattern. For each valid search pattern the Optimizer continuously maintains and updates a pre calculated and pre processed array or collection of best fit web page responses.

Search Engines are based on Boolean algebra eigenvector algorithms that are used to parse and filter information indices until the top page ranks are determined and displayed to the end user. Unfortunately, some specific keywords combinations may be too narrow and confound a search by hiding optimal results. Search Engines are predominately configured to perform one request to one reply search patterns. Each search is processed from the ground up without taking into account many requests belonging to one reply. A session consists of consecutive related and unrelated search requests to reach the final destination.

The Optimizer simultaneously keeps in existence for each search pattern its corresponding virtual simulation environment that contains all relevant bound web pages. Each virtual simulated environment possesses a relative Master Index. The Optimizer continuously purifies and Synchronizes the plurality of relative Master Index that permits to match/merge and then correlate the Internet's Master Index in real time.

The Optimizer continuously scans and detects the environment in real time for new content with significant difference quality to update each search pattern's virtual environment partition relative Master Index and associated collections of top (n) pages. The Optimizer heuristically reads the content of each web page by page, paragraph, sentence, and grouping of words. Existing Master Index has an absolute rank value for each web page.

The Optimizer rank value is dynamically adjusted by matching independent variables and related keywords belonging to the search pattern to generate a content value. The Optimizer "cherry picks" the best content value web pages as output. The output is forward chained back to the end user's terminal and displayed.

The Optimizer is a method and system for simulating Internet browser search capacities that cleans, standardizes, organizes, and transforms the massive amount of data into a lingua franca comprising of valid keywords, keyword patterns for a given language, and unique geospatial patterns contained in the Internet collectively known as patterns that exist in web page. The comprehensive collection of search patterns with their relative Master Index are stored and continuously updated as web crawlers detect changes in the environment.

Each Search Pattern consists of at least one independent variable, e.g. (I), (J), (K), (X), (Y) and (Z). Search Patterns with 0 independent variables use Boolean algebra techniques that find the final destination within the massive (U) or Internet environment.

2. Related Art (U.S. Patent Application Ser. No. 10/926,446)

Partial Differential Equation Vectors Model: Telecom Super Switch teaches the tradition Vector is inefficient. For example: two persons live in Miami, one calls Guatemala and the other calls Argentina at the same time. The call to Guatemala travels 2,000 km and the call to Argentina travels 6,000 km, both speak for 1 hr. The person calling Argentina spends $1, whereas the person calling Guatemala spends $9. Distance has nothing to do with cost, thus distance is just one independent variable to solve this equation. The equation requires a plurality of independent variables. Thus we must use Partial Differential Equation Vectors instead traditional vector.

Applying Set Theory to break the call into circuits that in the telecommunications jargon are referred as Legs. A call has at least two unique and distinct Legs: Leg A, origin, and Leg B, destination. Using Set Theory, the environment U can be divided into three independent networks: Fixed (X), IP Telephony (Y) and Wireless (Z).

A Simple Call exists when the call uses a single network (X, Y or Z). A Hybrid Call exists when the call uses two independent networks such as (X, Y), (X, Z) or (Y, Z). A Complex Call exists when the call must roam outside of the environment, Leg X for the origin, and Leg Y for the destination. When Leg A belongs to competitor wireless network, the usage fee surcharge of the network while roaming can be described as Leg V, thus when Leg B is under the same constraints the system uses Leg W.

E.g. A call uses three different networks Fixed, IP Telephony and Wireless (I, J, K), each independent variable solves the billing entity and resultant vector for the call. The Switch controlling the call uses its Partial A and Partial B functions to create a final resultant vector that includes all the circuits belonging (I, J, K) for just one call. Yes, they are three independent calls one per network which is billable, yet in fact there is only one call.

3. Related Art: (U.S. Patent Application Ser. No. 10/852,394)

Computer Network System: consists of a plurality of nodes, where each one is programmed with Artificial Intelligence to perform predefined ad hoc tasks that are logistical rationalized based on the current conditions of the environment. The computer network system is synonymous with Superset(U). The cluster is divided into three geospatial tiers: a) Global, b) Regional, and c) Local. Each tier has the following functions:
  a. Provisioning.
  b. Total Quality Management or (TQM).
  c. Data Manipulation.
  d. Management Information Systems (or MIS).
  e. Expert Information Systems (or EIS).
  f. Inventory Control.

System Nodes: All work collectively and independently from each other, and simultaneously in parallel analyze, evaluate, gather and process information from the environment in real time. From incipiency upon receiving the fuzzy logic piece of information that triggers a new task or update pending activities. Each node is assigned to Superset(I), Set (J), or Subset(I, J, K) cluster tier, and to the geospatial domains (X) or global, (Y) or regional, and (Z) local to create sub clusters Elements (I, J, K, X, Y, Z) that help to build the managerial hierarchy as follows:

Managerial Hierarchy: The Summit Tier coordinates Business Intelligence and Invoicing databases via the Internet that allows users to have access to their information in real time. The Middleware Tier manages UCommerce warehouses based on geographical area. The Lower Tier controls a plurality of points of presence belonging to $3^{rd}$ party suppliers, wholesalers and retailers, and collectively constitutes the workhorse of the system.

Node Synchronization and Buffer Resources: Every predefined cycle each node synchronizes the latest inventory and optimizes via artificial intelligence programming its organizational management logistics. Nodes can request siblings for any excess buffer resources to complete a task using vertical and lateral synergy. Parent nodes can use their chain of command to coordinate their subordinates to complete a task. Members of different regional clusters can synergistically collaborate to process tasks. Each node is able to replace and perform the organizational task of at least one node and collectively the computer network system engulfs a global supplier.

Eliminates the Spaghetti Phenomena: nodes interaction with the environment gathers, distills, analyzes and then standardizes and converts the raw information into primed lingua franca data that is quantified, qualified, organized and transformed, so that Information Certainty is achieved and thus removes the chaos and anarchy or Spaghetti Phenomena.

Primes Vector CDR: Lingua franca messages are primed as a Vector CDR and contain the vector trajectory and all pertinent transactional segments information. Prior art sends all the transactional segments to a centralized billing data warehouse that match/merges and correlate the information into a final billing entity. Whereas the computer network assigns a hierarchical owner and plots circuit by circuit the vector trajectory and activates all relevant nodes to the transaction so that nodes can communicate amongst themselves via forward and reward chaining. Nodes send all dynamic and fixed costs to hierarchical owner so it can match/merge and correlate the rated billing entity absent of a centralized billing data warehouse.

Interact with the Human Resources: The human resources of the organization proactively can use business intelligence software to send parameters to the computer network system and directly control their own network, and then send command instructions with the latest conditions of the environment so the computer network system can optimally analyze, coordinate, prioritize and synchronize throughput.

Multiple Tiers of Nodes: Middleware and Summit tier nodes perform data warehouse functions, and monitor and control their chains of command and virtually simulate the organization. Lower tier nodes remove redundancy, geographically distribute activities, and update information.

Avoids Taxing the Throughput: The computer network system monitors the limited resources and capacities of the network to avoid taxing available throughput in real time. Each node can create, plot and update purchase orders as soon as new relevant messages from the environment are detected.

Uses Synergy to Maximize Throughput: Upon receiving environment command instructions each node can manage and organize the flow of information of their subordinates from predefined point A to point B routes to avoid clogs and saturation. Each node via synergy attempts to maximize throughput, and assign, prioritize and shares with other nodes that have substantial buffer resources, since unused resources are considered waste, which is one of the confounding variables directly related in creating the Spaghetti Phenomena.

Analyzes Network Traffic: Network traffic is analyzed by tier as the informational traffic is measured based on the latest command instructions and known routing throughput limitations of each given domain. The summit nodes of each tier performs the non obvious task of removing complexity in order to be a real time system by eliminating data redundancy, filtering, quantifying, qualifying data as good or garbage, and minimizing waste before beginning to transmit the data through the managerial hierarchy system.

Informational Certainty: Nodes are programmed to remove the Spaghetti Phenomena at incipiency one transaction at a time to reach Informational Certainty at the organizational level to be considered a real time invention.

Stabilizes the Flow of Information: Summit and Middleware nodes stabilize the flow of information concerning financial conditions, inventories, shipping costs and tariffs required for billing, and update the XLDB database with trending statistics used to optimize throughput. Each node is autonomous, and through means of the managerial hierarchical synergy works in parallel with others nodes to work as a single unit. Each node processes network information and then simulate, plot, map, tract and vector each message to create a virtual instance of the organizational environment.

Real Time System: Once the 'Spaghetti Phenomena' is eliminated, informational certainty is achieved and thus a state of balance, harmony and proportion exists and the distributed configuration removes the need for a central mainframe. Hence, a real time solution consists of synergistically synchronizing all the computer network system functions.

Evaluates Network Resources: Each node has its own location identification and is assigned to a local, regional or global geospatial domain. Each activity and purchase order is processed in parallel, starting from the point of origin and ending at the point of destination. The computer network system rearward chains the routing vector information through the simulation network to the point of origin and analyzes and evaluates the best usage of network resources as follows:

a. Administer, coordinate, control, manage, synchronize and transform the network.

b. Use Business Intelligence to predict when a customer becomes dissatisfied.

c. Manages the flow of money in real time.

d. Send summarized information packets to their organizational subordinates.

e. Assign cost to each activity and limiting each resource.

f. Uses synergy to load balances the demand on the organization's resources.

g. Work always at maximal assigned throughput and is redundant to compensate for network faults.

h. Work in parallel with the simulated Legacy System.

i. Parent nodes create command messages with resource allocation instructions.

j. Creates partial vectors that measure one independent environment.

l. Match/merge all partial vectors to create the final billing entity or purchase order.

4. Related Art (U.S. patent application Ser. No. 11/584, 941/Issued U.S. Pat. No. 7,809,659)

XCommerce (2000): based on UCommerce to simulate the entire superset of valid keyword regular expression requests and converts the results set into a vector based statistical data that optimizes accuracy. XCommerce (2000) is the deductive reasoning server side supercomputer that simulates, standardizes and transforms the Internet into a plurality of concurrently working environment using a Managerial hierarchical method of indexing and searching as follows:

Managerial Hierarchical Relationship Indexing: a request is broken down into keywords and clusters, and then converted into a search pattern that optimally minimizes the quantity of valid web pages with regards to a given search.

Determining what is Relevant and Irrelevant: Keyword and Cluster: serve as the basis of each Managerial Hierarchical Relationship Index to analyze and distill what is relevant and irrelevant. Irrelevant web pages are discarded completely from analysis.

Partition the Environment into Blocks: the environment is subdivided into a plurality of blocks that are arranged based on Managerial Hierarchical levels as follows:

Each Search Pattern restricts the geometric rate of growth of the Internet environment by creating the relevant environment that is used by all the managerial relationship levels when purifying the search process.

The Internet environment is distilled by applying the three Managerial Hierarchical levels (1001) primary independent variable creates the (720) Simple Pyramid or Block that maps an improved environment, and (1002) secondary independent variable creates the (730) Hybrid Pyramid or Sub Block that maps an optimal environment, and (1003) tertiary independent variable creates the (740) Complex Pyramid or Mini Block that maps an optimal solution.

Identifies Static Search Patterns: the computer network system determines if the search pattern already exist and if yes obtains the top (n) pages from the databases and sends the output to the end user.

Calculates Dynamic Search Patterns: uses relationship indices to create optimal size partitions and compares remaining keywords and clusters to determine if they match against the content of the top (n) pages. When a match occur each web page value is dynamically adjusted by each keyword or cluster relative vector value and picks the top (n) pages.

Finds New Search Patterns: stores into the database each new search patterns and associated top (n) pages.

Displays Top (n) pages: Sends and displays the top (n) pages to the end user's terminal.

5. Related Art (U.S. Patent Application Ser. No. 12/146, 420/Issued U.S. Pat. No. 7,908,263)

A search engine optimizer (hereinafter referred as Cholti), which works independently with a browser and search engine supercomputer to gather, analyze and distill input information interactively. The optimizer reorganizes the request as optimal input that is sent to the search engine, and then the output is sent to the end user. Each request is converted into a pattern and stored in an advanced Glyph format, permitting the optimizer to identify any left (linguistics) or right (geospatial) side of the brain checkmate combinations required to achieve certitude.

6. Related Art (U.S. Patent Application Ser. No. 12/764, 934)

Lottery Mathematics: Cholti (1000) and XCommerce (2000) show how to improve accuracy of a requests by using primary independent variables (1001, 1002, 1003) (I, J or K) to map and create managerial hierarchical partitions of the Internet environment such as from top to bottom Superset(I), Set (I, J) and Subset (I, J, K) datasets.

Hot and Cold analysis: uses lottery mathematics to estimate the size of the environment and assigns (1001) primary independent variable (I) as the filter with the following formula: $(x!-(x-6)!)/6!$ E.g. the number of permutations for a 10 number draw is $(10!-4!)/6!$ $4!=24$, $6!=720$ and $10!=3,628,800$. $(3,628,800/24)/720=210$ permutations. Thus each grid has $1/210$ in being the one that appears in the draw. The English language estimated Master Index size of the environment in the year 2010 is Lottery_165_Basis or 25,564,880, 880 web pages.

E.g. the number of permutations for a 165 number draw=$165!-(165-6)!/6!$ or 25,564,880,880.

The quality of the Glyph that represents (I) or primary index determines the Mass. E.g. lithe keyword Civil=(I) the Mass=1, and if cluster "American Civil War"=(I) the Mass=2.

TABLE 1

Size of environment based on Mass a. Mass = 0 (Lottery_165_Basis = 25,564,880,880) or 165! − (165 − 6)!/6!
b. Mass = 1 (Lottery_100_Basis = 1,192,052,400) or 100! − (100 − 6)!/6!
c. Mass = 2 (Lottery_70_Basis = 131,115,985) or 70! − (70 − 6)!/6!
d. Mass = 3 (Lottery_50_Basis = 15,890,700) or 50! − (50 − 6)!/6!
e. Mass = 4 (Lottery_40_Basis = 3,838,380) or 40! − (40 − 6)!/6!
f. Mass = 5 (Lottery_30_Basis = 593,775) or 30! − (30 − 6)!/6!
g. Mass = 6 (Lottery_20_Basis = 38,760) or 20! − (20 − 6)!/6!
h. Mass = 7 (Lottery_15_Basis = 5,005) or 10! − (10 − 6)!/6!

Simulates the Human Brain: Each linguistic Glyph is assigned to the [L] left side of the brain and each geospatial Glyph is assigned to the [R] right side of the brain and the Anchor is the best common denominator Glyph.

The Dominant Tendency of each request is given a [L] linguistic, and [R] geospatial tendency. and then Cholti reorganizes, maps and plots the Glyphs to create a Managerial Hierarchical Relationship Index.

Human Brain Intelligence: transforms each Search Pattern and identifies independent variables based on mass partitions of the Internet in order to create Join, Simple, Hybrid, Complex and Optimal Pyramids.

Human Brain Wisdom: analyzes the top (n) pages and source references using deductive reasoning to expand each [AX], [BX] and [CX] Glyph equation with key featured association dependent variables Q(x, y, z) filters.

Cholti (1000) picks one of four Search Strategies: [LL], [LR], [RL], and [RR], which have different set of business rules to analyze the Internet and limits the maximal size of any partition not to exceed 1 billion or (2^30) web pages and thus eliminates the exponential rate of growth of the environment, which is the principal confounding variable.

E.g. the environment can grow geometrically to 40 billion or 100 billion or 1 trillion web pages, but once the Dominant Tendency picks the relevant environment that maps 1 billion web pages, the lion share is irrelevant.

[L+R] Managerial Relationship Events: lithe independent variable (I) is represented by the Historical Event "American Civil War" {1863}, where "American Civil War" is the left side of the brain variable (I) and 1863 is the right side of the brain (X), and are merged to a Single Event or Superset(I!) with Mass=3; the Double Event or Set(I,J)!! with Mass=5, and finally for Triple Event or Subset (I, J, K)!!! with Mass=7 consisting of [L] left side of the brain (I, J, K) and [R] right side of the brain (X, Y, Z) independent variables.

First Significant Event or (FSE): is a vague search that maps an improved environment. The Internet environment (a, b, c, d, e, f) becomes the improved environment (FSE, b, c, d, e, f) for Superset(I) dataset.

TABLE 2

FSE Size of environment based on Mass a. Mass = 1 (Lottery_100_Lucky_1 or 75,287,520) or 100! − (100 − 5)!/5!
b. Mass = 2 (Lottery_70_Lucky_1 or 12,103,014) or 70! − (70 − 5)!/5!
c. Mass = 3 (Lottery_50_Lucky_1 or 2,118,760) or 50! − (50 − 5)!/5!

Second Significant Event or (SSE) is a concise search that maps an optimal environment. The Internet environment (a, b, c, d, e, f) becomes the optimal environment (FSE, SSE, c, d, e, f) for Set(I, J) dataset.

TABLE 3

SSE Size of environment based on Mass a. Mass = 1 (Lottery_100_Lucky_2 or 3,921,225) or 100! − (100 − 4)!/4!
b. Mass = 2 (Lottery_70_Lucky_2 or 916,895) or 70! − (70 − 4)!/4!
c. Mass = 3 (Lottery_50_Lucky_2 or 230,300) or 50! − (50 − 4)!/4!
d. Mass = 4 (Lottery_40_Lucky_2 or 91,390) or 40! − (40 − 4)!/4!
e. Mass = 5 (Lottery_30_Lucky_2 or 27,405) or 30! − (30 − 4)!/4!

Third Significant Event or (TSE) is a precise search that maps an optimal solution. The Internet environment (a, b, c, d, e, f) becomes the optimal solution (FSE, SSE, TSE, d, e, f) for Subset(I, J, K) dataset.

TABLE 4

TSE Size of environment based on Mass a. Mass = 1 (Lottery_100_Lucky_3 or 161,700) or 100! − (100 − 3)!/3!
b. Mass = 2 (Lottery_70_Lucky_3 or 54,740) or 70! − (70 − 3)!/3!
c. Mass = 3 (Lottery_50_Lucky_3 or 19,600) or 50! − (50 − 3)!/3!
d. Mass = 4 (Lottery_40_Lucky_3 or 9,880) or 40! − (40 − 3)!/3!
e. Mass = 5 (Lottery_30_Lucky_3 or 4,060) or 30! − (30 − 3)!/3!
f. Mass = 6 (Lottery_20_Lucky_3 or 1,140) or 20! − (20 − 3)!/3!
g. Mass = 7 (Lottery_15_Lucky_3 or 445) or 10! − (10 − 3)!/3!

Fourth Significant Event or (QSE) is an optimal search that maps the optimal answer. The Internet environment (a, b, c, d, e, f) becomes optimal answer (FSE, SSE, TSE, QSE, e, f) and is a [LR] checkmate combination!

TABLE 5

QSE Size of environment based on Mass a. Mass = 1 (Lottery_100_Lucky_4 or 4,950) or 100! − (100 − 2)!/2!
b. Mass = 2 (Lottery_70_Lucky_4 or 2,415) or 70! − (70 − 2)!/2!
c. Mass = 3 (Lottery_50_Lucky_4 or 1,225) or 50! − (50 − 2)!/2!
d. Mass = 4 (Lottery_40_Lucky_4 or 780) or 40! − (40 − 2)!/2!
e. Mass = 5 (Lottery_30_Lucky_4 or 435) or 30! − (30 − 2)1/2!
f. Mass = 6 (Lottery_20_Lucky_4 or 190) or 20! − (20 − 2)!/2!
g. Mass = 7 (Lottery_15_Lucky_4 or 45) or 10! − (10 − 2)!/2!

Gamma Functions: Cholti (1000) and XCommerce (2000) teach how to create search patterns that improve the accuracy of a request using gamma functions to help create optimal size partitions of the (500) Internet.

E.g. the end user types 1863 American Civil War, which the end user automatically maps the [L] left side of the brain English language cluster "American Civil War" with [R] right side of the brain geospatial keyword to create "American Civil War". The "War between the States" is also synonymous with the American Civil War, and thus "between the" which are dependent variables since the keywords have a Mass less than 1 are used to the Dominant Tendency and the keyword "States" which has a Mass of 1+ is Likely. Lets assume, the keywords {1861, 1862, 1864 and 1865) are Unlikely. The Likely and Unlikely Gamma function values are as follows: "American Civil War" {1863}=50!−(50!−5!)/5! or 2,118,760 pages. Plus "States" Likely Analysis: =49.9!−(49.9−5)!/5! or 2,096,762 pages. Plus Unlikely Analysis: =49.86!−(49.86−5)!/5! or 2,088,014 pages.

Search Pattern Variables: the Lucky Numbers are the (1001, 1002, 1003, 1004) independent variables or control variables that create the Pyramid objects that map the size of the environment. The Likely and Unlikely Numbers are the observable variables or dependent variables, and are considered strong filters and the Regular Numbers are the measured variables or dependent variables, and are consider weak filters that are use to create the actual content score.

TABLE 6

Adjustment of the Lottery Basis

| | | | |
|---|---|---|---|
| a. | Independent/Control Variables | (Lucky Numbers) | +1.00 |
| b. | Dependent/Observable Variables | (Likely Numbers) | +0.100 |
| c. | Dependent/Complement Variables | (Regular Numbers) | +0.010 |
| d. | Dependent/~Observable Variables | (Unlikely Numbers) | +0.001 |

Partial Differential Equations: When using Partial Differential Equations usually the solution is not unique due to the fluid and dynamic conditions of the search process, and ergo the End User's keyword combination usage behavior directly affects the size of the environment (or boundary of the region) where the solution is defined.

The limitations, drawbacks and/or disadvantages of technologies are as follows: Search Engines are based on Boolean algebra eigenvector algorithms that are used to parse and filter information indices until the top page ranks are determined and displayed to the end user. Unfortunately, some specific keywords combinations may be too narrow and confound a search by hiding optimal results. Search Engines are predominately configured to perform one request to one reply search patterns. Each search is processed from the ground up without taking into account many requests belonging to one reply. A session consists of consecutive related and unrelated search requests to reach the final destination.

The Internet environment or (U) can be construed as a complex and massive volume network with billions. The Search engine supercomputer analyzes the billions of unique web pages, and then uses eigenvectors to determine the highest ranked pages from the end user's match criteria. As explained, in related subject matters "As the size of the environment increases the level of redundancy and tax burden of a system exponentially increases".

Transform Data: The supercomputer system cleans, standardizes and organizes the spaghetti of the environment by gathering, analyzing, distilling, managing, organizing and distributing the huge amount of information in a massive parallel distributed managerial hierarchical structured supercomputer that removes redundancy, latency and the organizational tax burden.

Synchronize tasks: Cholti (1000) and XCommerce (2000) are decentralized parallel clustered supercomputers consisting of a plurality of nodes, which are specifically arranged in three tiers. The summit tier coordinates and executes global tasks. The middle tier coordinates and executes regional tasks. The lower tier coordinates and executes localized tasks and processes the lion share of non critical transactions. The summit node of each tier synchronizes tasks by sending command messages that assigns the fuzzy logic state of each node belonging to its chain of command.

Lateral and Vertical Synergy: A tier consisting of groups of nodes that are independent from other groups of nodes. Each tier partition performs mission critical tasks within their domain and works in parallel with other partitions of the same tier. Each node can shunt available resources using lateral and vertical synergy with parent, sibling or subordinate nodes to maximize available resources and continuously analyzes its own environment current conditions and forward chains summary information until reaching the summit. Then summit nodes rearward chain command messages with instructions to regulate priorities, resources availability, and notify each subordinate with coordinated and synchronized tasks constraints taking into account present network conditions to avoid saturation, clog and eliminate the tax burden of the environment'.

Remove chaos and anarchy: the XCommerce (2000) creates Vector CDR to eliminate the 'spaghetti of the environment' and then build command messages or Summary Information data. Command messages coordinate and synchronize each node to operate at maximal throughput capacity hence each node operates without adversely affecting the network flow of data and limits the exponential rate of growth of complexity as the size of the environment increases.

Convert Requests into Ideas: Search Engines dependency on Boolean algebra use inductive reasoning popularity scores to find the top results. In contrast, the Optimizer (1000) uses deductive reasoning interprets keyword combinations as being part of an idea being formulated by both the left and the right sides of the brain and probabilistically supplies and inserts missing gaps of information. Related art teaches that a Vector CDR can be expressed as the summation of a plurality of valid vectors. Then matches/merges a plurality of partial vectors and then correlates them to create a resultant vector containing a collection of top (n) pages possessing informational certitude.

In a nutshell, the Boolean algebra mimics inductive reasoning Watson like criminal investigation methods for finding the best results, whereas the Optimizer (1000) solves for the optimal answer using Sherlock Holmes deductive reasoning approach to decipher the actual content of each web page to find the best match.

SUMMARY OF THE INVENTION

The present invention accomplishes the above-stated objectives, as well as others, as may be determined by a fair reading and interpretation of the entire specification.

Organizing the Environment: the XCommerce (2000) is the server side of the architecture that standardizes primes, distributes and organizes the Internet environment (500), whereas the Optimizer (1000) is the client side that behaves in the same manner as traditional Boolean algebra browser that is able to identify, validate and verify interactively each end user request. Then it categorizes keywords, clusters and geospatial keywords and assigns them to left or right side of the brain. The left side of the brain consists of the hierarchical three tiers that analyze, and statistically shrinks the environment. The right side of the brain is the secondary method of shrinking the environment by assisting the left side by purifying the managerial hierarchical data set with geospatial information. The Optimizer (1000) does the following:

Selects valid keywords: from a vague search or Boolean algebra request and convert them into concise search referred as Superset(I) dataset. Keywords and clusters become Glyph and must be exhausted from the request bitmap that stores each keyword with 1 and 0, where 1 denotes valid and unused, while 0 invalid or used. The Optimizer selects from the remaining Glyphs to creates a precise search referred as Set(I, J) dataset and is subordinate to Superset(I). The Glyphs used to create Set (I, J) are exhausted from the request bitmap. For each Superset(I) a plurality of Set(I, J) may exist. The Optimizer picks from the remaining Glyphs to creates an optimal search referred as Subset(I, J, K) dataset of the request and is subordinate to a superior Set(I, J). The keywords used to create Subset(I, J, K) are exhausted from the request bitmap. For each Set(I, J) a plurality of Subset(I, J, K) may exist. Based on the request bitmap unused keywords become essential in the process of deciphering with certitude the optimal result page.

Limiting the size of the environment: the Optimizer (1000) uses the master list of keywords for a specific language to be able to associate them to related groups. Keywords can be English language words, mixed or commercial names, scientific words, important people, geographical places such as cities or zip codes, IP Addresses and phone numbers. Then using organizational management techniques the environment is partitioned into three managerial hierarchical tiers from top to bottom global, regional and local. Furthermore, each search is limited by the relevant environment that maps 1 billion web pages eliminating from calculation the remainder of web pages. The relevant environment limitation permit the following trend to occur: "as the size of the environment is reduced proportionally the informal certainty improves". Hence smaller environments eliminate the geometric rate of growth of complexity associated with Internet. Complexity is the core catalyst of why the environment is confounded and resembles spaghetti. Superset(I), Set(I, J) and Subset(I, J, K) managerial hierarchical datasets partition the Internet. The Optimizer (1000) uses vector parameters to create smaller environments using dynamic values instead of static values, and also creates single object Super Sites data mine the entire content of the IP Address. Each object is assigned to a unique Quality plane to further help the optimizer to assign a search value limit. Super Sites will have a value or weight associated with each unique significant difference requests in a session.

Deductive Reasoning: The Optimizer (1000) assigns Hot & Cold Algorithm parameters to reduce the size of the environment. Hot Algorithm measures the end user's usage pattern for each keyword, whereas Cold Algorithm analyzes the usage patterns and the fluctuating Boolean algebra keyword strength to determine its irrelevancy factor.

Glyph objects: All keywords and clusters are transformed into Glyphs objects. Each Glyph has Q(x, y, parameters that are used to filter web pages based the relative keyword quality within the actual content. Once the Hot/Cold algorithm derives the Q(x, y, z) values, Cholti has all the necessary information to solve for the optimal solution.

Independent variables: (1001, 1002, 1003) or (I, J, K) are used to create the managerial hierarchical dataset Superset(I), Set(I, J) and Subset(I, J, K). When a page has a value of it 1 it is denotes that it is being measured using Boolean algebra means. Super Pages are objects that store for each request the relative value for a given web page during a session. A session comprises a plurality of consecutive related requests and for each request does as follows:

$1^{st}$: [AX] uses a Basic Glyph vague search to map an improved environment with 1,000,000 web pages.

$2^{nd}$: [BX] uses an Advanced Glyph concise search to map an optimal environment with 10,000 web pages.

$3^{rd}$: [CX] uses an Improved Glyph optimal search to map an optimal solution with 100 web pages.

$4^{th}$: "Cherry Picking" process analyzes the optimal solution by performing exact match comparison of the dynamic Glyph values. The [DX] samples are the top ten percent of the [CX] sample. The top Super Pages that have the highest values based on the dynamic Glyph values conditions are parsed and measured by paragraph to determine the final value. The highest valued Super Page is the optimal answer.

Session driven requests: The Optimizer (1000) must take into account a plurality of requests within a session. Those requests that can be associated with a valid Glyph Superset(I), Set(I, J) or Subset(I, J, K) are considered related. Those that are not directly associated to the last end user's request are considered unrelated. Related requests that are not directly linked to the last request are considered inactive, whereas unrelated requests are mulligan and are omitted. Glyphs that are considered to be too strong are deemphasized from the Boolean algebra process and are known as 'Zero Clusters' and are removed from the environmental filtering process. Omitted Glyphs via mulligan are also converted during the process of weighting each Super Pages. A Super Page for each request has a deductive reasoning W_Rank that ranges from 0.001 no good to 10 awesome and an inductive reasoning popularity score.

Super Sites: are used to identify missing gaps of information, and logically inserts them into Super Pages and finds key featured association used in the environmental filtering process. The Super Page is an improvement over the traditional page rank, since it contains a plurality of values obtained from each valid request used to reach the final destination, and not just a single request. As a dynamic object the system can insert missing gaps of information, and then rank each page within its own limited IP Address or Super Site environment.

Inductive reasoning: uses popularity scores and performs static requests.

Deductive reasoning: uses the dynamic actual content scores of may related requests as follows:

Size of the Environment: restricts the Internet environment (500) with 32 billions or ($2^{35}$) pages between the relevant environment with 1 billion or ($2^{30}$) pages and optimal solution 100 or ($2^7$) pages. The Internet environment (500) is subdivided using quality Q(x, y) values of each site from 0 to 10 and (y) is a subordinated to (x) and ranges from 1 to 100 and (z) represents the commercial value from 0 (none) to 10 (optimal).

Filters out redundancy: each Page and each Site belonging to each partition is given a Quality value Q(x), and a W_Rank from 0.001 to 10 based on their page rank as follows: 0=0.001, 1=0.01, 2=0.10, 3=0.25, 4=0.50, 5=1, 6=2, 7=4, 8=6, 9=8, and 10=10. The Optimizer (1000) may use other mathematical filters to shrink the environment as follows:

$1^{st}$: Identifies each Keyword to be valid or invalid and assigns vector magnitude. Verifies each keyword to belong to the left or right side of the brain, where English (E), and Mixed (M) comprise the [L] (left side) and geospatial information comprises the [R] (right side). The Mayan lingua franca Cholti is based on the use of Glyphs from combining [L] (left side) and [R] (right side) information to express a thought, thus the artificial intelligence also mimics the same.

$2^{nd}$: Creates key featured association collection of related Glyphs.

$3^{th}$: Validates independent variables Glyphs belonging to a request or session.

$4^{th}$: Plots and maps Glyphs into Basic Glyphs equation vague searches.

1. [AX] 'Before' Vague Searches:

Cholti (1000) groups keywords to belong to (E), (M), (G), & (Z) categories, identifies 'Zero Clusters' or very strong keywords and eliminate them from any calculation and picks an anchor Glyph that creates the (720) Simple Pyramid that maps improved environment with 1,000,000 web pages Q(x, y, z) values.

Cholti for each vague search creates a bitmap and assigns each Glyph. Example: "American Civil War Battlefield" is converted to (G1+E1+E2+E3). Where American=G1, Civil=E1, War=E2 and Battlefield=E3. Cholti creates a bitmap that looks as this 1111. 1 denotes that a keyword is valid and 0 invalid or already used.

Superset(I) contains the dataset of the (1001) primary independent variable that converts a vague search into a concise search and maps an improved environment with 1,000,000 W_Rank. The anchor Glyph or the best filtering word is Battlefield or E3. Civil War or (E1+E2) and "American Civil War" or (G1+E1+E2) are valid clusters. In this case, "American Civil War" is the top valid cluster Glyph that is greater than 1,000,000 or ($2^{20}$) W_Rank. Thus, Cholti (1000) assigns to Superset(I) the cluster "American Civil War" or (G1+E1+E2) and then updates the bitmap to 0001.

Set(I, J) contains the dataset of the (1002) secondary independent variable that converts a concise search into a precise search and maps an optimal environment with 10,000 W_Rank. The remaining best Glyph is E3 or "Battlefield". Cholti (1000) assigns for Set(I, J) the top valid Glyph filter, Battlefield or E3 is the top Glyph that is >=10,000 or ($2^{15}$) W_Rank within Superset(I) consisting of "American Civil War" or (G1+E1+E2). and then updates the bitmap to 00001.

Example: End user's request is "American Civil War Confederate Battlefield". Cholti (1000) converts it into (G1+E1+E2+E3+E9) and has a bitmap of 111111. "American Civil War" or (G1+E1+E2) is Superset(I), and Confederate or E3 is Set(I, J) and updates the bitmap to 00001.

Subset(I, J, K) contains the dataset of the (1003) tertiary independent variable that converts a precise search into an optimal search and maps an optimal solution with 100 or W_Rank. The remaining best Glyph is "Battlefield" or E4 Cholti (1000) assigns for Subset(I, J, K) the top valid Glyph that is greater than 100 or (2^7) W_Rank, in this case, Battlefield=E4 is the top keyword within Superset(I) consisting of "American Civil War" or (G1+E1+E2) that binds Set(I, J) Confederate or E3 and then updates the bitmap to 00000.

Example: End user's request is "American Civil War Confederate Battlefield Gettysburg". Cholti converts it into (G1+E1+E2+E3+E4+G2) with a bitmap of 111111. Superset(I) consists of the cluster "American Civil War" or (G1+E1+E2), Set(I, J) consists of the keyword Confederate or E3, and Subset(I, J, K) consists of the keyword Battlefield or E4 and updates the bitmap to 000001.

2. Mimicking the Human Brain:

[L] left side of the brain Glyphs exists if independent variables (I, J, K) are greater than 0. [R] Right side of the brain Glyphs consists of geospatial keywords that are expressed as geographic (w, x, y, z) vectors. Each letter refers to the following dependent variable: w=country, x=state, y=city or county and z=zip code. Geospatial data (w, x, y, z) belongs to the [R] right side and is the counterpart of the [L] left side Glyphs that modify the W_Rank value of each page.

Example: End user's request is "Wachovia Bank". That in turn is converted into (G1+E1) and has a corresponding bitmap of 11. (G1+E1) is Set(I, J). Superset(I) and Subset(I, J, K) are empty sets.

Cholti (1000) during the Y[3] or the third point of the triangulation attempts to find the optimal result.

3. [AX] Basic Glyph Equation

[AX] or 'Before' is a Basic Glyph equation that uses inductive reasoning Boolean algebra popularity scores to creates a default hierarchical set with specific limits as fellows:

$1^{st}$: Superset(I) vague search size is between 1,000,000 and 1 billion or (2^20 and 2^30) W_Rank. Where Superset(I)>Set (I, J)>Subset(I, J, K). The overall Superset(I) has the upper limit of the highest valued Superset(I) and the lowest valued lower limit in a session.

$2^{nd}$: Set(I, J) concise search size is between 10,000 and 1 million or (2^4 and 2^20) W_Rank.

$3^{rd}$: Subset(I, J, K) precise search size is between 100 and 10,000 or (2^7 and 2^14) W_Rank.

Each Superset(I) dataset of a session is greater or equal to all the valid Set(I, J) dataset subordinate domains. Each Set(I, J) of a session is greater or equal than all the valid Subset (I, J, K) dataset subordinates domains.

A session may a have up to 20 significant [AX] vague searches. Each request has at least one [AX] vague search, one [BX] concise search, and one [CX] precise search. Superset(I) may have a many Set (I, J) for a given request. Set(J, J) may have many Subset(I, J, K) for a given request. Each valid request has at least one Superset(I) or one valid geospatial Glyph. Each Superset (I) has many subordinate Set (I, J). Each Set (I, J) has a many Subset(I, J, K).

$4^{th}$: Cholti (1000) uses Q(x, y, z) filter values of each member of the managerial hierarchical set.

$5^{th}$: When a request is not part of the 'CORE List' the following procedures occur: 1) each active HQ node rearward chains to the HQ owner the request the top 1, 5, 10, 50, 100, 500: and 1024 Q(x, y, z) values via Summary Data. 2) Then HQ owner of the request match/merges the Summary Data Q(x, y, z) information of its subordinates and determines the Q(x, y, z) value that yield the top 1023 values 3) Then HQ owner of the request forward chains to each participating HQ nodes the 'Cherry picking' Q(x, y, z) values. 4) Participating HQ node rearward chain the information to the HQ owner. 5) The HQ owner creates a localized Z_Price Bitmap. 6) The HQ owner rearward chains the localized Z_Price Bitmap. 7) The AI Spider Parsers analyzes the content of the bitmaps and then determines if the information is of significant difference based on traffic usage patterns to be included in the 'CORE List'.

Alternatively to the Fifth step the system identifies the closest common denominator Basic Glyph equation using the known Q(x, y, z) filters and adjusts the value for a slightly broader search and then performs all the steps in G). The difference is that many top values of HQ nodes may be null, drastically reducing the match/merge process. HQ nodes always send top 1, 5 and 10 results or send a null bitmap response.

4. [AX] Vague Search:

$1^{st}$: Reorganizes each Basic Glyph equation and $2^{nd}$ convert them into Advanced Glyph equation. Clusters are converted into cluster Glyphs or C(x). 3rd creates a bitmap the size of the valid independent variables, based on vague search. For example "American Civil War Battlefield" is converted to (C1+E3). Where "American Civil War"=C1 or (G1+E1+E2) and Battlefield=E3 and the bitmap looks as 1111. 1 denotes that a keyword is valid and 0 used.

(1001) Primary independent variable creates (720) Simple Pyramid that maps the improved environment with 1,000,000 or (2^20) W_Rank that contains Superset(I) hierarchical set. The anchor Glyph is Battlefield or E3. Cholti (1000) determines that Glyph "Civil War"=C1 or (E1+E2) and "American Civil War"=C2 or (G1+E1+E2) are valid, and always assigns for Superset(I) the top valid Glyph and then updates the bitmap to 0001. In this case "American Civil War" is the top Glyph>=improved environment with the top 1,000,000 web pages.

(1002) Secondary independent variable creates (730) Hybrid Pyramid that maps an optimal environment with 10,000 or (2^14) W_Rank. The anchor Glyph is E3 or "Battlefield". Cholti (1000) always assigns for Set(I, J) the top valid Glyph and updates the bitmap to 0000. In this case, Battlefield=E3 is the Glyph within Superset(I) consisting of "American Civil War" or (G1+E1+E2) that is >=optimal environment with the top 10,000 web pages.

Example: End user's request is "American Civil War Confederate Battlefield". Cholti converts it into (G1+E1+E2+E3+E4) with a corresponding bitmap of 111111. C1=("G1+E1+E2") or "American Civil War" is Superset(I), E3 or "Confederate" is Set(I, J) and updates the bitmap to 00001.

(1003) Tertiary independent variable creates (740) Complex Pyramid that maps optimal solution with 100 or (2^7) W_Rank. The anchor Glyph is Battlefield or E4. Cholti (1000) always assigns for Subset(I, J, K) the top valid Glyph and updates the bitmap to 00000. Battlefield or E4 is the top Glyph within Superset(I) "American Civil War" or (G1+E1+E2) and within Set(I, J) Confederate or E3 that is >=optimal solution with the top 100 web pages.

Example: End user's request is "American Civil War Confederate Battlefield Gettysburg". Cholti (1000) converts it into (G1+E1+E2+E3+E4+G2) and a bitmap of 111111. "American Civil War"=C1 or ("G1+E1+E2") is Superset(I), Confederate=E3 is Set(I, J), and Battlefield=E4 is Subset(I, J, K) and updates and modifies the bitmap to 000001. The geospatial keyword Gettysburg or G2 helps valorize each valid page.

5. [BX] Concise Search:

Preprocessing is done by AI Spider Parsers that update the content of the Internet environment. [BX] 'After' transforms the vague search into a concise search and uses (1002) secondary independent variable (J) to map an optimal environment with 10,000 or 2^14) pages that is contained in Set(I, J) hierarchical set.

Cholti (1000) matches/merges and correlates Basic Glyph equation and transform it into an Advanced Glyph equation employing rules of association and relevancy, and the Hot/Cold Algorithm to assign the value for each missing keyword required to make a valid cluster.

Geospatial data (w, x, y, z) has the follow range of values: 'Before' from (0.0001 to 1), 'After' from (0.001 to 15), 'Improved' from (0.01 to 255), Sites or IP Addresses from (0.1 to 4095), and telephone numbers from (1 to 65535).

Glyphs have a Social Security numbers or finger print that is used to parse the data. Social Security numbers help filter large amounts of data. Fingerprints are evenly distributed amongst keyword and Super Sites, based on supply side criteria such as demand and media value.

Super Glyphs Q(x, y, z) filters generate a mathematical equation that is able to optimally shrink the environment, and determines the relevant weight of all visible Super Sites and Pages.

Both Super Sites and Super Pages are objects that may a plurality of relative values in a given session. All Super Pages are subordinates to their parent Super Site and may be subordinate to another Super Page.

Finally Glyphs are converted into a dynamic Super Glyph equation to derive the [CX] precise search and [DX] optimal search. Once HQ owner 'Cherry picks' the [DX] optimal search it rearward chains the output to the end user.

6. CX Precise Search:

[CX] transforms the concise search into a precise search using (1003) tertiary independent variable (K) to map an optimal solution with 100 or (2^17) pages that is contained in the Subset(I, J, K) hierarchical set.

Cholti (1000) correlates the Advanced Glyph, equation and converts it into an Improved Glyph equation using rules of association and relevancy to find missing keywords required to make a valid cluster.

Hot & Cold Algorithm (dynamically calculated): Cholti (1000) measures Superset(I), Set(I, J), Subset(I, J, K) and geospatial data (w, x, y, z) managerial hierarchy using hot values that reflects the probability or influence an end user's wants for a given keyword. Cholti uses these probabilities when creating logical distribution of resources. All Sessions are owned by the summit tier (HQ6 and HQ5) that convert glyphs into mathematical Super Glyphs. All Supersets are owned by the middleware tier (HQ4 and HQ3). All Sets are owned by the lower tier (HQ2 and HQ1). All Subsets are owned by HQ0 nodes. Cholti identifies 'CORE List' keywords, clusters and Glyphs. MPS or summit nodes create all Z_Price Bitmaps.

Each request has a vague search Basic Glyph equation and a concise search Advanced Glyph equation equivalent. After each request Cholti updates the hot or relative vector value and the cold or relative influence value for each Glyph. Glyph frequency and usage patterns can temporarily convert them into a Zero Cluster or vice versa. By arranging create vague and concise searches Cholti is able to request for optimal Z_Price Bitmaps that has enough information to bypass resource intensive precise and optimal searches calculations since they already have the Q(x, y, z) filtering parameters that yields the top 1,024 net page results W_Rank.

Hot Algorithm parameters are assigned a higher value the closer the keyword belongs to the last request or is part of significant requests in a session. The Hot Value probabilities helps change the filtering parameters, so that Superset(I), Set(I, J) and Subset(I, J, K) create exact size environments. Once the optimal Super Glyph equation is available the summit node creates the Z_Price Bitmap with the top 1024 W_Rank Cold Algorithm parameters are assigned a lower value when high magnitude Glyphs belongs to non-significant requests in a session. The Cold Value probabilities helps change the Q(x, y, z) filtering parameters for Superset(I), Set(I, J) and Subset(I, J, K) and during the process to decipher the final destination.

Using vague and concise searches top (n) samples the Super Site (a, b, c, d, e) filters are created.

The $1^{st}$ valid request is always of significant difference and thereafter the mass of the vague session must increases the (integer) mass value by 1. E.g. the mass changes from 2 to 3.

Search patterns are continuously updated as the system adds new items to its 'CORE List'. Once Cholti (1000) identifies a predefined Basic and/or Advanced Glyph it will immediately have optimal environment results for sessions with exactly one request. The Z_Price Bitmap has the preprocessed the precise and optimal searches Glyph equation.

'CORE List' is stored in a Data Warehouse that contains all the valid Glyphs. Items are stored into the 'CORE List' each time a newly derived valid Glyph is dynamically encountered with a Z_Price Bitmap with 1,024 results that consists of the Aim Circle of Accuracy. 'CORE List' has predefined all the geographic (w, x, y, z) and corporate data. Parent nodes forward chain the updated information to their chain of command.

Summit tier nodes assign values to each Superset(I) based on the Cold Algorithm probabilistic value of each Glyph and unused keywords and 'cherry picks' the top 1, 5, 10, 50, 100, 500, and 1000 responses for each Superset(I) derived from the Summary Data created by lower tier nodes.

The middleware tier nodes assign values to each Set(I, J) based on the Cold Algorithm probabilistic value of each Glyph and unused keywords. Middleware tier nodes 'cherry picks' the top 1, 5, 10, 50, 100, 500, and 1000 responses for each Set(I, J) derived from the Summary Data created by lower tier nodes.

The lower tier nodes assign values to each Subset(I, J, K) based on the Hot Algorithm probabilistic value of each Glyph and remainder list of unused keywords. Lower tier nodes 'cherry picks' the top 1, 5, 10, 50 and 100 results from Subset (I, J, K) derived the Summary Data created from HQ0 nodes.

HQ0 or nodes parse information based on a given Glyph search pattern to derive a small size environment, and then uses Super Glyphs collections to weight results using Hot & Cold Algorithms probabilistic values, and each keyword specific vector dimensions to identify the TOP 1, 5, 10, 50 and 100 results. By default, the TOP 10 results are sent to superiors as Summary Data information.

Glyphs main purpose is to optimally shrink the size of the environment. When a Glyph is an exact match to an end user's response the system bypasses all search process, and displays Z_Price Bitmap information that is optimal and up to date, absent of making any calculation since Cholti has the answer with certitude.

7. [DX] Optimal Search

Cholti (1000) dynamically calculates if each request is of Significant Difference by doing the following:

Predefined exact Glyphs are automatically responded as optimal with the Z_Price Bitmap (or [DX]) responses contained in the 'CORE List' that are stored in the Business Intelligence Data Warehouse, since the response information is certain. The Z_Price Bitmap also has the Q(x, y, z) with top 1,024 W_Rank for Super Pages, and has the Q(x, y, z) with top 1,024 W_Rank for Super Site information.

When a valid Glyph is absent Cholti can decipher the missing gaps of information and then pick the optimal Z_Price Bitmap (or [DX]) responses contained in the 'CORE List' since the response information is reasonably known. The optimal environment is derived using Hot and Cold Algorithm parameters and hierarchical sets. Q(x, y, z) derived from [CX] 'Improved' Glyph equation permit to go straight to the 'Cherry Picking' process.

Cholti (1000) determines for each request if an appropriate Basic and Advanced Glyph exists. Then based on the unused independent variables relative vector magnitude decides whether or not to instantiate a search. If a search is not required, the end user's response is based on Z_Price Bitmap. Otherwise, a new managerial hierarchal set is created.

When a session has exactly one significant difference request that is not part of the 'CORE List' the system arranges, organizes and creates an 'Improved' hierarchical set. Cholti weights each page result W_Rank by using the Hot & Cold Algorithm parameters and weight Super Glyphs valorize optimal results.

The Hot & Cold Algorithm parameters generate Super Glyphs by using the optimal Q(x, y, z) filter to mimic mathematically a given environment. Super Glyph objects consist of an array of probabilities and weights that recreates the optimal environment with a size of 1,024 W_Rank result pages for each request in a given session.

If a significant change in the Internet is detected Cholti (1000) must create a new managerial hierarchical dataset. Otherwise requests from XCommerce (2000) an optimal Z_Price Bitmap that is used to correlate a plurality of common denominator related requests and converts them into a resultant that is considered a single request.

When Super Glyphs exists for a plurality of valid related requests the resultant Superset(I), Set(I, J) and Subset(I, J, K) creates the Z_Price Bitmap that contains the entire hierarchical set with reasonable and probable Super Glyphs vector dimensions. A reasonable vector dimension has a probability greater than 95% of occurrence, otherwise it is probable. If no Super Glyph has a probability greater than 95%, then the top one is considered reasonable. Cholti valorizes with a grain of salt using the garbage in garbage out paradigm when making decisions.

If multiple significant difference instances are detected during a session, then for each group a resultant Superset(I), Set(I, J) and Subset(I, J, K) is generated with the appropriate prorated Hot & Cold Algorithm parameters. Finally, the plurality of resultant Superset(I), Set(I, J) and Subset(I, J, K) are correlated to create a final hierarchical set. The results that are greater than a predefined threshold are measured otherwise they are excluded as being confounded. The final hierarchical set yields the top (n) optimal results. A dynamic Super Glyph can have values for a plurality of significant difference requests, and a static Glyph can not.

Example: Super Site XYZ has a value of 8 in the $1^{st}$ request, 7 in the $2^{nd}$ request and 10 in the $3^{rd}$ request. It is determined for the final request three pages are an exact match and two other pages are valid after inserting the missing gaps of information. Thus Super Site XYZ has a W_Rank value of 50 for the final request.

8. Super Glyph Mathematical Equations.

Using the Mayan lingua franca Cholti guidelines the system attempts to use grammar/language with geospatial components to describe an idea that is used to elucidate the final destination by doing the following:

Each end user begins interactively the process by typing requests using keywords and Cholti identifies, validates and verifies each keyword. Based on the typed end user's keyword combination Cholti creates both Basic and Advanced Glyphs and determines if a valid geographic (w, x, y, z) exists.

XCommerce (2000) upon receiving a request from Cholti (1000) compares it against the 'CORE List' to determine if an exact match Z_Price Bitmaps exists. Then mulligan unrelated keyword to the last request. XCommerce (2000) creates an 'Improved' hierarchical set derived from Z_Price Bitmaps for each significant request. Super Sites are assigned a probability and weight for each related group of requests or for a plurality of significant difference related group of requests. Direct relationships are extended from one request to another in a transitive manner, whereas unrelated requests are skipped via the mulligan process that disregards confounded Glyphs and are used to weight pages and sites when creating Super Site (a, b, c, d, e) filters.

9. Cholti Parallel Clustered Supercomputer

These are new enhancements made to Cholti Supercomputer that continuously gathers, distills, analyzes, primes and integrates in real time organizational data so that responses are synchronized with up to date information as follows Load Balancing Request: based on the informational certainty the system must identify, validate and verify the top responses associated to an end user's request. XCommerce (2000) evenly distributes the node configuration in four equal parts. Each part comprises of a minimum of 64 HQ0 nodes for a minimal total of 256 HQ0 nodes. The production Supercomputer configuration has eight times more HQ0 nodes for a grand total of 2048 HQ0 nodes, while the superior tiers or HQ6 to HQ1 remain unchanged. The four parts of the system are identified as [AX], [BX], [CX], and [DX] that are responsible for searching and responding optimal page results based on vector parameters. Mimicking the human brain each request is broken into keywords that are associated to belong to the [L] left or [R] right side group. When the [L] left side group keywords consisting of at least one independent variable will always have an Anchor made up of a keyword or cluster. The ability to identify keyword or cluster anchors in a hierarchical manner is paramount in creating valuable common denominator environments that are used as valid points of reference when performing comparative analysis multiple requests.

Example: The English language environment has 32 billion unique page ranks and then the system determines for a request that "American Civil War" is the primary anchor and filter. From the three words associated with "American Civil War" the most common or the keyword with the lowest magnitude is assigned as the Anchor. In this case "American Civil War" American is the most common keyword and therefore is the Anchor. The anchor "American" shrinks the environment below upper limit of tolerance of 1,073,741,824 net result pages or W_Rank which is the Relevant Circle of Accuracy of Join Pyramid. The environment is further reduced when applying the cluster "American Civil War" when determining Superset(I). In this case, "American Civil War" cluster is able to further shrink the size of the environment to 80,000,000 W_Rank. Superset(I) is divided into an organizational manner with smaller sized Set(I, J) that may contain a plurality of valid associated keywords and clusters (I, $A) (I, $B), and the organization distribution is further propagated if necessary into smaller sized Subset(I, J, K) that may contain additional associated keywords or clusters (I, $A, $X), (I, $A, $Y), (I, $B, $X) and (I, $B, $Y). $A, $B, $X or $Y consists of associated keywords or clusters. When a variable is null it has a probability of 0 or 0.00%. XCommerce (2000) always works with balanced hierarchical sets. The hierarchical set when creating Set(I, J) and Subset(I, J, K) subordinates takes into account known preprocessed Advanced Glyphs hierarchical sets.

In real time XCommerce (2000) cleans, organizes, standardizes and mirror image of the existing Internet environment and correlates the content of each paragraph, and page belonging to the same Site. The system primes each paragraph, and this is when confounding data is eliminated by supplying the missing gaps of information.

[AX] or 'Before' analysis: represents traditional Boolean algebra vague searches that are translated into Basic Glyphs. The requests are searched 'AS IS' using popularity eigenvector methods for valorization and the [AX] response is used as the point of reference for further optimizations made by [BX], [CX], and [DX].

[BX] 'After' analysis: represents the ability to reorganize requests and identify missing gaps of information that are converted and translated into a concise search Advanced Glyphs. Cholti (1000) identifies, validates and verifies the 'AS IS' query and rearranges each request. This method is the step that filters and weights requests dynamically and identifies, quantifies and qualifies confounded Boolean algebra over simplifications.

[CX] 'Improved' analysis: represents precise searches after mapping, plotting and merging both [AX] vague searches and [BX] concise searches into a resultant probabilistic [CX] hierarchical set. Cholti (1000) analyzes the [CX] hierarchical set. During this process Glyphs are measured using the Not & Cold Algorithm parameters to update the Super Site and associate objects and create a probabilistic distribution to yield the optimal result. Then identifies, validates and verifies the [AX BX] query and reorganizes and prioritizes Glyphs into [CX]. The [CX] Improved Glyph equation creates the optimal solution with 100 or (2^7) pages or W_Rank.

[DX] 'Optimal' analysis: or Z_Price Bitmaps represents the final process of deciphering and storing for future use the optimal result that were derived from [CX] hierarchical sets by weighting and valorizing each page against Super Glyphs filters that take into account Page Rank, Media Value, and transparency and/or content privacy. The [DX] Optimal Glyph equation finds the optimal answer or final destination.

Information certitude improves proportionally as the size of the environment is reduced. By default browser engine response sample is set to 10 and thus when information certitude is achieved the environment size is exactly 10 page results. The top page is always considered the optimal answer of final destination.

Organizing the Spaghetti: For each cluster, associate clusters and Glyphs the system assigns an HQ1-HQ5 owner that controls the parallel running Internet environments. Each HQ0 is assigned optimal searches. Each HQ1 is assigned precise searches. Each HQ2 is assigned all concise searches. Each HQ3 is assigned all vague searches. Each HQ4 is assigned all Search Strategies. Each HQ5 is assigned all the geospatial data of the environment.

A Site based on a given extension such as ".com" is assigned to exactly one of the parallel running planes. All the pages of a Site are matched/merged with separations. Each site is read for clusters and 'Zero Clusters'. Each site has a quality value or Q(x) that ranges from 0 to 10. Complex multinational corporate organizational hierarchies consist of a plurality of Super Sites that are linked together. Consequently, a Site is assigned a Corporate ID that contains all the valid ANI, address information, and organizational information.

A Site rank value is equal to the sum of its top (n) W_Rank subordinates. Each Site is assumed to have Top 32 pages, even if most are null. The basis of each Site is equal Top 32 valid pages in its hierarchy from the perspective of a partial environment. The W_Rank of each Page is equal to the Q(x) value.

Sites with Q(x)>1 and valid Corporate ID are Super Sites: Pages with Q(x)>1 and valid Corporate ID are Super Pages. Each keyword, cluster. Superset(I), Set(I, J), Subset(I, J, K) and Advanced Glyphs has a Q(x)>1.

Glyphs based Search: Each Site is associated to Advanced Glyphs. Summit HQ nodes are assigned Superset(I) searches, middleware HQ nodes are assigned Set(I, J) searches and lower tier HQ0 are assigned Subset(I, J, K) searches. The HQ owner of the search uses the [AX] vague search statistics to know the raw number of hits, top pages and sites and then forward chains the information to all pertinent nodes. Alternatively (faster!) the Boolean algebra results are kept in memory and the entire [AX] vague search is skipped unless a given combination does not exist in memory.

The owner of each Advanced Glyph keep tracts in memory the TOP (n) value using the Q(x) filter and forward chains the Q(x) value to the HQ(x) owner of a request. Reasonable results are kept in memory and probable in memory. Alternatively (faster!) the concise searches are kept in memory and the entire [BX] Advanced Glyph equation is skipped unless a combination does not exist in memory or in a file. All Super Sites and Super Pages are mapped to Glyphs when they belong to the estimated TOP 1,000,000 W_Rank of a given 'Z_Price Bitmap'. This additional dimension (w) is an extension to the Q(x, y, z) that can be used to further expedite searches.

The request HQ owner must determine the search parameter when filtering. The upper limit is always set to equal the highest Q(x) value. The lowest limit is calculated by estimating the size of the environment compared to the filter value multiplier. Q(x) total equals the summation of Q(x) from 10 to 2. If Q(x) total value<=lower limit then Q(x) total value=lower limit.

The system identifies the number of valid results based on the Q(x) values starting from 10 to 2. Initializing the Q(x) valid counter to zero, it begins to add Q(x) until the valid counter is greater than the upper limit and does not exceed it lower limit. Should it exceed the limit it must prorate using Q(x, y) values and if necessary using the Q(x, y, z) values.

10. Hot Algorithm or [CX] Optimizations

Boolean algebra assigns for each session the same value or 1 to each keyword. Cholti (1000) groups related requests and dynamically measures each keyword based on the end user's usage and frequency patterns with a Hot Algorithm value. This value is obtained after correlating [AX] 'Before' vague search and [BX] 'After' concise search to yield the resultant [CX] precise search set hierarchy. These dynamic values are an enhancement to the popularity metrics of the Boolean algebra, since by taking trending in account, keywords and cluster priorities may elucidate what is hot. Hot Glyphs measure the weight of Super Pages and Super Sites. Static Glyph shrinks the environment, and dynamic Super Glyph values decipher the best solution. Hot Algorithm values do not affect Zero Clusters for that the Cold Algorithm values are used.

Example: the vague search "American Civil War" has 80,000,000 results and represents Boolean algebra one to one relationship on how eigenvectors filter and valorize the environment even though the lion share are bad links and ultimately discarded. As a starting point it is good. For this reason Cholti uses this preprocessed vague search [AX] 'Before' and reorganizes the Glyphs into a concise search [BX] 'After'. XCommerce (2000) 'CORE List' stores vague and concise searches to avoid taxing the system with redundancy since Q (x, y, z) values exist.

The Hot Algorithm assigns to each keyword three components (x, y, r). (x) measures the trending multiplier based on the end user's pattern with regards using a keyword. (y) represents the relative strength of a keyword in belonging to the Advanced Glyph domain hierarchy such as Superset(I), Set(I, J) and Subset(I, J, K) and (z) determines the probability the Keyword is necessary to reach the optimal W_Rank.

11. Cold Algorithm or [DX] Optimizations:

Once the Hot Algorithm has successfully helped value each site and page during the 'Improved' [CX] sample, by measuring patterns of behaviors of the end user's requests within a session. The Cold Algorithm assigns to each keyword four components (w, x, y, z) values: (w) measures the probability the word is required for the search; (x) measures the likelihood the keyword or a 'Zero Cluster' validates a W_Rank; (y) quantifies geospatial dimensions based on geographic (w, x, y, z); (z) modifies Super Glyphs based on the corporate dimensions of a request; (y, z) serves as a geospatial and corporate information filters to reduce the size of the environment by assigning filter value from 0.01 to 1.00. Cholti never assigns a value of 0 since results are weighted down but never eliminated.

Example: Vague search "American Civil War" has 80,000,000 results, and then is reorganized to create the improved environment with 1,000,000 pages. Hot algorithm converts the vague search into a concise search. Cold Algorithm deciphers logically the essence of the matter from the entire hierarchical set to create the optimal environment with 10,000 pages. Cold algorithm converts the concise search into a precise search to create the optimal solution with 100 pages. Cherry Picking process converts the precise search to optimal search to create the optimal answer or destination.

Cholti language Super Glyphs: Each request may have 1+ components 1) Superset(I), 2) Set(I, J), 3) Subset(I, J, K) and 4) geospatial data (w, x, y, z). Super Glyphs are colored coded as follows: Blue=English language Glyph, Purple='Zero Cluster', Yellow=unused Advanced Glyph, Green=geospatial, Orange=Corporate, Black=advertisement value, and White=end user's supply side commercial value. Super Glyphs that becomes certain become Red regardless of type.

Super Glyph can be unloaded or loaded. A Super Glyph is loaded when the information is certain or >=0.95, else it is unloaded. Independent variable (I, J, K, X, Y, Z) have red colored Super Glyphs, relevant dependent variables have blue colored Super Glyphs, non significant dependent variables yellow colored Super Glyphs.

Superset(I) binds a vague search within an improved environment. Set(I, J) binds a concise search within an optimal environment. Subset(I, J, K) binds a precise search within an optimal solution. Each optimal search binds the optimal answer or final destination. Cholti (1000) performs the following tasks:

Commercializes each Search: uses a Search Strategy to create each (710) Join Pyramid that maps a relevant environment with 1 billion pages and assigns an orange Corporate Glyph to each Super Site and Page.

Assigns Media Values: maps each Anchor Circle of Accuracy with 32,000,000 web pages using a black advertisement value Basic Glyph assigned to each Super Site and Super Page.

Assigns Commercial Values: maps each Commercial Circle of Accuracy with 8,000,000 web pages using a white supply and demand value Basic Glyph assigned to each Super Site and Super Page.

Assigns Content Values: maps each Improved Environment using a gray (matter) actual content value Super Glyph assigned to each Super Site and Super Page during the transformation of the actual content of each page into Super Glyphs using Join, Simple, Hybrid and Complex Pyramids (Joins, Blocks, Walls and Ceilings).

Assigns Trending Values: maps each optimal environment using usage pattern Advanced Glyph assigned to each Super Site and Super Page to filter and map optimal solution so that Cholti can [DX] 'Cherry Pick' the optimal result.

If a partial environment does not possess a common denominator Super Glyph with another partial environment, Cholti may omit them or do a mulligan from the perspective of the last request. When a mulligan occurs from the point of view of the last request, the information that is disassociated is treated as 'Zero Clusters'.

Zero Clusters: have no Boolean algebra value, but are paramount for the process of using deductive reasoning when deciphering what is the optimal solution.

Independent variable Glyphs: (I, J, K) are managerial relationship indices that shrinks the environment optimally and have 100% or 1.0 Boolean algebra value. (I, J, K) are eliminated from any further calculation once they create the exact partition using inductive reasoning popularity scores, since only dependent variables are relevant during the deductive reasoning process. The more independent variables (I, J, K) in a equation the higher the information certainty.

12. Triangulation Deductive Reasoning

Significant Difference: is an event of quantitative and qualitative importance. A significant difference occurs when an Advanced Glyphs consisting of a plurality of Super Glyphs affects the size of the environment and elucidates reasonable paths to reach the final destination. Thus a significant event occurs when two consecutive requests with a common denominator have a significant filtering disparity of the environment size. When two consecutive requests have the same Superset(I) and after measuring both instances the difference between them is greater than a factor of times eight a significant event is detected. A significant filtering of the environment occurs, when the environment shrinks by a factor of four or more and Superset(I) and Set(I, J) are the same.

If the geographic (iv, x, y, z) is not null and is the same between two consecutive requests then raw factor is multiplied by two, making it easier to have a significant difference event. In addition if the Corporate ID is the same for two consecutive requests and is not null then the raw factor is further multiplied by two.

Example: the end user makes two requests. vague search: "American Civil War" with 80,000,000 page results. $2^{nd}$ vague search: "American Civil War Battlefield" with 5,000,000 pages. The vague session that binds both requests maps both searches to an improved environment with 1,000,000 or (2^20) pages.

Super Glyphs: converts English language words into Glyph equations that yield optimal partitions and are used by the Advanced Glyphs to creating smaller sized environments using Superset(I), Set(I, J), Subset(I, J, K) and geospatial (w, x, y, z) datasets. Remaining Super Glyphs are used in the process of deductive reasoning to determine the weight of each site and page in a set hierarchy. Glyphs are used for stand alone requests whereas Super Glyphs are used for sessions.

The weight of each site and page based on the last request helps in determine what is confounded. Environment size, usage patterns of behavior and total amount of valid requests affects the preprocessed Cold Algorithm threshold used by the software. Deductive reasoning analysis of the environment is done in a predefined manner. (a) Preprocessed Cold Algorithm threshold is a value that measures the significant weight for each valid page, and is set to a value that will distill at least 90% or 0.90. (b) Preprocessed Hot Algorithm threshold values distills the remaining 10% or 0.10 of the partial environment by another 90% or 0.90. (c) Identified 'Zero Clusters' and Super Sites weighted values to purify the environment another 90% as long as the size of the environment is 1,024 W_Rank limit.

Example: The partial environment size for "American Civil War Battlefield" is 5,000,000 page results W_Rank. (a) Hot Algorithm creates the improved environment with 1,000,000 pages. (b) Cold Algorithm filtering creates the optimal environment with 10,000 pages. (c) Cholti uses quality filters of the dependent variables to create the optimal solution with 100 pages. (d) Cholti cherry picks the optimal answer or destination.

Decipherer: Once Cholti (1000) has converted a request to a Glyph equation it can perform the following:

Direct Surfing: Cholti is able to detect a Glyph equation in Search pattern database it can then obtain the Z_Price Bitmap with the latest responses and send them to the end user without performing any calculations.

Stand alone Request: group and organize the vague search into Cholti language static Glyphs. The [AX] and [BX] or vague and concise searches are performed at the same time, and serve to calibrate, qualify and quantify responses and Cholti may estimate the results to avoid perform this resource intensive task provided the assumption is deemed to be reasonable or certain. Then correlates [AX] and [BX] information into a final [CX] and [DX] or precise and optimal searches hierarchical set. Presently, prior art assigns each page with a default static weight of 1. Cholti (1000) assigns to each Super Page a value from 0.001 to 10 based on the Q(x) of the Super Site and its associate Corporate Information.

Plurality of Related Request Sessions most sessions do not satisfy the end user by reaching the final destination in the first attempt. If the end user is dissatisfied a session will consists of a plurality of requests. Cholti (1000) associates a plurality of related requests and then match/merge not significant unrelated requests to map an optimal solution resultant [CX] after correlating a plurality of [AX] and [BX] of hierarchical sets. The Hot & Cold Algorithms parameters dynamically maps an optimal solution with the top (n) pages that valorizes the vector components of each valid element of the [CX] hierarchical set and assigns up to date characteristics such as active, visible, reasonable probability and exact match weight. See Example #5 Related Requests.

Plurality of Unrelated Request Sessions when Cholti determines a session possesses a plurality of consecutive unrelated requests it must convert the unrelated Glyphs into (yellow) Super Glyphs. Cholti uses mulligan Super Glyphs in the process of cherry picking with deductive reasoning the destination.

Plurality Interrelated Request When many significant difference requests exists Cholti (1000) associates many distinct hierarchical sets to map an optimal solution resultant [CX] after correlating a plurality of [AX] and [BX] of hierarchical sets. When the correlation for a plurality of [AX] and [BX] requests is performed the result is a plurality of partial [CX]. Then Cholti cherry picks each partial [CX] optimal solution to find the [DX] optimal answer or destination.

Cholti Artificial Intelligence Spiders: are automated programs that continuously gather, distill and analyze the environment in real time and determine if the content is of significant difference in order to update the Search pattern database. Spiders determines if the file has been deleted, moved, updated or is new as follows:

Delete Data W_Rank=null. Based on the previous W_Rank the system for each Glyph Z_Price Bitmaps determine if the removal of the W_Rank is of significant difference to affect a 'CORE List' inventory. Each Z_Price Bitmaps has a minimal W_Rank. If the deleted W_Rank is greater than the TOP 1000, the Index value where the existing W_Rank=null, all the W_Rank below it are improved by one, and the TOP 1000 is adjusted. Z_Price Bitmaps data structure stores TOP 1024 pages and to elude recalculating replacements once a page belongs to Z_Price Bitmap it is not eliminated and has a lower value than the top 1000 to solve for the optimal solution.

Move Data W_Rank remain the same, and the IP Address is updated for future reference.

Update Data the content of a page has changed. Four buckets are created: a) deleted, b) new, c) net deleted and d) net new. The software analyzes the net deleted bucket and determines active Glyphs Z_Price Bitmaps for removal of data and the net new bucket active Glyph for insertion of data.

New Data Based on the site and # associated links an approximate value W_Rank is created. Based on the approximate W_Rank the system determines active Glyphs Z_Price Bitmaps. Each Z_ Price Bitmaps has a minimal W_Rank and if the W_Rank is greater than the minimal W_Rank the Z_Price Bitmap is updated.

Significant Difference Data Upon identifying significant changes to Z_Price Bitmap information belonging to a site hierarchy, the summary content of a Super Site and Super Page are updated.

Updating Page Ranks via Z_Price Bitmaps method: XCommerce (2000) updates the inventory as follows:

Spiders: perform their standard searches for new information in the Internet. The Spider first determines Q(x) and the appropriate sub partitions Q(x, y, z) values. Then Cholti compares against the top responses derived from any known Z_Price Bitmaps and filters based on minimal valid page value parameter required to instantiate an event of significant difference in the environment. Then stores all of valid Glyphs in its 'CORE' List and requests all HQ owners store in memory or archive in files reasonable balanced hierarchical sets.

Popularity Score: places to each page its existing page rank. In the event the page rank is unknown the system based on the quality of the parent site, and page sibling estimates the page rank.

Plurality of New events: for each detected existing Glyph will attempt to update if the information is within the TOP 10,000 or (2^14) page result W_Rank and when Cholti determines the value exceeds the limit, the system immediately validates the event as having significant difference.

Z_Price Bitmap: updates the Top 1000 or (2^10) weighted pages, and Top 10,000 or (2^14) weight sites. Weight is used since, a page or site can have a weight greater than one then updates the new limits including the Popularity Score and News events counters for aggregate weight and frequency.

A caution to the reader the word optimal is tricky. 1) Does it mean the top inductive reasoning popularity score response? 2) Does it mean the best content based on a deductive reasoning? 3) Does it mean the best solution after taking into account media value and all the valid requests within a session? The later is the correct answer. Consequently (black & white) advertisement Super Glyph metrics are required to measure viability or profitability and not just maximizing Boolean algebra values, and this fact is the core reason why creating profitable search algorithms is so difficult.

Faster Alternative: All HQs participate in [AX], [BX], [CX], and [DX] process and the assigned HQ owner estimates the [AX] value and forward chains a message with the hierarchical set parameters for [BX]. Each HQ node rearward chains the [BX] response with the top (n) results or null. The HQ owner performs the Hot & Cold Algorithm to generate the Q(x, y, z) filter and forward chains the message to each top (n) results HQ node. Each top (n) results HQ node rearward chains the [CX] response with the optimal results or null. Now the HQ owner 'cherry picks' the optimal result.

BRIEF DESCRIPTION OF THE FIGURES

Reference is now made to the drawings, wherein like characteristics and features of the present invention shown in the various figures are designated by the same reference numerals.

DETAILED DESCRIPTION OF THE PREFERRED EMBODIMENTS

1. Human Brain Search Model Analysis Using Intelligence

Figure 1:
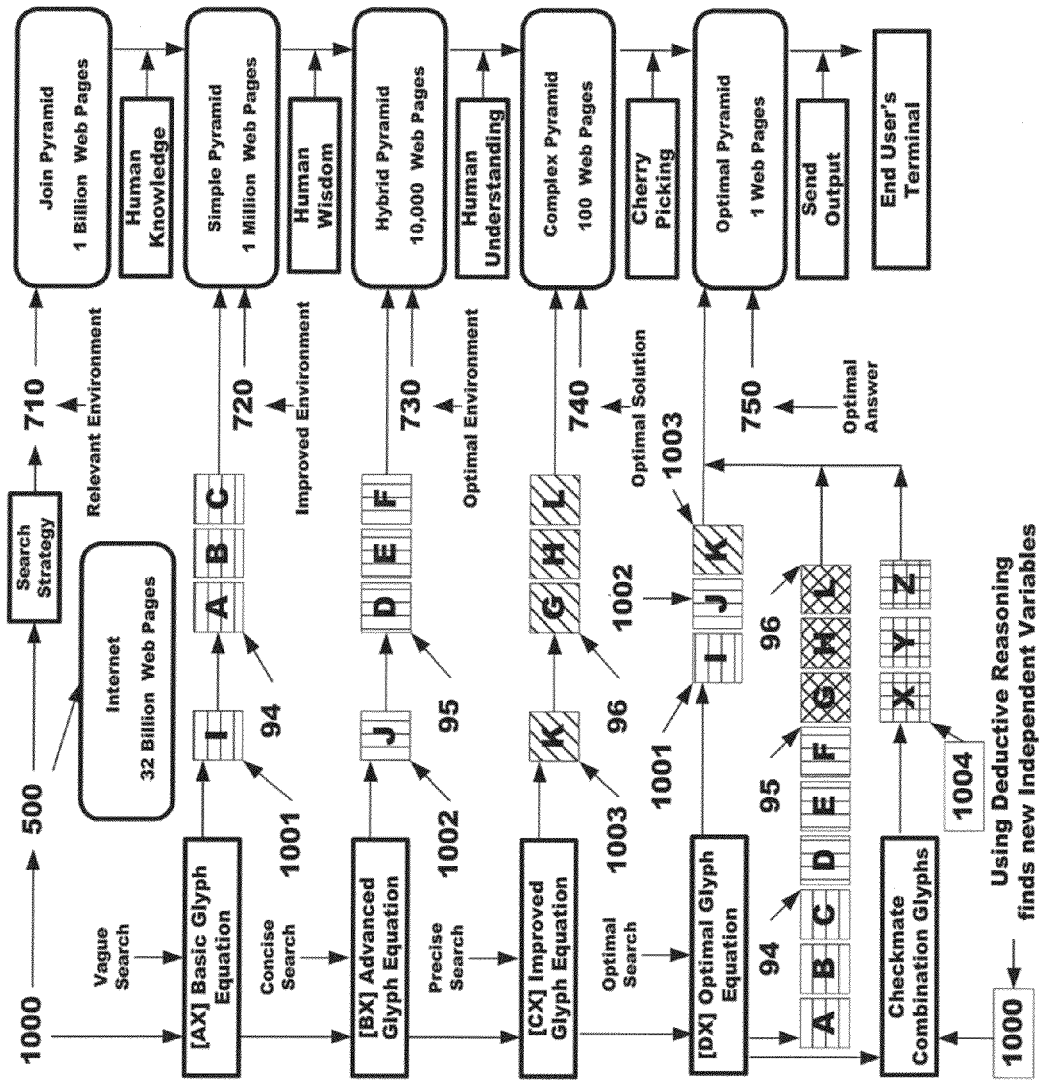
FIG. 1: Human Brain Search Model

FIG. 1 The Human Brain Search Model transforms the chaos and anarchy of the (500) Internet environment of 32,000,000,000 web pages, into a (710) Join Pyramid that maps a relevant environments with 1,000,000,000 web pages, and then employing deductive reasoning and Search Strategies assigns a corporate orange Glyph value to each Super Site, that will be used to supply corporate missing gaps of information. Cholti (1000) performs the following tasks:

Uses the anchor keywords to figure out the point of origin and partition the relevant environment into 32,000,000 web pages and assigns advertisement Glyph values to each Super Site in order to commercialize the process.

[AX] Basic Glyphs functionalities using human knowledge filters the relevant environment using (1001) primary independent variable (I) and adds (94) $1^{st}$ key featured association, to create (720) Simple Pyramids that map an improved environment with 1,000,000 web pages and assigns actual content values based on Super Glyphs.

[BX] Advanced Glyph functionalities using human wisdom filters the improved environment using (1002) secondary independent variable (J) and adds (95) $2^{nd}$ key featured association, to create (730) Hybrid Pyramids that map an optimal environment with 10,000 web pages and assigns gold trending Glyph to incorporate trending to the search process.

[CX] Improved Glyph functionalities using human understanding filters the optimal environment using (1003) tertiary independent variable (K) and adds (96) $3^{rd}$ key featured association, in order to create (740) Complex Pyramid that maps the optimal solution with 100 web pages.

[DX] Optimal Glyphs selects the (750) Optimal Pyramid by using the (1004) checkmate combination independent variables and then reads the web pages in behalf of the end user and finds the best content, ranking, commercial responses and in the case of dynamic response the overall most satisfying response.

2. Human Brain Search Model Uses Commercial Values

FIG. 1 explanation continued. [AX] Basic Glyph use vague searches and commercializes the (710) Join Pyramid that maps a relevant environment with 1 billion pages to plot the (712) Commercial Circle of Accuracy environments with 8,000,000 web pages and assigns white supply and demand Glyphs in order to monetize the search.

3. Human Brain Search Model Uses Wisdom

FIG. 1 explanation continued. [BX] Advanced Glyphs reorganizes and transforms vague searches into concise searches into Managerial Relationship Indices, [CX] Improved Glyphs transforms concise searches into precise searches employing usage patterns of behavior to expand the Improved Glyph functionalities, in order to create (740) Complex Pyramids.

[DX] Optimal Glyphs read the actual content and decipher if the content is 1) relevant and 2) good quality in order to find the optimal answer or (750) Optimal Pyramids of (1 web page).

4. Super Glyph Filters why Uses them?

The reason behind Super Site (a, b, c, d, e) Glyphs is for data mining. Cholti (1000) filters web pages based on the dynamic quality values Q(x, y, z) of each keyword typed, and distills based on the Super Site (a, b, c, d, e) values. There is no need to recalculate each request millions of times, instead only once during the creation of the actual Search Pattern, and Super Site (a, b, c, d, e) Glyphs are used to associate and group Superset(I) based on corporate and advertisement values during the commercialization process, Set(I, J) based on supply and demand and actual content Glyphs during the monetization process and Subset(I, J, K) based on trending Glyphs.

5. Information Pyramid Structure

Figure 2:
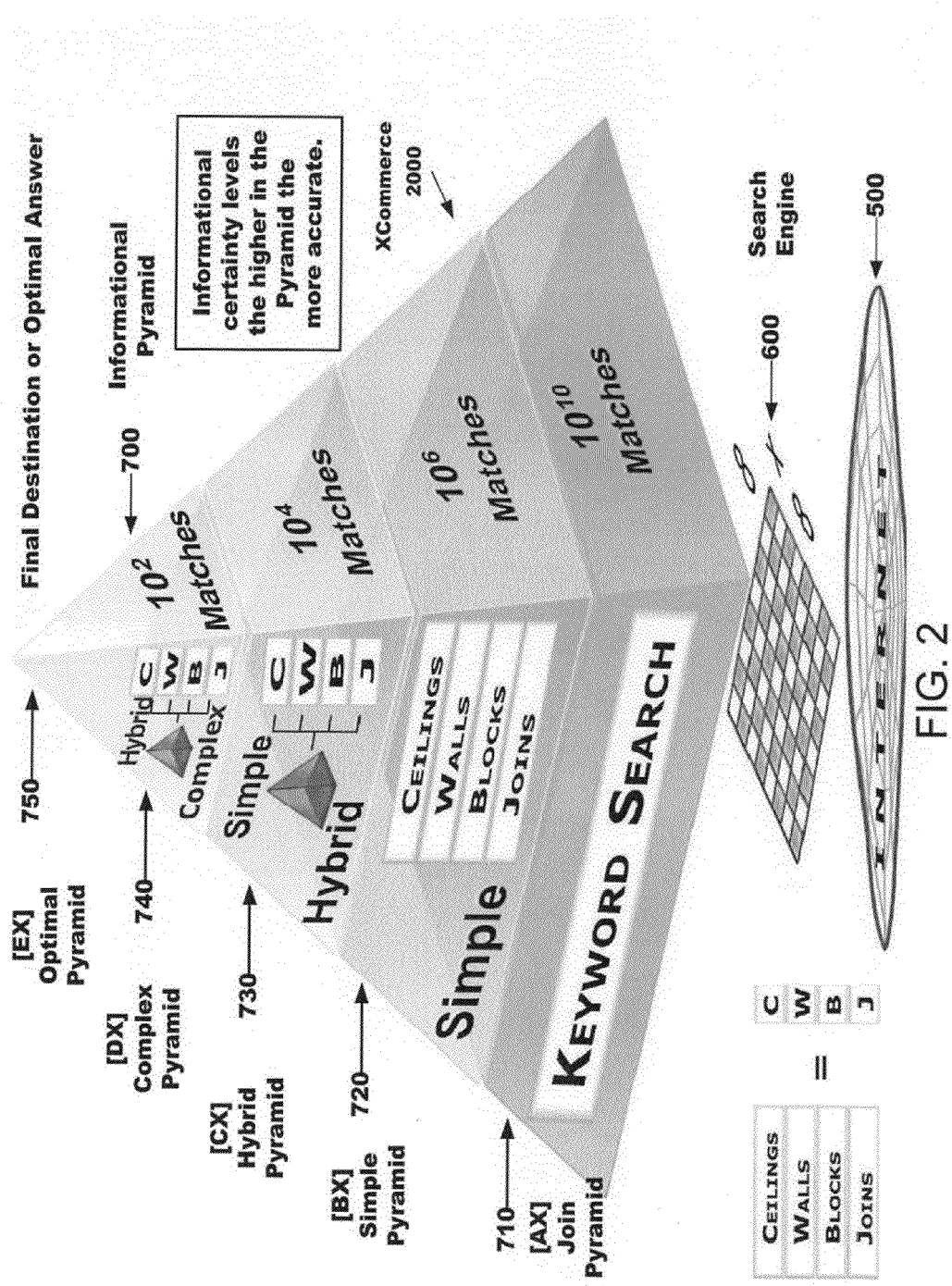
FIG. 2: Informational Pyramid.

FIG. 2. is a schematic representation of the (700) Information Pyramid Structure that interacts with the (500) Internet. Cholti (1000) simulates the entire superset of valid keyword regular expression requests, and converts the results in Summary Data map data, so that future requests are made absent of the (600) Search Engine supercomputer capabilities. Then measures each regular expression the magnitude or quantity of hits belonging to a query. A vague search uses a huge sample of with 32,000,000,000 hits making the response meaningless, and then associates them to a (720) Simple Pyramid Structure that maps an improved environment with 1,000,000 web pages that filters down the magnitude of vagueness by a factor of 32,000. Improving informational certainty of the vague search by reading, comparing, and validating the semantic structure of the actual content and not just popularity scores of page and also measures (Joins, Blocks, Ceiling and Walls) collection, key featured association and grammatical rules to properly write in a given language.

A concise search uses a medium sample that creates a (730) Hybrid Pyramid that maps an optimal environment with 1,000,000 web pages that filters down the magnitude of vagueness by a factor of 100. Improving informational certainty continues by filtering the concise search by further reading, comparing and validating the semantic structure with their association to higher magnitude words. Now, measures the value of the content by comparing the quantity and quality of additional (Joins, Blocks, Ceiling and Walls) collections, geospatial data, antonyms and synonyms.

A precise search uses a small sample that creates a (740) Complex Pyramid that maps an optimal solution with 100 web pages that filters down the magnitude of vagueness by a factor of 100. Improving informational certainty continues by filtering the precise search by reading, comparing and validating the semantic structure with their associations to higher magnitude words. Now, measures the value of the content by comparing the quantity and quality of additional (Joins, Blocks, Ceiling and Walls). Then filters the optimal search by measuring the content and popularity values to achieve informational certitude and finds the optimal answer to creates (750) Optimal Pyramid.

FIG. 2. (2011 explanation): A three tier Supercomputer that mimics the human brain with Search Strategies that dynamically simulate interpolation combinations Point of Origin environments as follows:

[AX] Basic Glyphs: parser applies 'Keyword Search' semantic guidelines to update each vague search using human brain Search Strategies and creates a (710) Join Pyramid.

[BX] Advanced Glyphs: Summit Tier applies English grammar and semantics guidelines to update each vague search and transforms the end user's Keywords into a valid Basic Glyph Equation to create a (720) Simple Pyramid.

[CX] Improved Glyphs: Middleware Tier uses deductive reasoning to update each concise search and transforms the end user's Keywords into a valid Advanced Glyph Equation to create a (730) Hybrid Pyramid.

[DX] Optimal Glyphs: Lower Tier verifies each precise search with the Likely and Unlikely Analysis to de-emphasize pages and create (740) Complex Pyramids, and then 'Cherry Picking' the optimal search with the final destination into a (750) Optimal Pyramid as output that is sent to the end user browser capacities.

Figure 3:
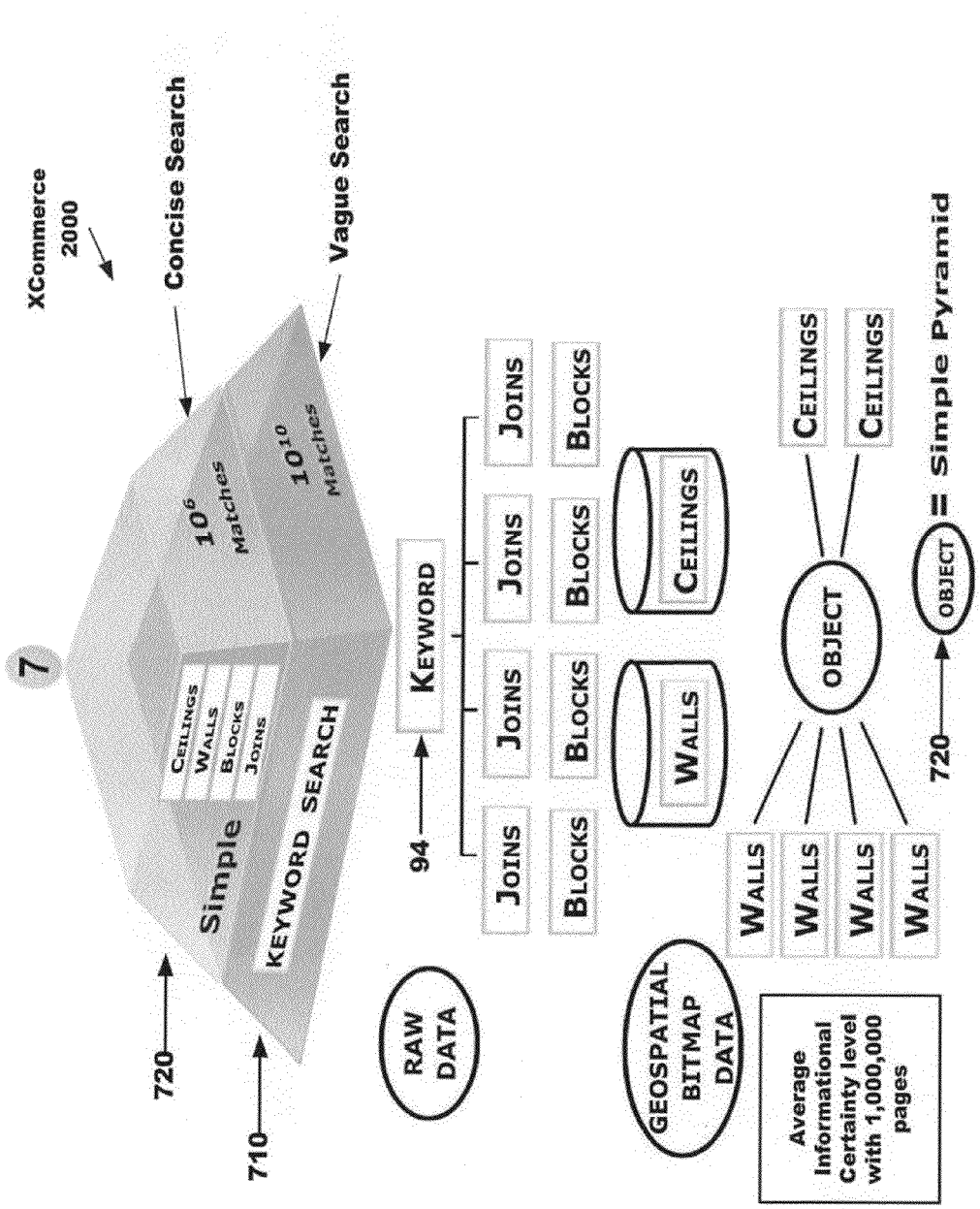
FIG. 3: Simple Pyramid.

FIG. 3 is a schematic representation of a (720) Simple Pyramid Structure. End user makes a vague search using English language Keywords. XCommerce (2000) uses (94) $1^{st}$ key featured associations and (710) Join Pyramid Search Strategies filtering semantics guidelines obtained from pre-processed vague search results and stores the answers into the XLDB Engine. The information is distributed using Simple (Join, Block, Wall, Ceiling) collections and helps create cells and blocks that create (720) Simple Pyramid or Block that contain and map an improved environment with 1,000,000 pages.

Figure 4:
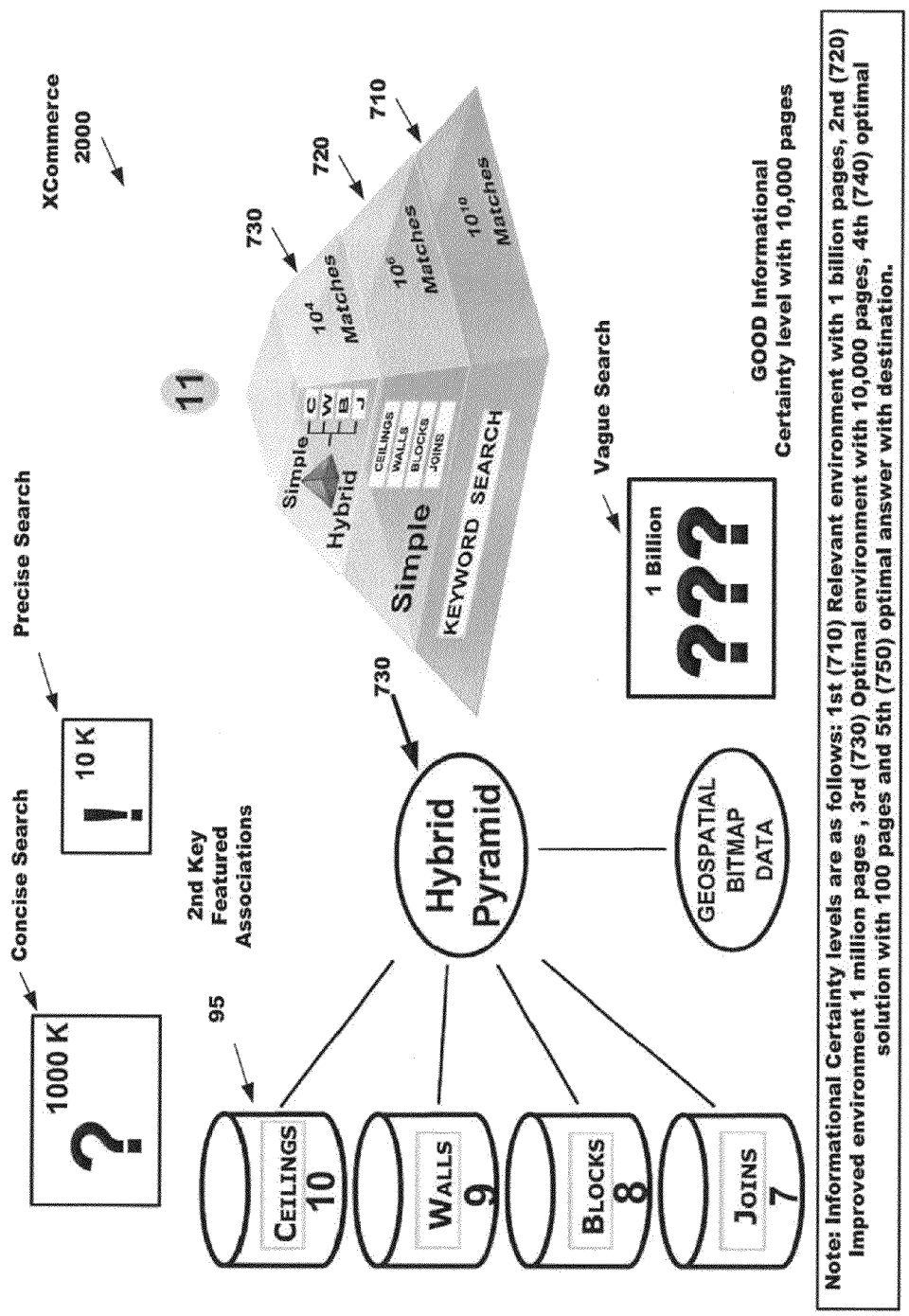
FIG. 4: Hybrid Pyramid.

FIG. 4 is a schematic representation of a (730) Hybrid Pyramid Structure. End user makes a vague search using English language Keywords. XCommerce (2000) uses (95) $2^{nd}$ key featured associations and (710) Join Pyramid Search Strategies filtering semantics guidelines obtained from pre-processed concise search results and stores the answers into the XLDB Engine to create the (720) Simple Pyramid. The information is logical distributed using (Join, Block, Wall, Ceiling) collections to create the (730) Hybrid Pyramid and to reach the TOP 10,000. The relative magnitude value of (Joins)=7, (Blocks)=8, (Walls)=9, and (Ceilings)=10.

Figure 5:
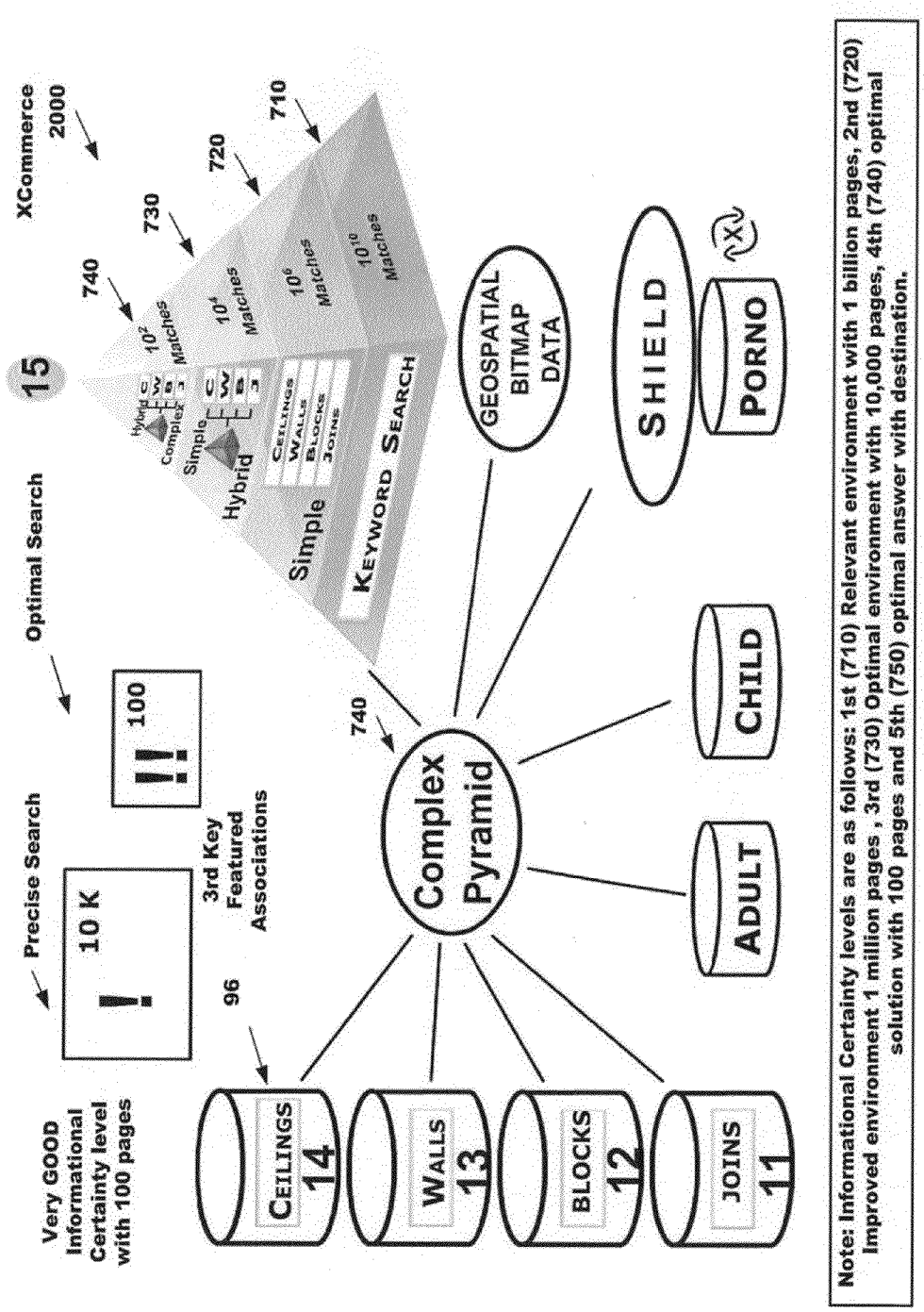
FIG. 5: Complex Pyramid.

FIG. 5 is a schematic representation of a (740) Complex Pyramid Structure. An end user makes a vague search using English language Keywords. XCommerce (2000) uses (96) $3^{rd}$ key featured associations and (710) Join Pyramid Search Strategies filtering semantics guidelines obtained from pre-processed precise search result and stores the answers into the XLDB Engine to create the (720) Simple Pyramid Structure of 1,000,000 cells that is further filtered into a (730) Hybrid Pyramid Structure with 10,000 cells and further calculations create the (740) Complex Pyramid Structure with 100 cells and magnitude of 15. The relative magnitude value of (Joins)=11, (Blocks)=12, (Walls)=13, and (Ceilings)=14.

Figure 6:
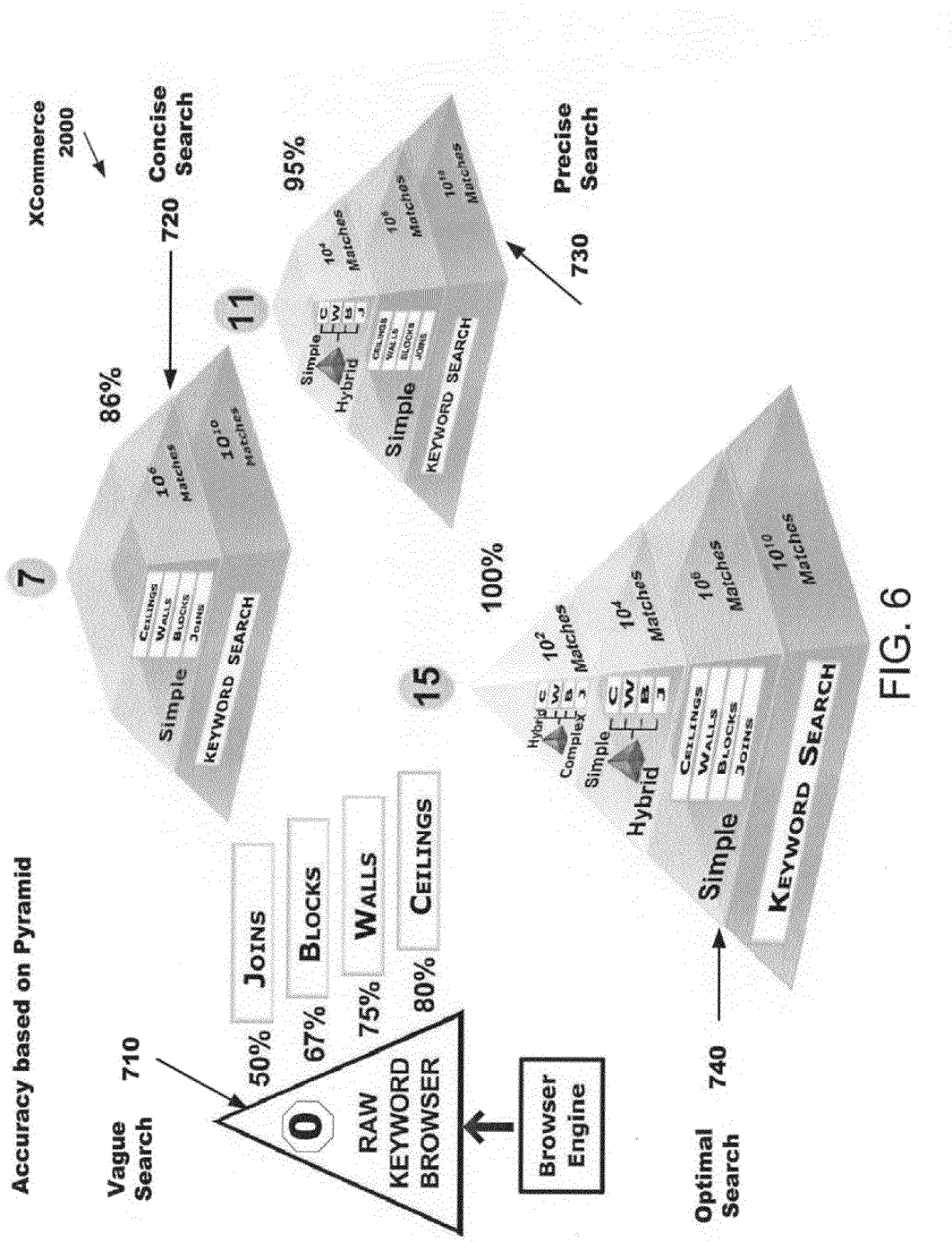
FIG. 6: Accuracy based on Pyramid.

FIG. 6 is a schematic representation of Accuracy based on Pyramid Structure. An end user makes a vague search using English language Keywords. (710) The Join Pyramid structure with $X responses obtained by existing Boolean algebra Search Engines using Caesar's Divide and Conquer eigenvectors. XCommerce (2000) after using (Join) collections, the accuracy is 50%, and after using (Block) collections, the accuracy is 67% and the content is considered to be proper English. After using (Wall) collections, the accuracy is 75% and is grouped in cells and after using (Ceiling) collections, the accuracy is 80% and is grouped in blocks. The (720) Simple Pyramid Structure has validated and verified the English language, now the accuracy of Superset(I) is 86%. (730) The Hybrid Pyramid Structure has validated and verified the quality of the geospatial data and has linked each informational block and the different DATA collection groups to further refine and polish the results, now the accuracy of Set(I, J) is 95%. (740) The Complex Pyramid Structure has validated and verified the quality of the Business Intelligence patterns and statistical analysis of end users' Keywords to reach informational certainty and now the accuracy of Subset (I, J, K) is 100%. Each (720) Simple, (730) Hybrid and (740) Complex Pyramid Structures have $X responses based on the quality of the end user's request, and all have 1,000,000 cells and 500,000 building blocks regardless of the magnitude of the Keyword.

Figure 7:
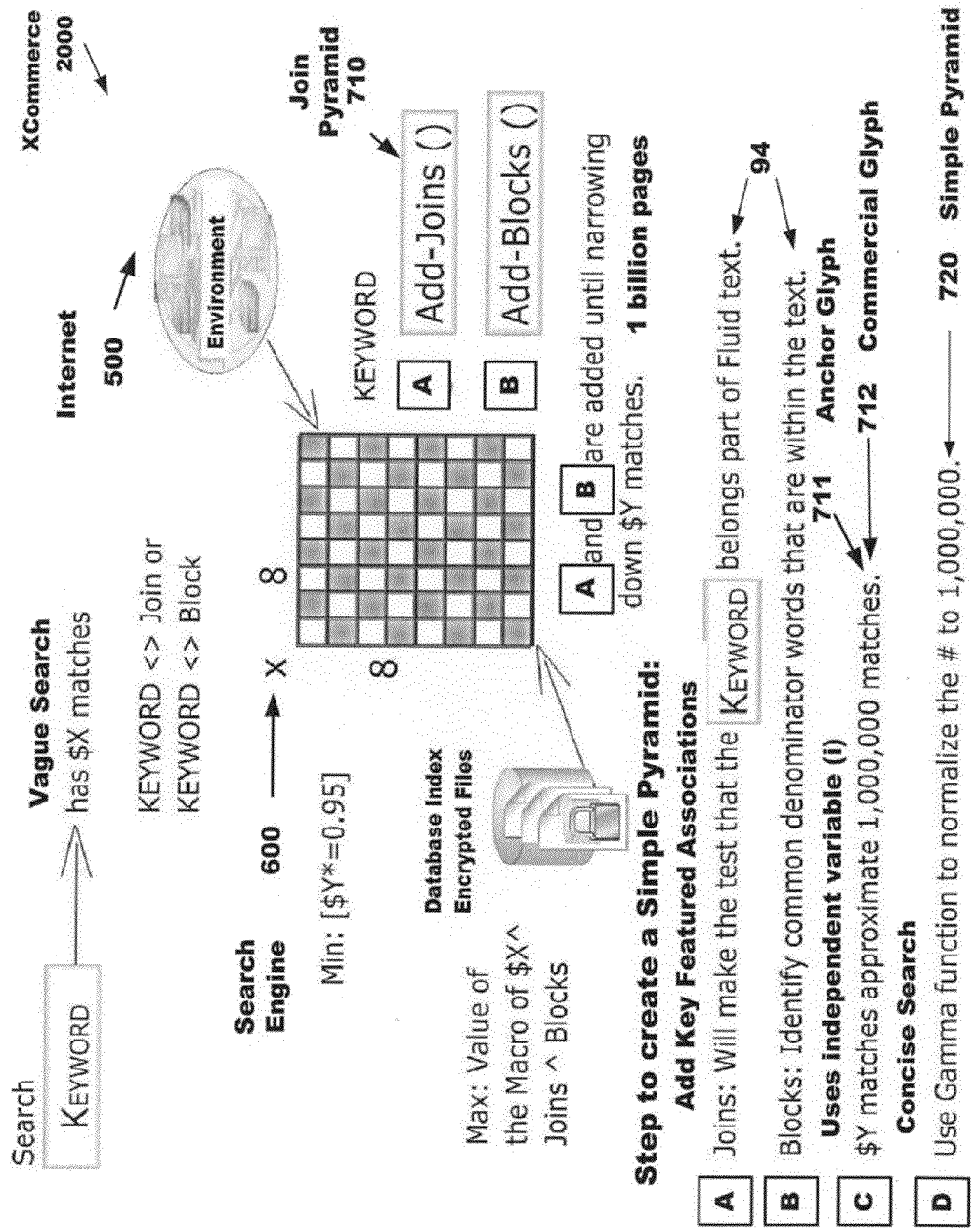
FIG. 7: Steps to create a Simple Pyramid.

FIG. 7 is a schematic representation of the steps to create a (720) Simple Pyramid by optimizing keyword quality using Informational Building Blocks. An end user makes a request via a (600) Search Engine. XCommerce (2000) preprocessed each vague search using (A) Join and (B) Block collection of filters. Each object contains one million logical cells. (C) Uses (711) Anchor Glyph and (712) Commercial Glyph Q(x, y, z) filters and (D) $Y Gamma functions to convert the vague search into a concise search and create the (720) Simple Pyramid that maps an improved environment with 1,000,000 pages and expand the Glyph equation with the (94) $1^{st}$ key featured associations.

Figure 8:
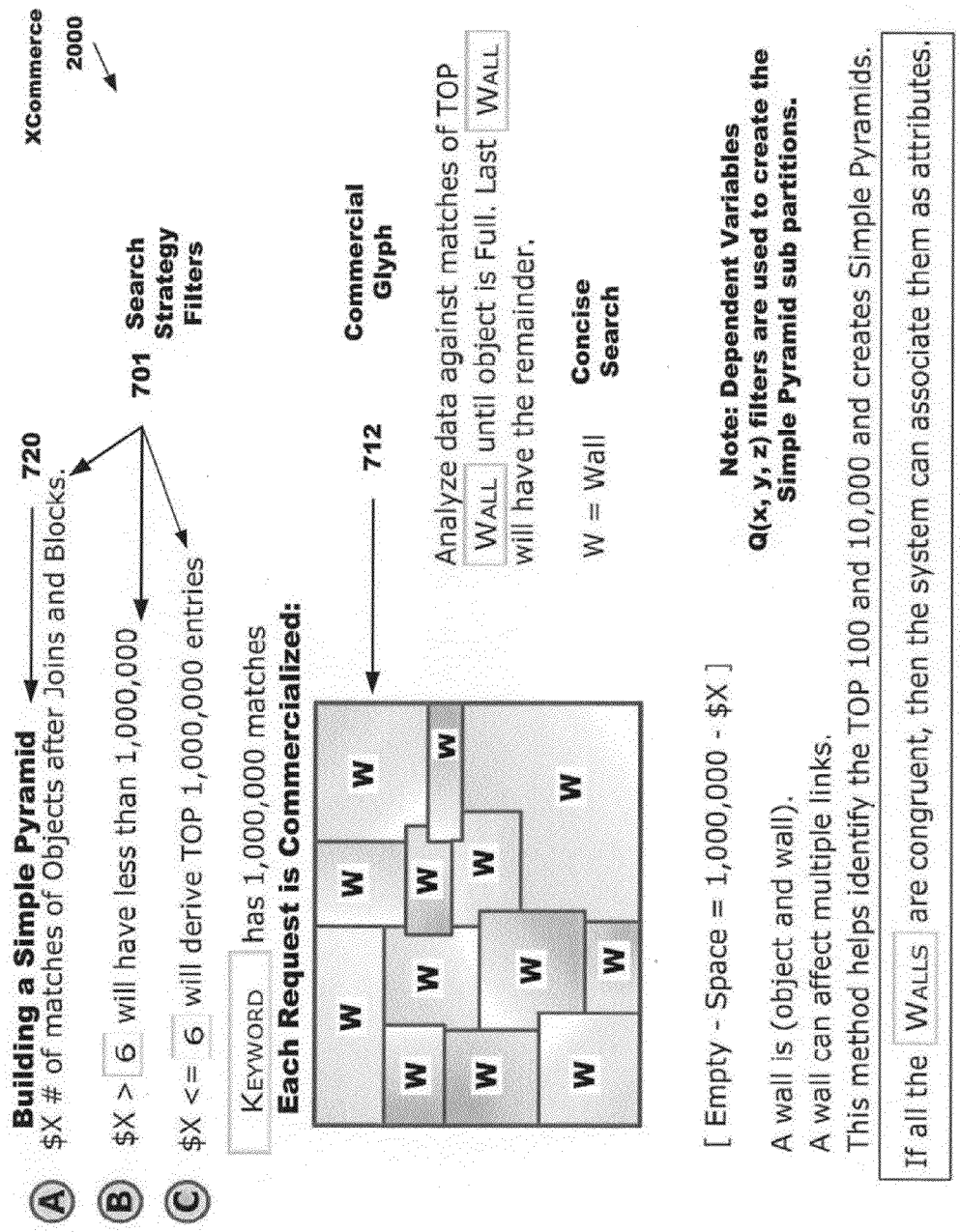
FIG. 8: Building a Simple Pyramid.

FIG. 8 is a schematic representation of building a (720) Simple Pyramid. XCommerce (2000) converts the vague search into a concise search using a Search Strategy, (701) semantics guidelines and (712) Commercial Glyph Q(x, y, z) filters and $X Gamma function to map an improved environment with 1,000,000 web pages.

Figure 9:
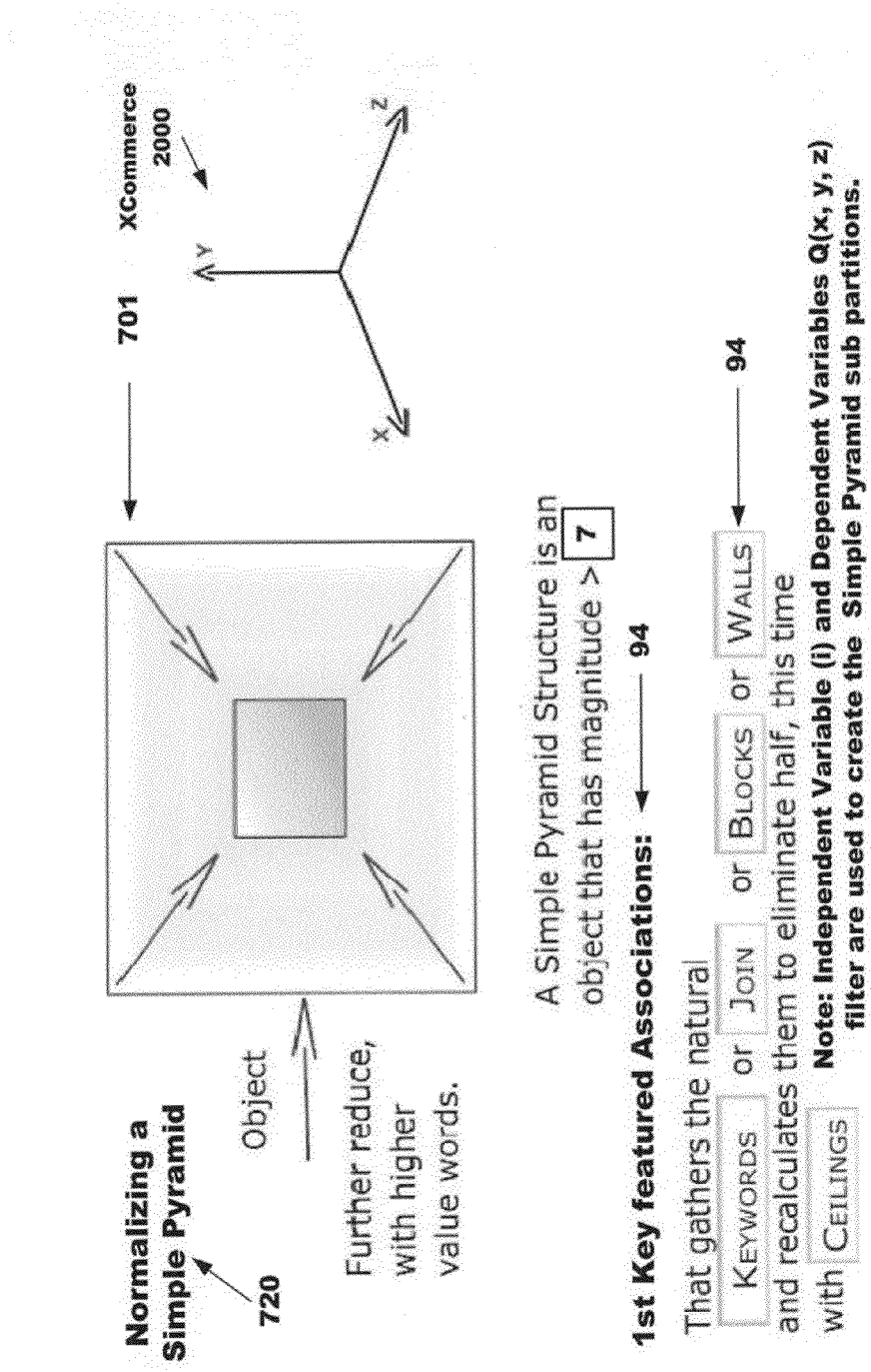
FIG. 9: Normalizing a Simple Pyramid.

FIG. 9. is a schematic representation of Normalizing a (720) Simple Pyramid using math to balance the object. End user makes a request using English keywords. XCommerce (2000) preprocessed concise search equivalent and uses (701) English semantics guidelines to find the (94) $1^{st}$ key featured associations. Then measures each web page belonging to the (720) Simple Pyramid with (Join, Block, Wall, Ceiling) collections to derive the highest valued cells.

Figure 10:
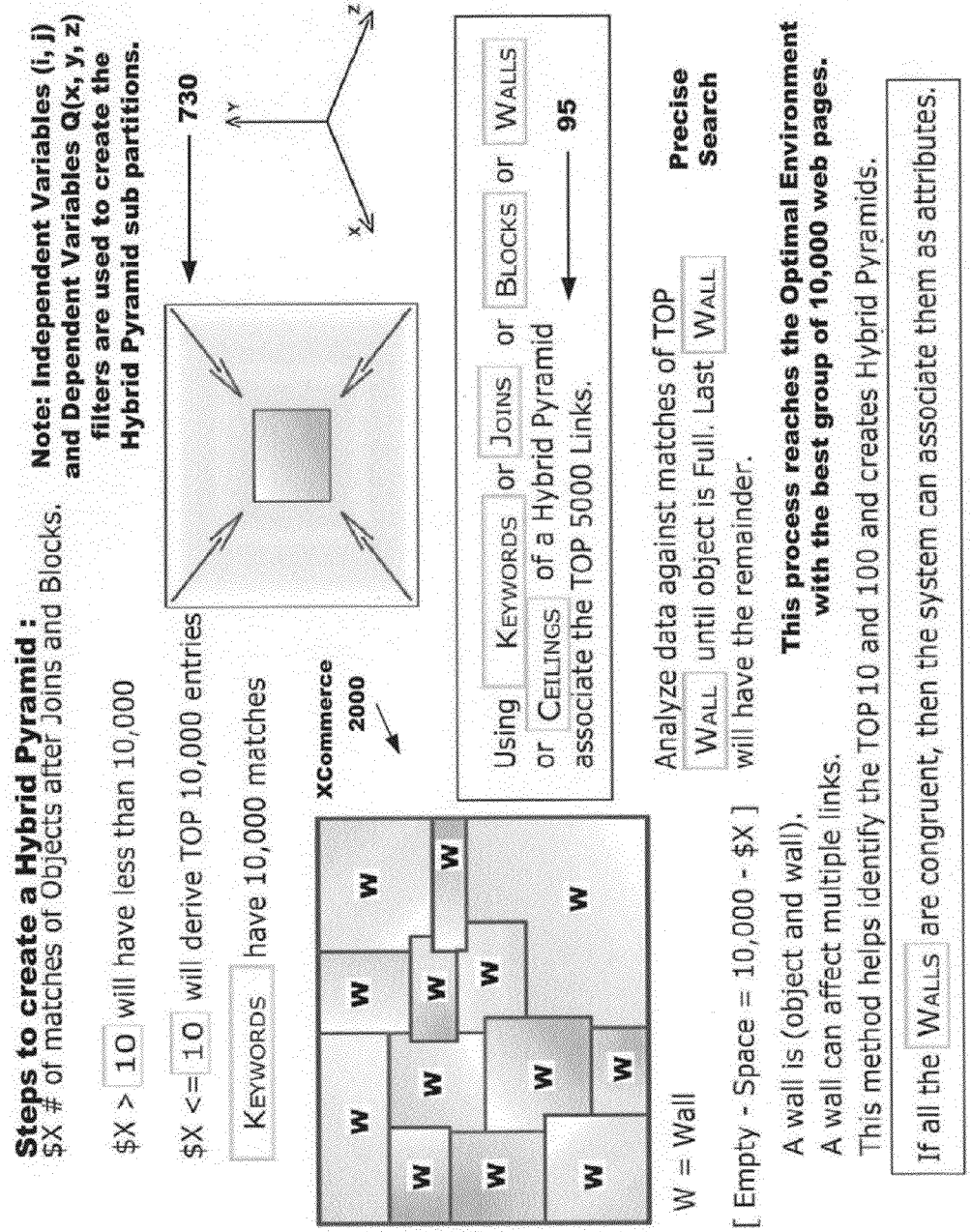
FIG. 10: Steps to create a Hybrid Pyramid.

FIG. 10. is a schematic representation of the steps to create a (730) Hybrid Pyramid. XCommerce (2000) transforms and end user request into a concise search. For a concise search with $X or 1,000,000 matches XCommerce (2000) creates basic cells and building blocks with (Joins, Blocks, Walls, Ceilings) and finds the (95) $2^{nd}$ key featured associations. Then maps and plots the concise search keywords to create a (730) Hybrid Pyramid object, that has exactly 10,000 cells. The dependent variables Glyph Q(x, y, z) values can shrink or expand the object.

Figure 11:
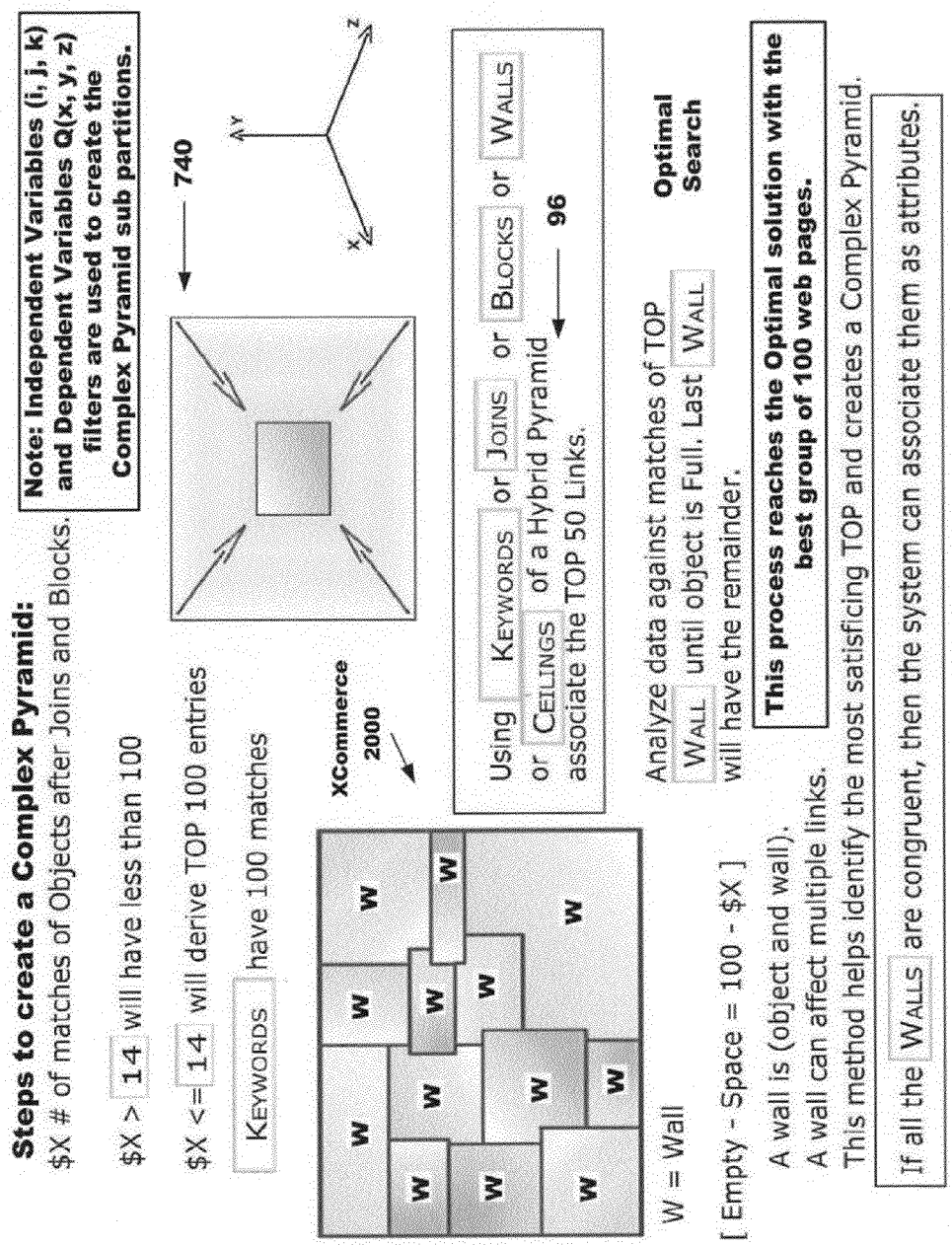
FIG. 11: Steps to create a Complex Pyramid.

FIG. 11. is a schematic representation of the steps to create a (740) Complex Pyramid. XCommerce (2000) transforms and end user request into a precise search. For a precise search with $X or 10,000 matches XCommerce (2000) creates basic cells and building blocks with (Joins, Blocks, Walls, Ceilings) and finds the (96) $3^{rd}$ key featured associations. Then maps and plots the precise search keywords to create a (740) Complex Pyramid object, that has exactly 100 cells. The dependent variables Glyph Q(x, y, z) values can shrink or expand the object.

Figure 12:
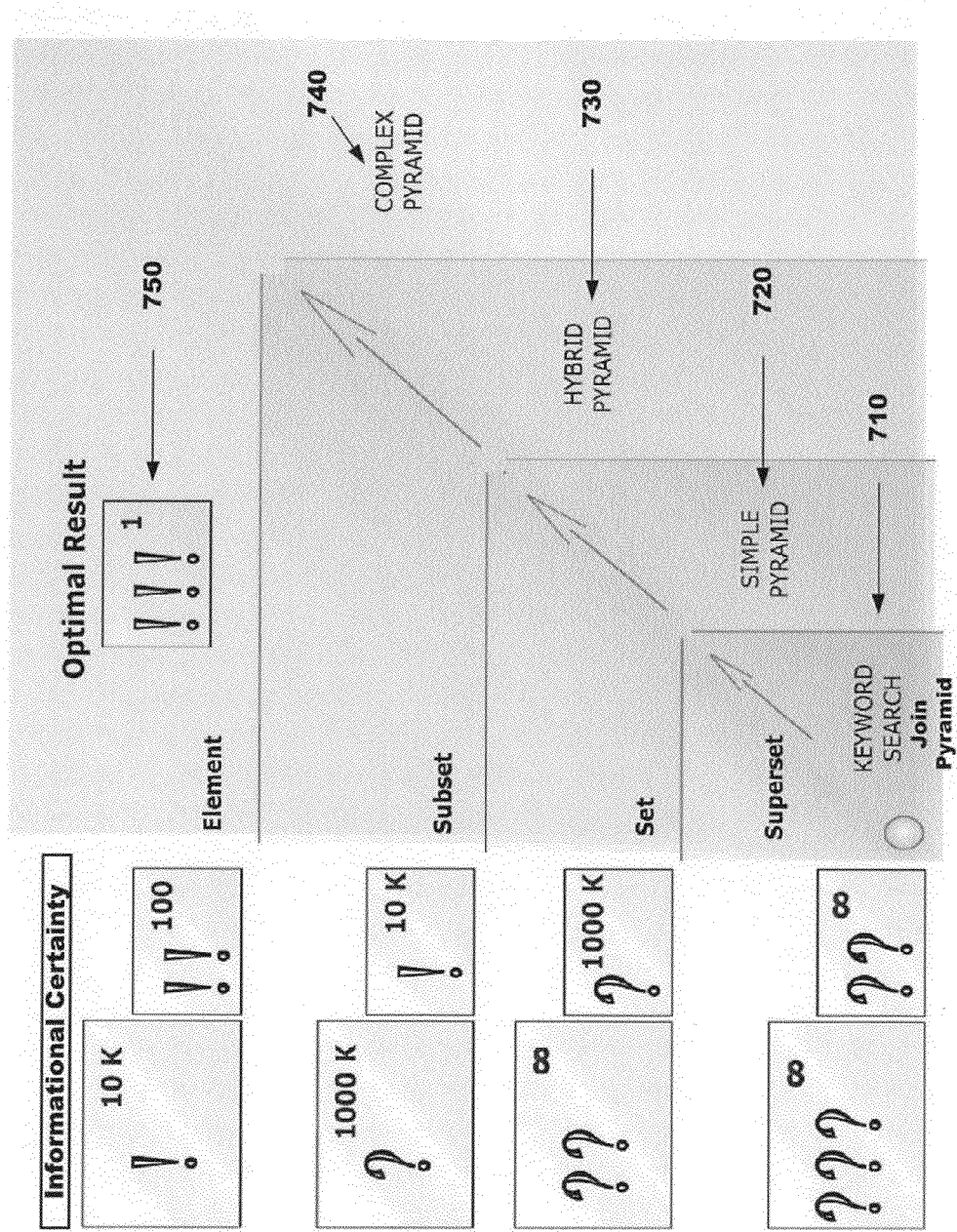
FIG. 12: Informational Certainty.

FIG. 12 is a schematic representation of Informational Certainty. This example uses chess notation, where (???) is a blunder, (!) is a good move and (!!!) a superb move. In this case, raw Browser Engine filters out the information of the Internet or Superset that is considered to be (???) and improves it to (?? to !). From lowest to highest: Vague search where (x)=32,000,000,000 or (2^35) responses, the process of identifying basic English constructs of the contents to shrink to a (710) Join Pyramid with 1,000,000,000 responses, which is too broad and hence is (??). The vague search is transformed into a concise search and creates a (720) Simple Pyramid with 1,000,000 responses, which is too broad and hence is (?). The concise search is transformed into a precise search and creates a (730) Hybrid Pyramid with 10,000 responses, which is broad and hence is (!). The precise search is transformed into a optimal search and creates a (740) Complex Pyramid with 100 response, which contains 'la crème de la crème' and hence is (!!). The optimal search is transformed into answer search that creates a (750) Optimal. Pyramid and hence is (!!!).

6. Cholti Search Engine Optimizer

Figure 13:
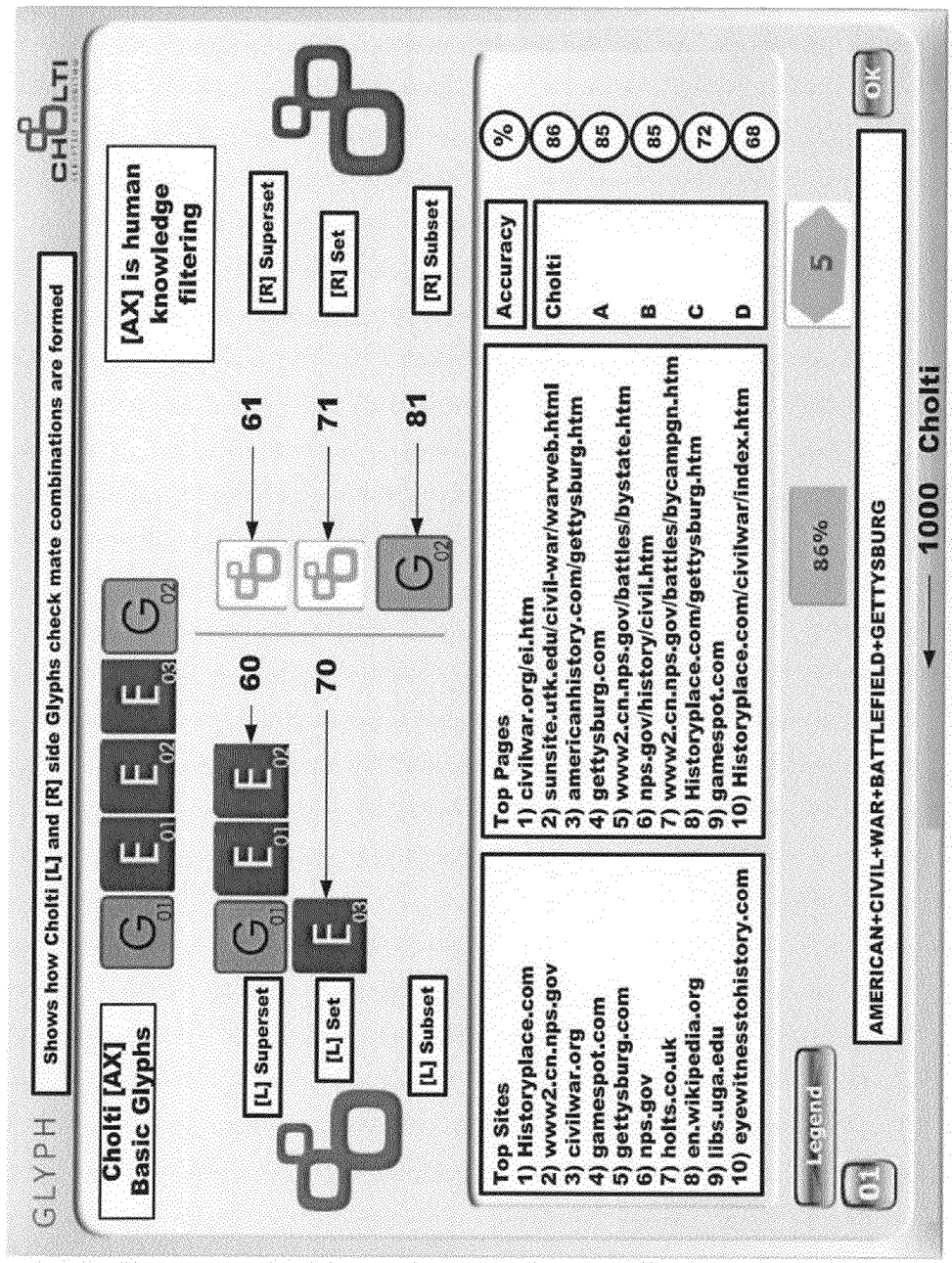
FIG. 13: Basic Glyphs.

FIG. 13 is a schematic representation of Basic Glyphs equation. Cholti (1000) maps and reorganizes keywords belonging to a vague search and then transforms them into Basic Glyphs using human knowledge. Then matches/merges both Left Brain and Right Brain equations to the vague search "American Civil War Confederates Battlefield Gettysburg" into Glyphs (60, 61, 70, 71, 81) to transform the vague search into a logical mathematical (static Glyph) equation.

Figure 14:
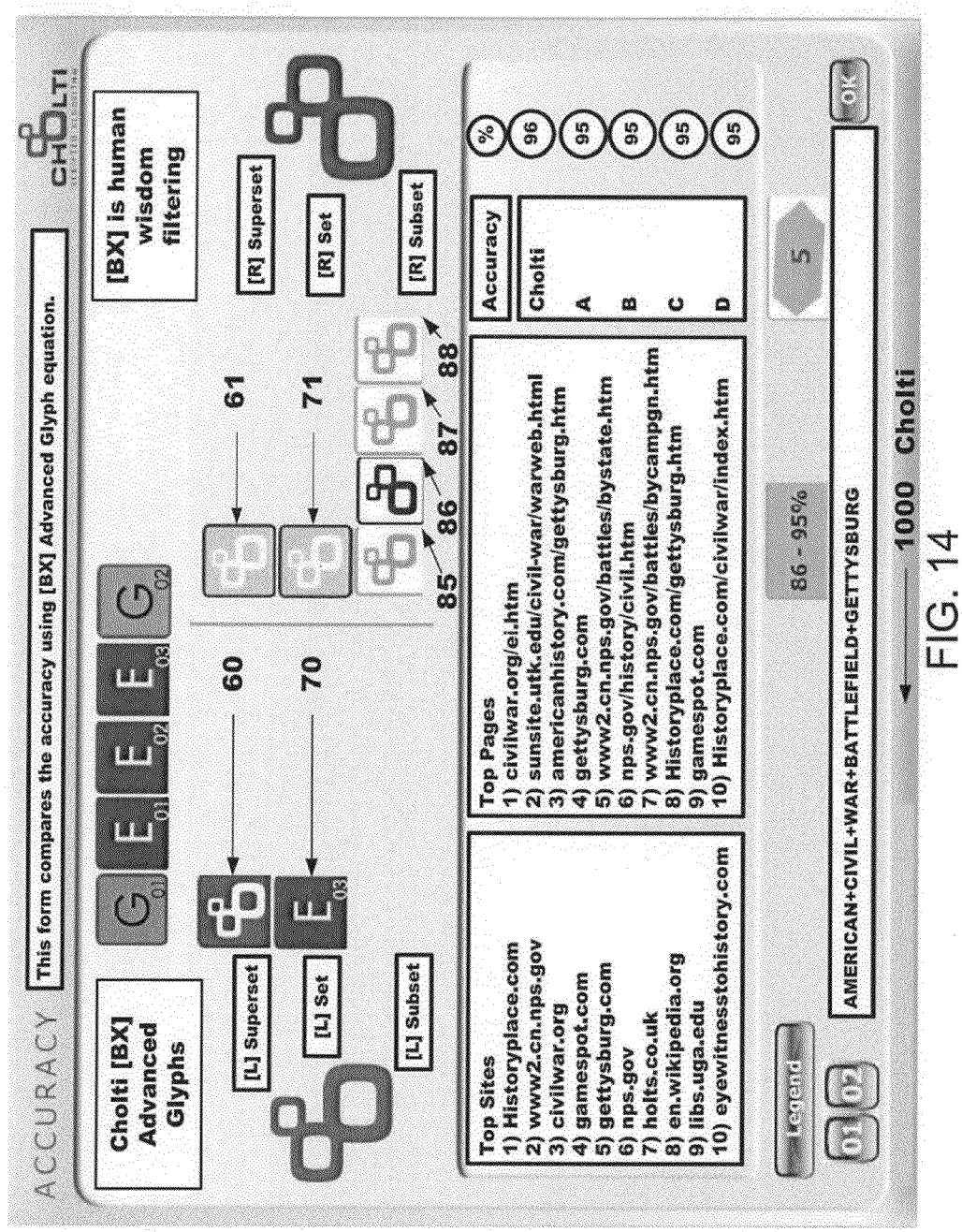
FIG. 14: Advanced Glyphs.

FIG. 14 is a schematic representation of an Advanced Glyphs equation. Cholti (1000) converts Basic Glyphs into Advanced Glyphs using human wisdom and correlates both Left Brain and Right Brain equations to transform the concise search "American Civil War Confederates Battlefield Gettysburg" into Glyphs (60, 61, 70, 71, 85, 86, 87, 88) and transforms the concise search into a logical mathematical (dynamic Glyph) equation.

Figure 15:
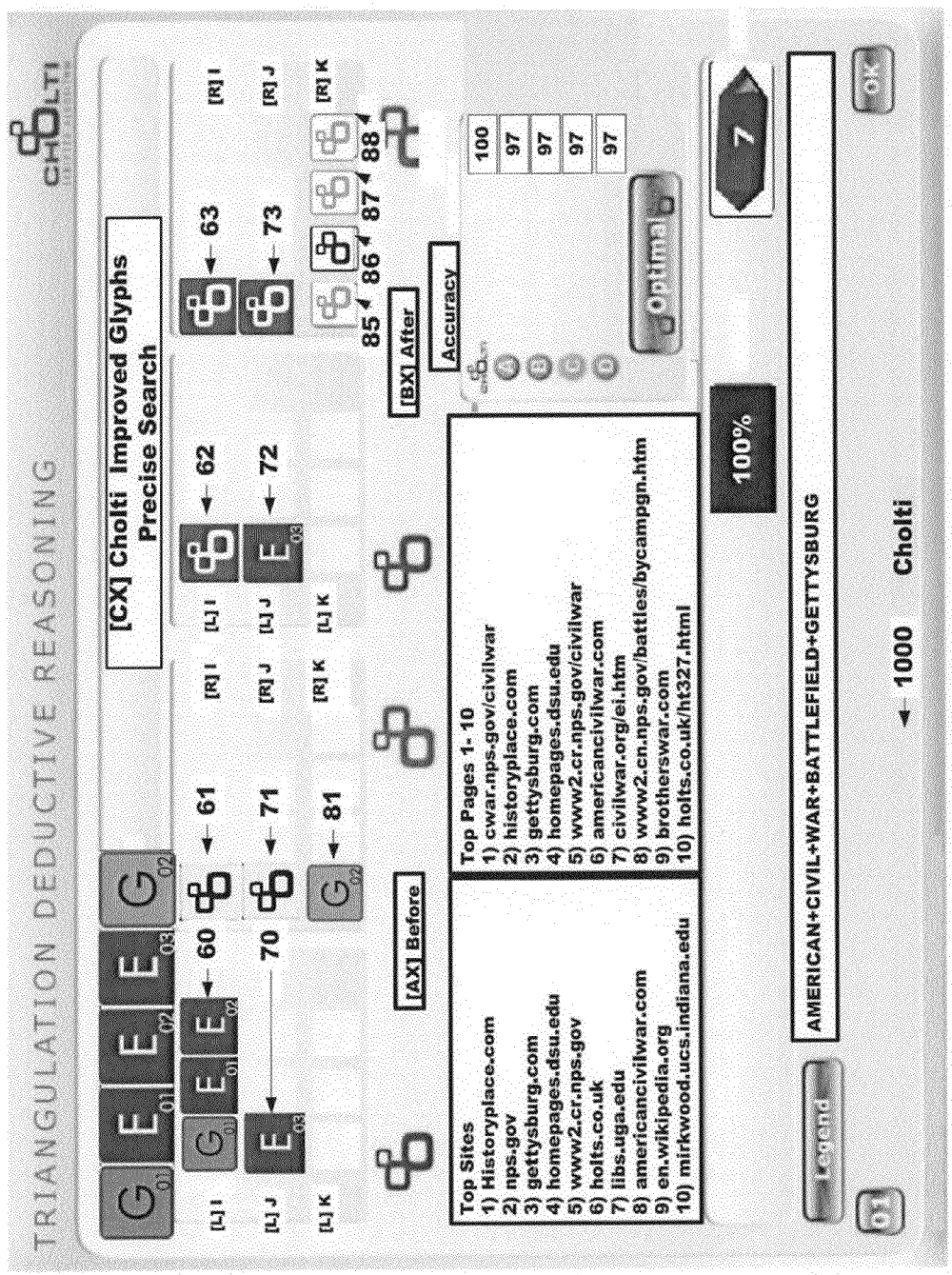
FIG. 15: Improved Glyphs.

FIG. 15 is a schematic representation of an Improved Glyph equation. Cholti (1000) converts Basic Glyphs into (60, 61, 70, 71, 80) Glyphs and then correlates both [AX] vague search and [BX] concise search using human understanding to optimal solve for the precise search "American Civil War Confederates Battlefield Gettysburg". Then deciphers the value of each precise search keyword and arranges it into an optimal search (62, 63, 72, 73, 85, 86, 87, 88) Glyph equation that yields the (740) Complex Pyramid that maps an optimal solution with 100 pages.

Figure 16:
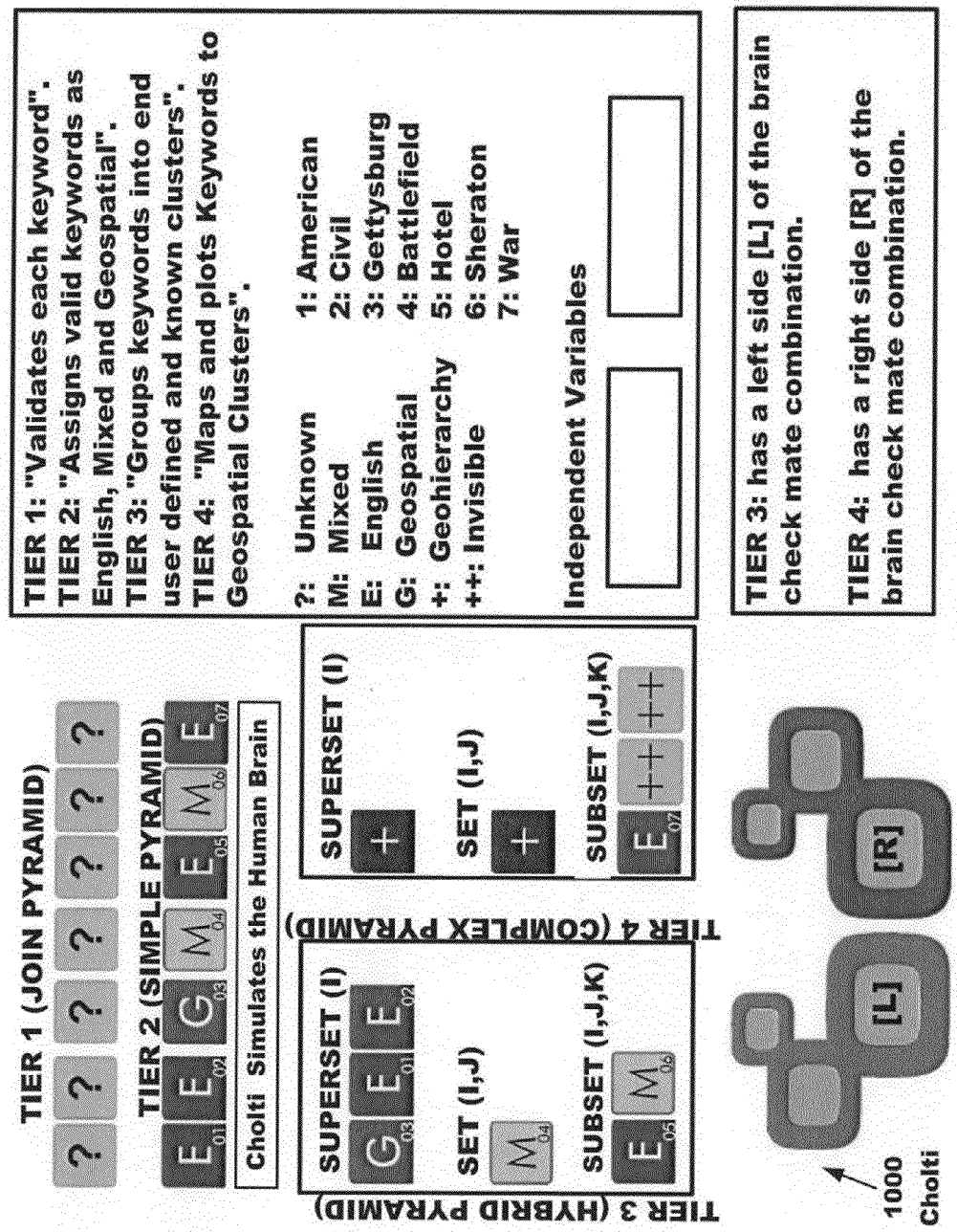
FIG. 16: Cholti Simulates the Human Brain.

FIG. 16 this diagram shows step by step how Cholti (1000) simulates the human brain.

Figure 17:
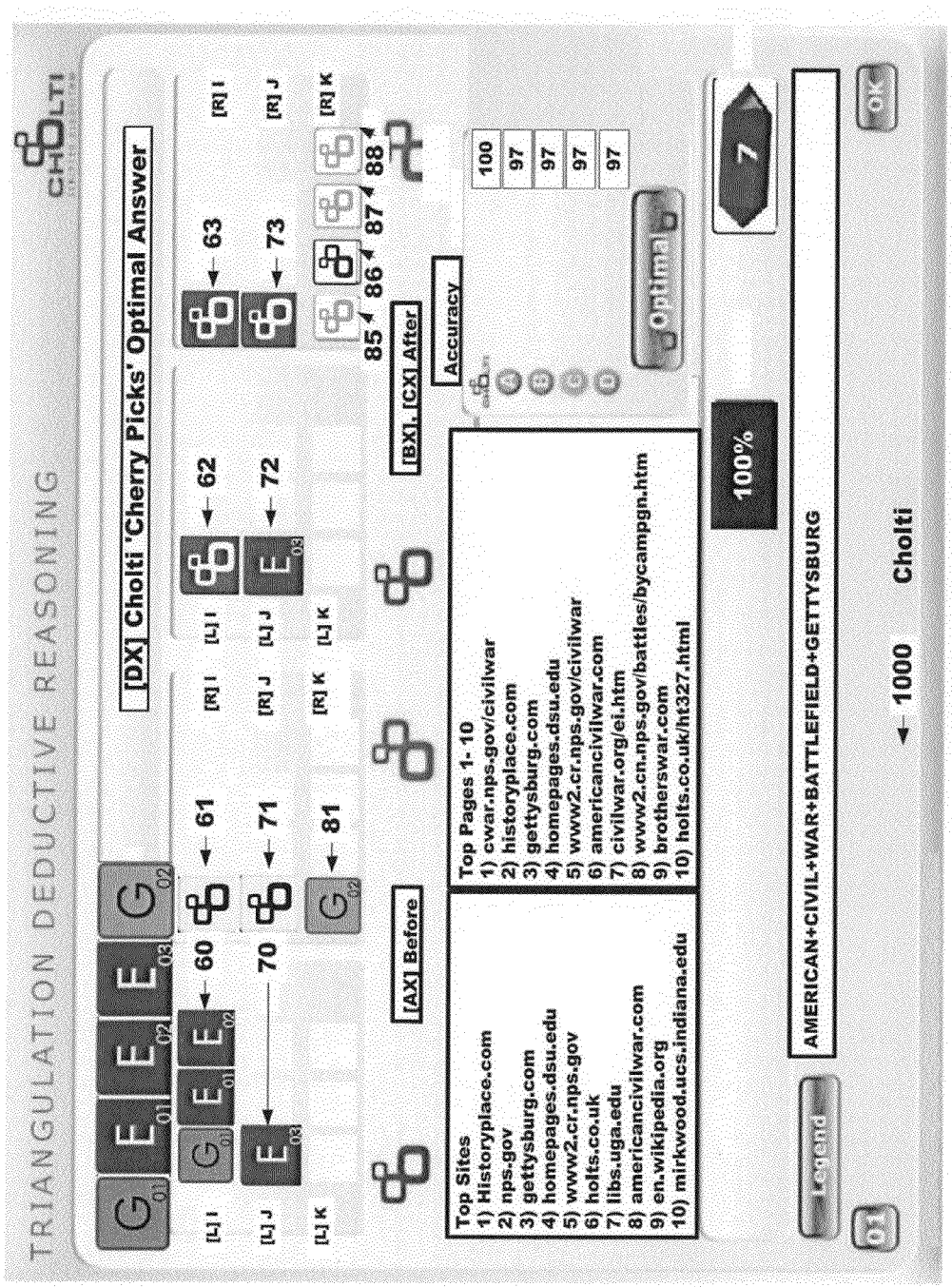
FIG. 17: Triangulation Deductive Reasoning Search.

FIG. 17 this is a diagram that illustrates Deductive Reasoning Search. The left side [AX] Boolean algebra vague search with keywords (60, 61, 70, 71, 81), and [BX] [CX] Deductive Reasoning precise search with Super Glyphs (62, 63, 72, 73, 85, 86, 87, 88) and independent variables (I)=(62), (X)=(63), (J)=(72), (Y)=(73) and (Z) (85, 86). This comparison highlights the differences between [AX] Boolean algebra vague searches using inductive reasoning based on the popularity score and [BX] [CX] precise searches based on deductive reasoning.

Figure 18:
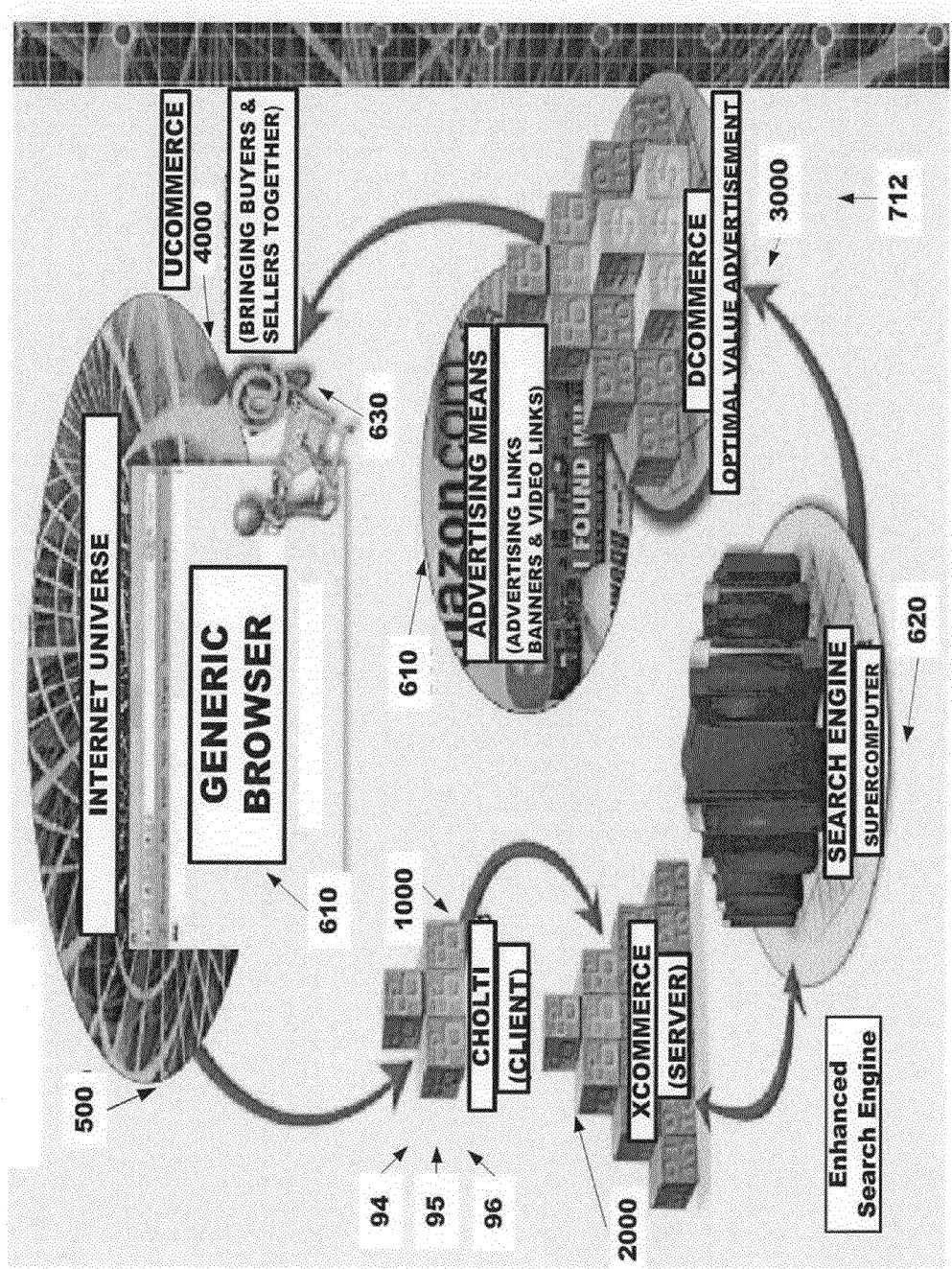
FIG. 18: Enhanced Search Engine.

FIG. 18 this is a diagram of Existing Technologies (Before). The system comprising multiple subsystems that scan, gather, distill, update and transform the information of the Internet environment (500) and is comprised of billions of web pages and continues to grow geometrically.

(600) Browser subsystem interacts with end user's to receive input in the form of keywords that in turn becomes a request. The request is forward chained to a (610) Search Engine subsystem uses eigenvectors valorization means based on quality, characteristic, positioning, and frequency of the keywords to derive using Boolean algebra the top (n) results that best fit match a particular request message and have the highest rank.

(620) Advertisement Means subsystem is comprised of advertiser's links, banners, and corporate videos that are the lion share of revenue of search engine companies, which identify the corporate characteristics of the top results based on the request message to maximize media value and create the optimal advertisement.

Best answers and the optimal advertisement are put together and become the response message that is rearward chained to the Browser subsystem and displayed as output.

The Browser subsystem alternatively may have (630) links to Shopping Cart technologies. Unfortunately, Search engine subsystems leave missed answers by oversimplifying the search tasks bypassing the meticulous and resource intensive processes of actually identifying, validating and verifying the top (n) responses.

This is a diagram of the parallel running real time Enhanced Search technologies (After) or (1000) Cholti Subsystems that converts an end user's requests into managerial hierarchical Glyphs that are statistical objects of each keyword and cluster and XCommerce (2000) Supercomputer simulates an existing inductive reasoning search engine.

Cholti (1000) subsystem creates the optimal Codex Page that best describes the end user's idea. XCommerce (2000) subsystem for each Codex Page stores an optimal pre processed Z_Price Bitmap data structure, which has a plurality of web pages comprising the best fit environment after filtering the Internet by figuring out the independent variables in a partial differential equation search process.

XCommerce (2000) determines if at least one Codex Page exists in its inventory that best represents the end user's request or search pattern as follows: if yes: immediately responds with the optimal top (n) responses it has in its inventory. If no: makes a search within its simulated virtual rendition of an existing Internet partition environment by means of the rules of Association, Relevance and Likelihood to create a new Codex Page and Z_Price Bitmap data structure. The Codex Page is stored with top (n) responses as output. The output is sent and displayed to the end user.

Maps the optimal solution using managerial hierarchical indices and Z_Price Bitmap data structure containing the (94, 95, 96) key featured associations belonging to the top (n) responses. Then reads and validates the actual content, and 'Cherry Picks' the optimal responses by performing exact match dynamic value comparisons of the Glyph equation.

DCommerce (3000) subsystems commercializes the search process with 'Optimal Valued Advertisement' that identifies the (712) Commercial Glyph that becomes independent variable (I).

UCommerce (4000) is the Shopping Cart means that brings buyers and sellers together, and helps the end user to get the best door to door product and service.

(1000), (2000), (3000) and (4000) working are the Enhanced Search technologies (After), that not only delivers the best (610) web browser and (600) search engine results, but also maximizes (620) advertisements revenues, and (630) shopping cart based revenues from the millions of end user's interacting with the search engine.

Thus (1000) simulates* (610), (2000) simulates* (600), (3000) simulates* (620) and (4000) simulates* (630) and incorporate their improvements working in parallel, without requiring the elimination of existing systems.

*Simulates: each Enhanced Search technologies (After) subsystem gathers, distills, analyzes, transforms, organizes, maps, and improves each message belonging to the corresponding existing system subsystem that it mimics.

7. Independent Variables

Figure 19:
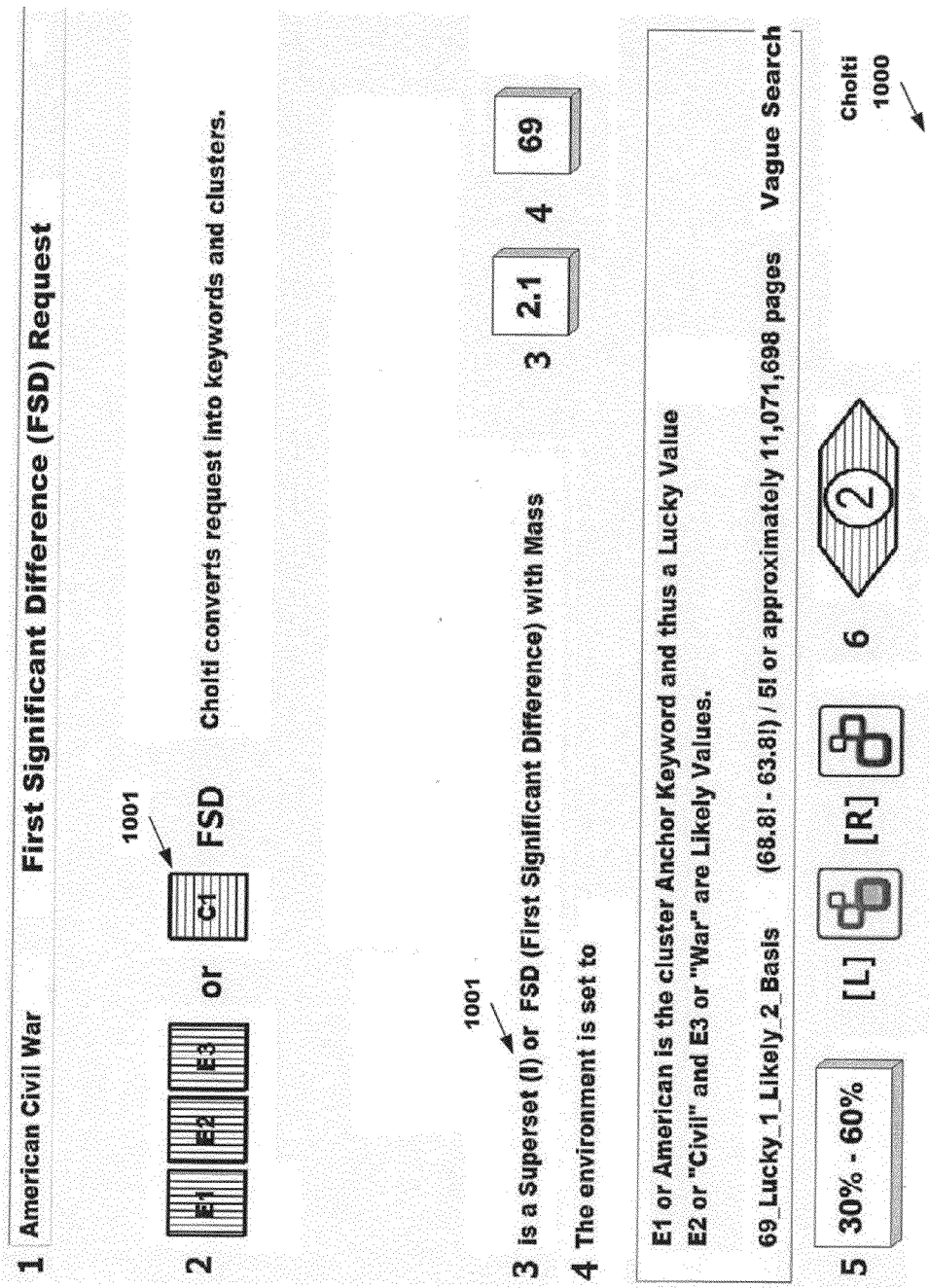
FIG. 19: Vague Search.

FIG. 19 is a diagram of a Vague Search or Superset(I). (1) End user types: "American Civil War". Cholti (1000) transforms request into a (2) vague search and maps E1 or American, E1 or Civil and E3 or War, and converts (E1+E2+E3) into cluster C1 or American Civil War. The vague search or Superset(I) has (3) a mass of 2.1 with FSD accuracy, expressed as (4) 69_Lucky_1_Likely_2 or (68.8!−63.8!)/5! or 11,071, 698 web pages, (5) accuracy is about 30% to 60%, and (6) quality is 2. (1001) E1 or American from C1 is the primary independent variable.

Figure 20:
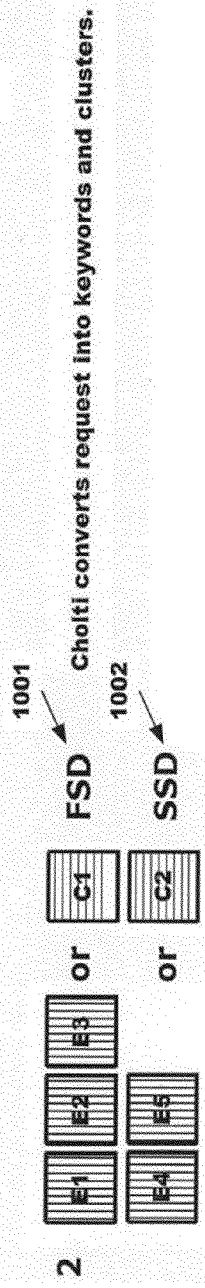
FIG. 20: Concise Search.
Figure 20:
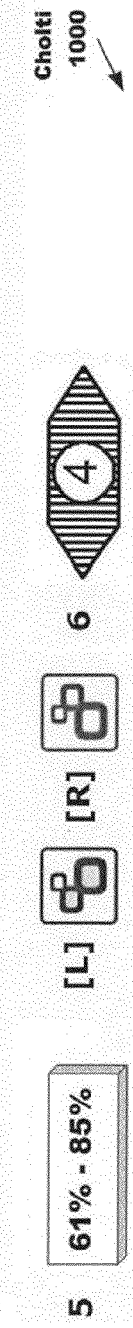

FIG. 20. is a diagram of a concise search or Set(I, J). (1) End user types: "American Civil War Historical Maps". Cholti (1000) transforms request into a (2) concise search and maps E1 or American, E2 or Civil, E3 or War, E4 or Historical, and E5 or Map, and converts keyword combinations or groups (E1+E2+E3) and (E4+E5) into clusters C1 or American Civil War and C2 or Historical Map.

The Concise Search or Set(I, J) has (3) a mass of 4.0 with SSD accuracy, expressed as (4) (48.7!−44.7!)/4! or 50_Lucky_2_Likely_3 or 206,570 web pages, (5) accuracy is about 61% to 85% and (6) quality is 4. Independent variables (I, J) or (1001, 1002) are E1 or American from C1 and E4 or Historical from C2.

Figure 21:
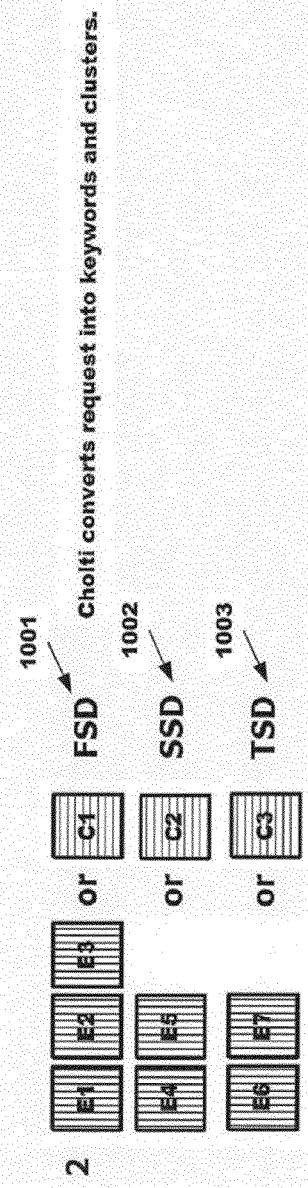
FIG. 21: Precise Search.

FIG. 21. is a diagram of a precise search or Subset(I, J, K): (1) End user types: "American Civil War Historical Maps Robert Lee". Cholti (1000) transforms request into a (2) precise search and maps E1 or American, E2 or Civil, E3 or War, E4 or Historical, E5 or Map, E6 or Robert and E7 or Lee, and converts (E1+E2+E3), (E4+E5) and (E6+E7) into clusters C1 or American Civil War, C2 or Historical Map and C3 or Robert Lee.

The Levels of Significant Difference are directly related to independent variables (I, J, K) contained within a search. The precise search or Subset(I, J, K) (3) has a mass of 5.5 with TSD accuracy, (4) expressed as (31.6!−28.6!)/3! or 35_Lucky_3_Likely_4 or 4,770 web pages, (5) accuracy is about 86% to 95%, (6) quality is 5. The independent variables (I, J, K) or (1001, 1002, 1003) are E1 or American from C1, E4 or Historical from C2, and E7 or Lee from C3

Figure 22:
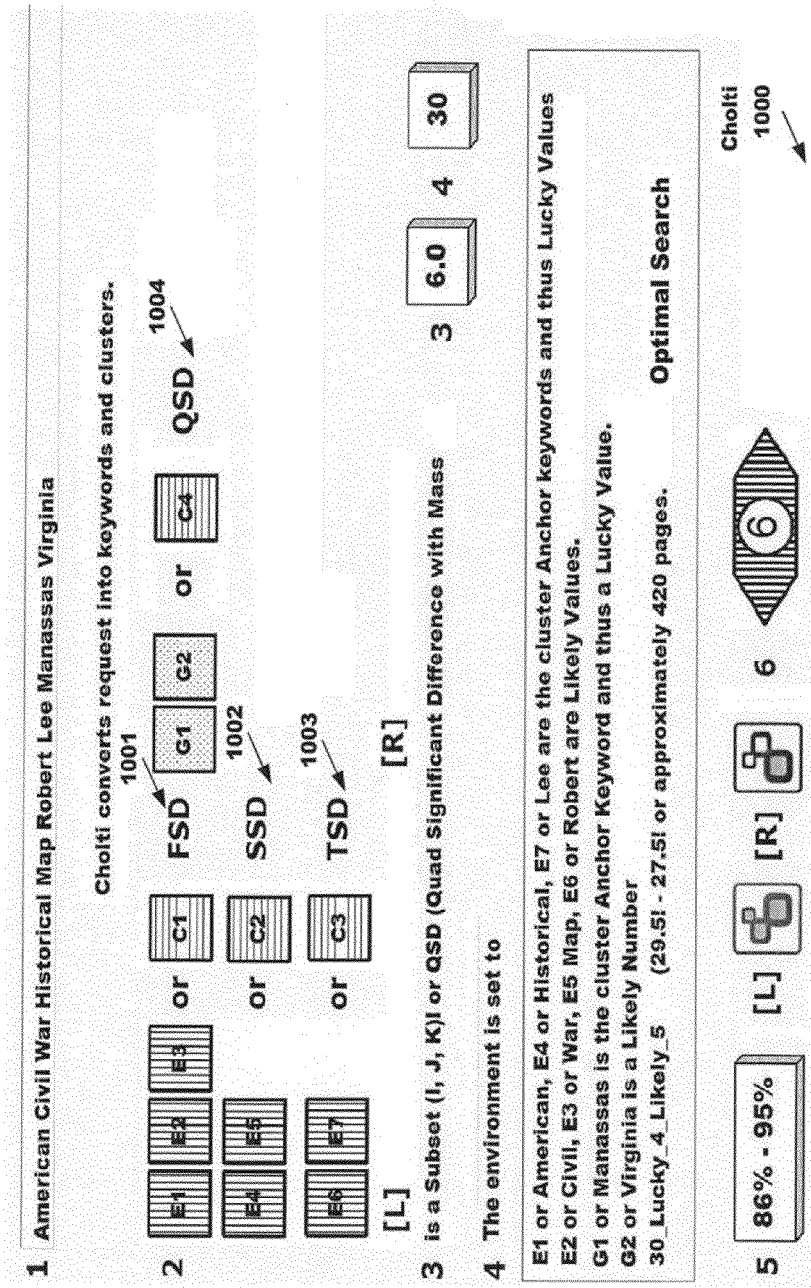
FIG. 22: Optimal Search.

FIG. 22 is a diagram of an optimal search or Subset(I, J, K)! check mate combination. (1) End user types the following: "American Civil War Historical Maps Robert Lee Manassas Va.". Cholti (1000) transforms request into an (2) optimal search and maps E1 or American, E2 or Civil, E3 or War, E4 or Historical, E5 or Map, E6 or Robert, E7 or Lee, G1 or Manassas, and G2 or Virginia and converts (E1+E2+E3), (E4+E5), (E6+E7) and (G1+G2) into clusters C1 or American Civil War, C2 or Historical Map, C3 or Robert. Lee and C4 or Manassas Va.

(1004) (X) is a geospatial independent variable. Optimal Searches or Subset(I, J, K)! or (3) have a mass of 6.0 with QSD accuracy, (4) expressed as 30_Lucky_4_Likely_5 or (25.2!−23.2!)/2! or 420 web pages, (5) accuracy is about 86% to 95%, (6) quality is 6. (X) or (!) is a right side and (I, J, K) is a left side of the brain check mate combination.

Figure 23:
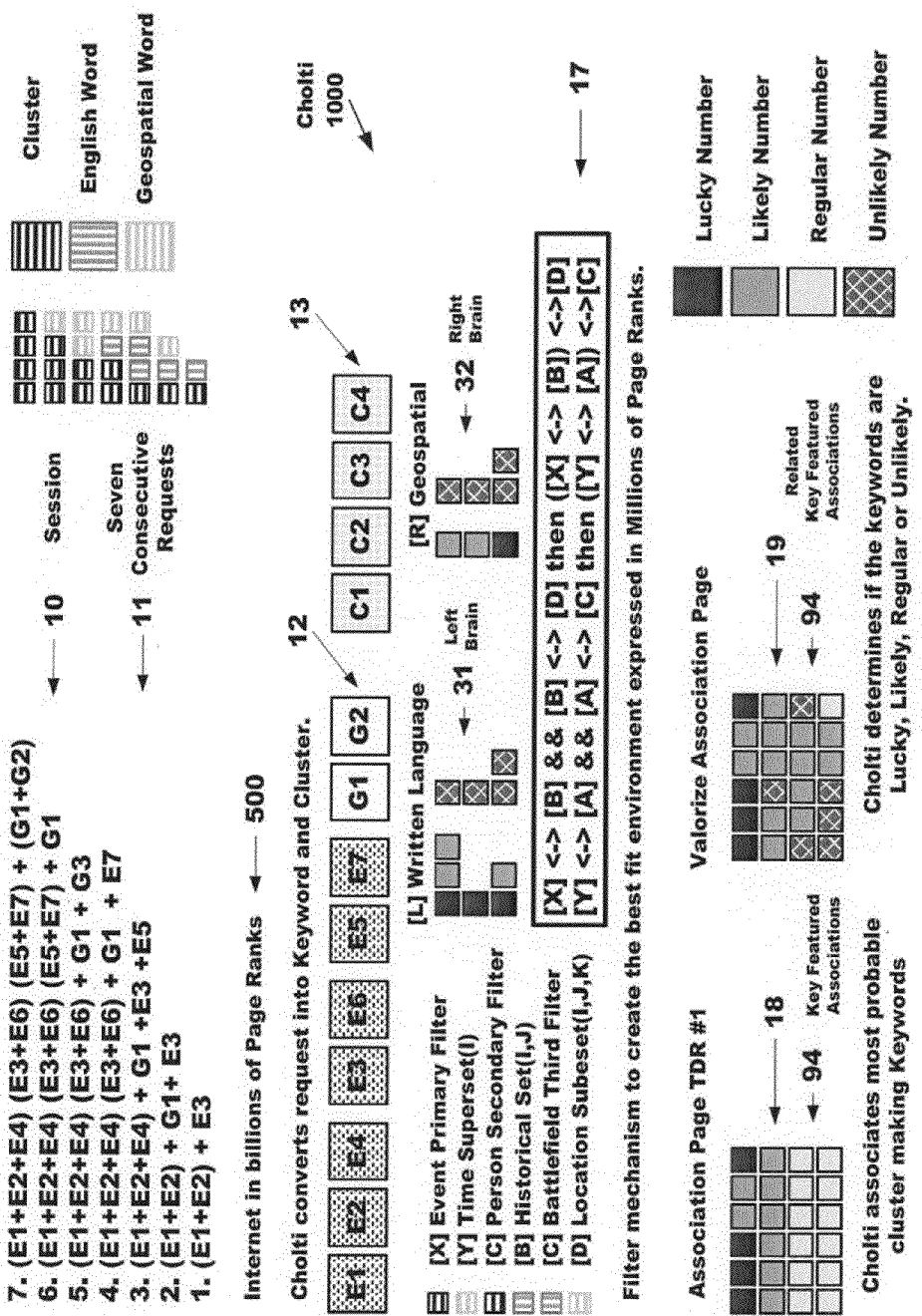
FIG. 23: Super Glyph Relationships.

FIG. 23. is a diagram of Super Glyph relationships. Session (10) has 7 consecutive requests (11) as follows: a) (E1+E2)+E3, b) (E1+E2)+G1+E3, c) (E1+E2+E4)+G1+E3+d) (E1+E2+E4)+(E3+E6)+G1+E7, e) (E1+E2+E4)+(E3+E6)+G1+G3, f) (E1+E2+E4)+(E3+E6)+(E5+E7)+G1, g) (E1+E2+E4)+(E3+E6)+(E5+E7)+(C1+G2). (12) The simulated keywords are transformed into E1. E2, E3, E4, E5, E6, E7, C1, G2 and G3, and (13) then grouped into clusters C1 or (E1+E2+E4), C2 or (E3+E6), C3 or (E5+E7), and C4 or (G1+G2). The (500) Internet environment or (U) has billions of web pages. Cholti (1000) $1^{st}$ assigns linguistic and geospatial keywords into a Managerial Hierarchical Relationship Indices that are filters as follows:

American Civil War or (I) is the primary index, which is an event and is directly linked with (X)—time dimension. E.g. American Civil War {"1863"}. Historical Battle or (J) is the secondary index, which is a person and is directly linked with (Y)—historical person. E.g. General {"Robert E Lee"}. (K) is the tertiary index, which is a battlefield that is direct related with (Z)—geographic location. (3a): E.g. Historical Battle {"Gettysburg"}.

$2^{nd}$ uses (17) set theory to determine if the different Glyphs are associated. (3b): E.g. (I) is related to (X) that is also related to Gettysburg. E.g. 1863 is related to Historical Leader that is directly related with Gettysburg, the historical battle. (31) is the Left Brain analysis, and (32) is the Right Brain analysis to find checkmate combinations.

$3^{rd}$ uses (18) deductive reasoning to associate the top (94) key featured associations related to (31) and (32), which is a filter mechanism to map the improved environment with 1,000,000 of web pages.

4th (19) reorganizes the session and match/merges (31) and (32) and then valorizes each Super Glyph representing keywords and clusters for the given session and determines if they are independent or dependent variables.

8. Significant Difference Levels

Figure 24:
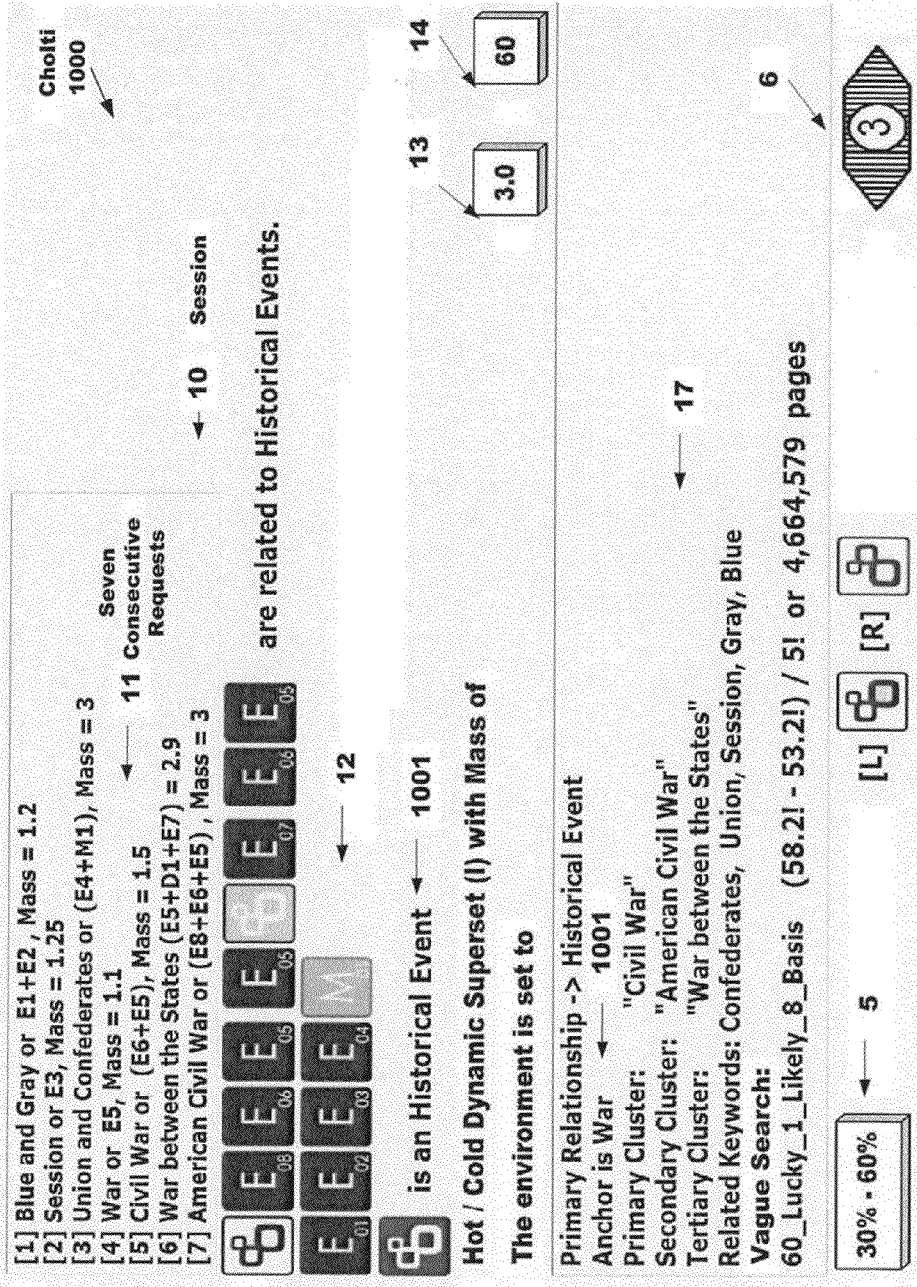
FIG. 24: Vague Session.

FIG. 24 is a diagram of a Vague Session. (10) End user types 7 consecutive requests. a) Blue and Gray, b) Session, c) Union and Confederates, d) War, e) Civil War, f) War between the States, g) American Civil War. Cholti (1000) creates a (11) vague session and maps E1 or Blue, E2 or Gray, E3 or Session, E4 or Union, M1 or Confederates, E5 or War, E6 or Civil, E7 or States, E5 or American. Groups (E6+E5), (E5+D1+E7) and (E8+E6+E5) into clusters C1 or Civil War, C2 or War between the States, and C3 or American Civil War and converts (C1, C2, C3) into Cx, Cy, Cz and (17) determines that Cx, Cy and Cz are directly related to the category Historical Events{ }.

Superset(I) or vague session (13) has a mass of 3.0 with FSD accuracy, (14) expressed as (58.2!−53.2!)/5! or 60_Lucky_1_Likely_8 or 4,664,579 web pages, (5) accuracy percentage is about 30% to 60%, and (6) quality is 3. (1001) E5 or War from Cx, is the independent variable (I)

Figure 25:
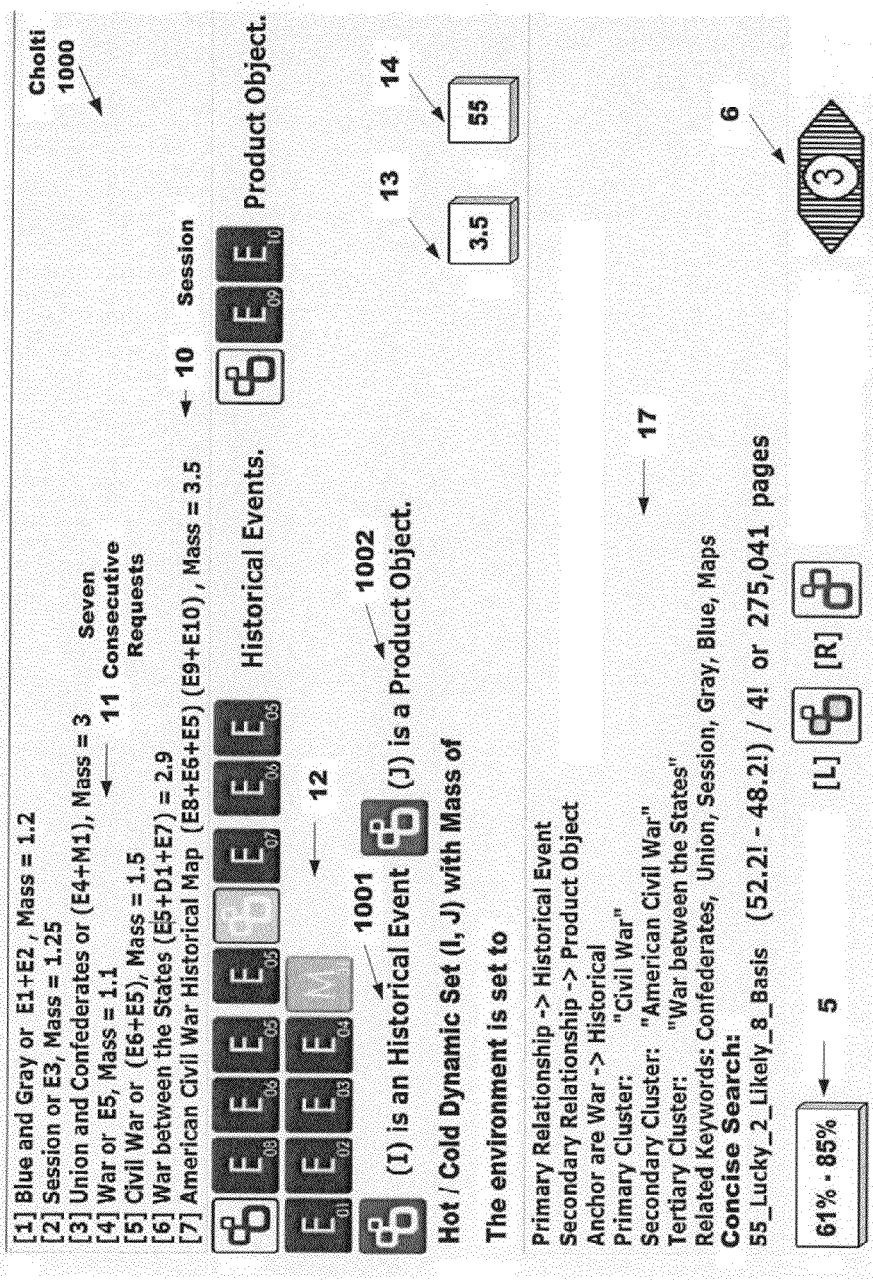
FIG. 25: Concise Session.

FIG. 25 is a diagram of a Concise Session. (10) End user types 7 consecutive requests (11) in a concise session: a) Blue and Gray, b) Session, c) Union and Confederates, d) War, e) Civil War, f) War between the States, g) American Civil War Historical Maps. Cholti (1000) creates a (11) concise session and maps E1 or Blue, E2 or Gray, E3 or Session, E4 or Union, M1 or Confederates, E5 or War, E6 or Civil, E7 or States, E9 or Historical, and E10 or Maps.

Groups (E6+E5), (E5+D1+E7), (E8+E6+E5), (E9+E10) into clusters C1 or Civil War, C2 or War between the States, C3 or American Civil War and C4 or Historical Maps and converts (C1, C2, C3) into Cx, Cy, Cz, and C4 into Ca, and (17) determines that Cx, Cy and Cz are directly related to the category Historical Events{ }, and Ca into Product Object{ }.

Figure 26:
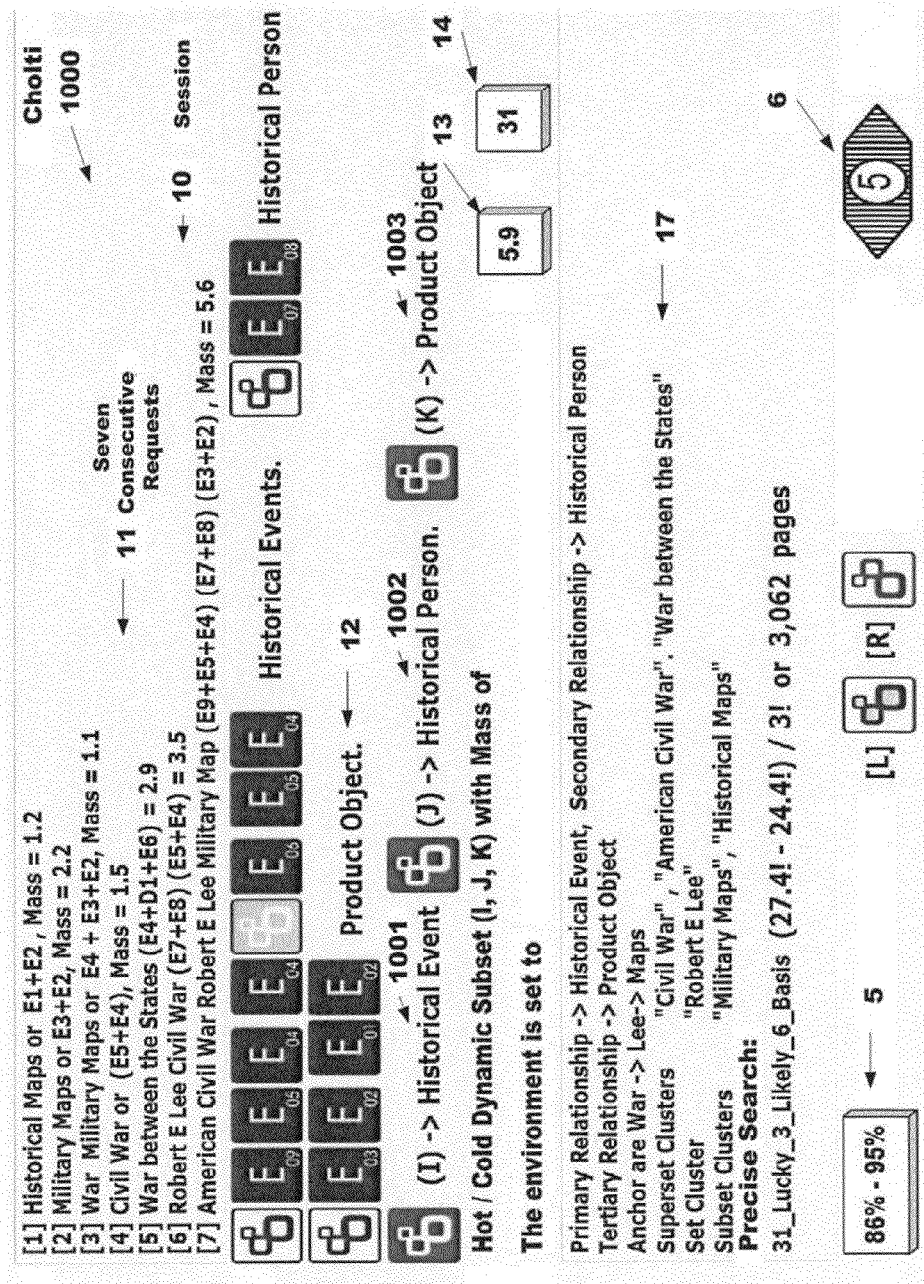
FIG. 26: Precise Session.

Set(I, J) or Concise Session (13) has a mass of 3.5 with SSD accuracy, (14) expressed as: (52.2!−48.2!)/4! or 55_Lucky_2_Likely_8, or 275,041 web pages, (5) accuracy is about 61% to 85%, (6) quality is 3. (1001, 1002) are the independent variables (I, J) expressed as E5 or War from Cx and (1002) E9 or Historical from Ca FIG. 26 is a diagram of a Precise Session. (10) End user types 7 consecutive requests, (11) in a precise session: a) Historical Maps, b) Military Maps, c) War Military Maps, d) Civil War, e) War between the States, f) Robert E Lee Civil War and g) American Civil War Robert E Lee Military Maps. Cholti (1000) creates a (11) precise session and maps E1 or Historical, E2 or Maps, E3 or Military, E4 or War, E5 or Civil, E6 or States, E7 or Robert, E8 or Lee, and E9 or American.

Groups (E5+E4), (E4+E6), (E9+E5+E4), (E1+E2), (E3+E2) and (E7+E8) into clusters C1 or Civil War, C2 or War between the States, C3 or American Civil War, C4 or Historical Maps, C5 or Military Maps, C6 or Robert E Lee and converts (C1, C2, C3) into (Cx, Cy, Cz), (C4, C5) into (Ca, Cb) and C6 into Cc and (17) determines that Cx, Cy and Cz are directly related to the category Historical Events{ }, (Ca, Cb) into Product Object{ } and Cc into Historical Person{ }.

Subset(I, J, K) or Precise Session (13) has a mass of 5.9 with TSD accuracy, (14) expressed as (27.4!−24.4!)/3! or 31_Lucky_3_Likely_6 or 3,062 pages, (5) accuracy is about 86% to 95%, and (6) quality is 5. (1001, 1002, 1003) are the independent variables (I, J, K) expressed as: E5 or War from Cx, E5 or Lee from Cc and E6 or Military from Cb.

Figure 27:
FIG. 27: Optimal Session.

FIG. 27 is a diagram of an Optimal Session. (10) 7 consecutive requests (11) comprising an optimal session as follows: a) Historical Maps, b) Military Maps, c) War Military Maps, d) Civil War, e) War between the States, f) Robert E Lee, g) American Civil War Robert E Lee Military Map Gettysburg. Using deductive reasoning solves the missing gaps of information G2 or USA, G3 or Pennsylvania and or G4 Zip Code ranges. Cholti (1000) creates a (11) optimal session and maps E1 or Historical, E2 or Maps, E3 or Military, E9 or War, E5 or Civil, E6 or States, E7 or Robert, E8 or Lee, E9 or American and G1 or Gettysburg.

Groups (E5+E4), (E4+E6), (E9+E5+E4), (E1+E2), (E3+E2), (E7+E8) and G1 into clusters C1 or Civil War, C2 or War between the States, C3 or American Civil War, C4 or Historical Maps, C5 or Military Maps, C6 or Robert E Lee and G1 or Gettysburg and then converts (C1, C2, C3) into (Cx, Cy, Cz), (C4, C5) into (Ca, Cb), C6 into Cc. Expands geospatial data and converts C7 into Cd or (G2+G3+(G1|G4)) or USA Pennsylvania (Gettysburg|Zip Code Ranges) and (17) determines that Cx, Cy and Cz are directly related to the category Historical Events{ }, (Ca, Cb) into Product Object{ }, Cc into Historical Person{ } and Cd into geospatial data{ }.

An event is two directly related independent variables that are merged as one. Subset(I, J, K)! or optimal session or Subset(I, J, K)!, (13) has a mass of 6.5 with QSD accuracy, (14) expressed as 25_Lucky_4_Likely_8 or (20.2!−18.2!)/2! or 194 web pages, (5) accuracy is about 96% to 99% and (6) quality is 6. (1001, 1002, 1003, 1004) independent variable (I, J, K)! are expressed as: E5 or War from Cx, E5 or Lee from Cc, E6 or Military from Cb and G1 or Gettysburg belonging to Cd. Cholti (1000) integrates the directly related (1004) (I+X) independent variables into Event(I!).

(1004) Events can be expanded, thus, Historical Event {Cx|Cy|Cz}+geographic {Cd} yields Historical Battle {Gettysburg}. Since Historical Battle is comprised of Cx, Cy and Cz then American Civil War {Gettysburg}, Civil War {Gettysburg} and War between the States {Gettysburg} are valid.

9. Dynamic Values that Exceed Traditional Limits

Figure 28:
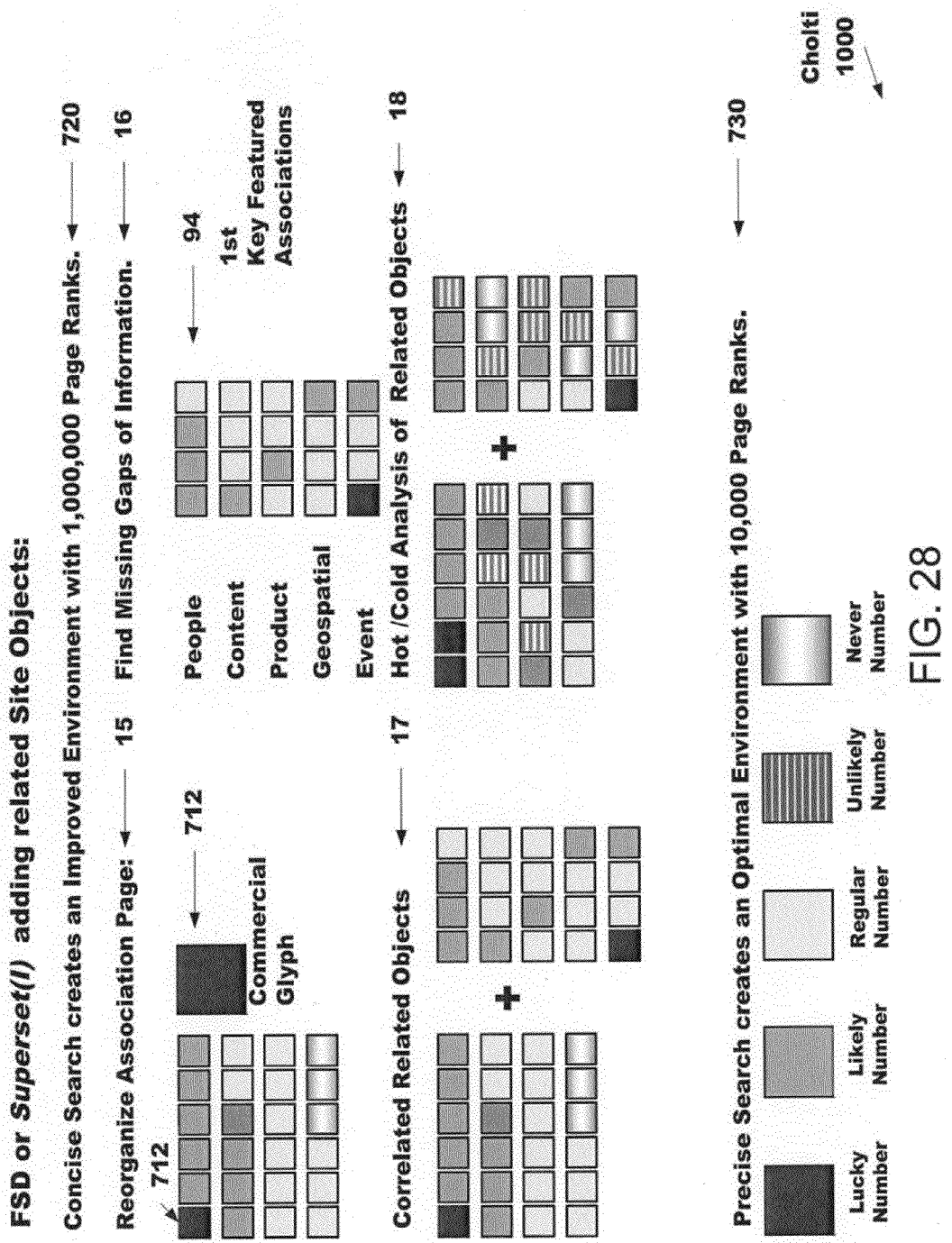
FIG. 28: Relevance Analysis.

FIG. 28 is a diagram of the Relevance Analysis steps and procedures. Cholti (1000) create a (720) Simple Pyramid or Block with 1,000,000 web pages using in particular (712) the Commercial Glyph. Reorganizes (15) the Association page and maps objects to each independent variables. Finds the (94) key featured associations and (16) missing gaps of information. Creates the (730) Hybrid Pyramid with 10,000 pages. Match/merges the existing Super Glyphs (17) to improve the Informational Certainty of the session and adds (18) Related Objects to the Glyph equation.

Figure 29:
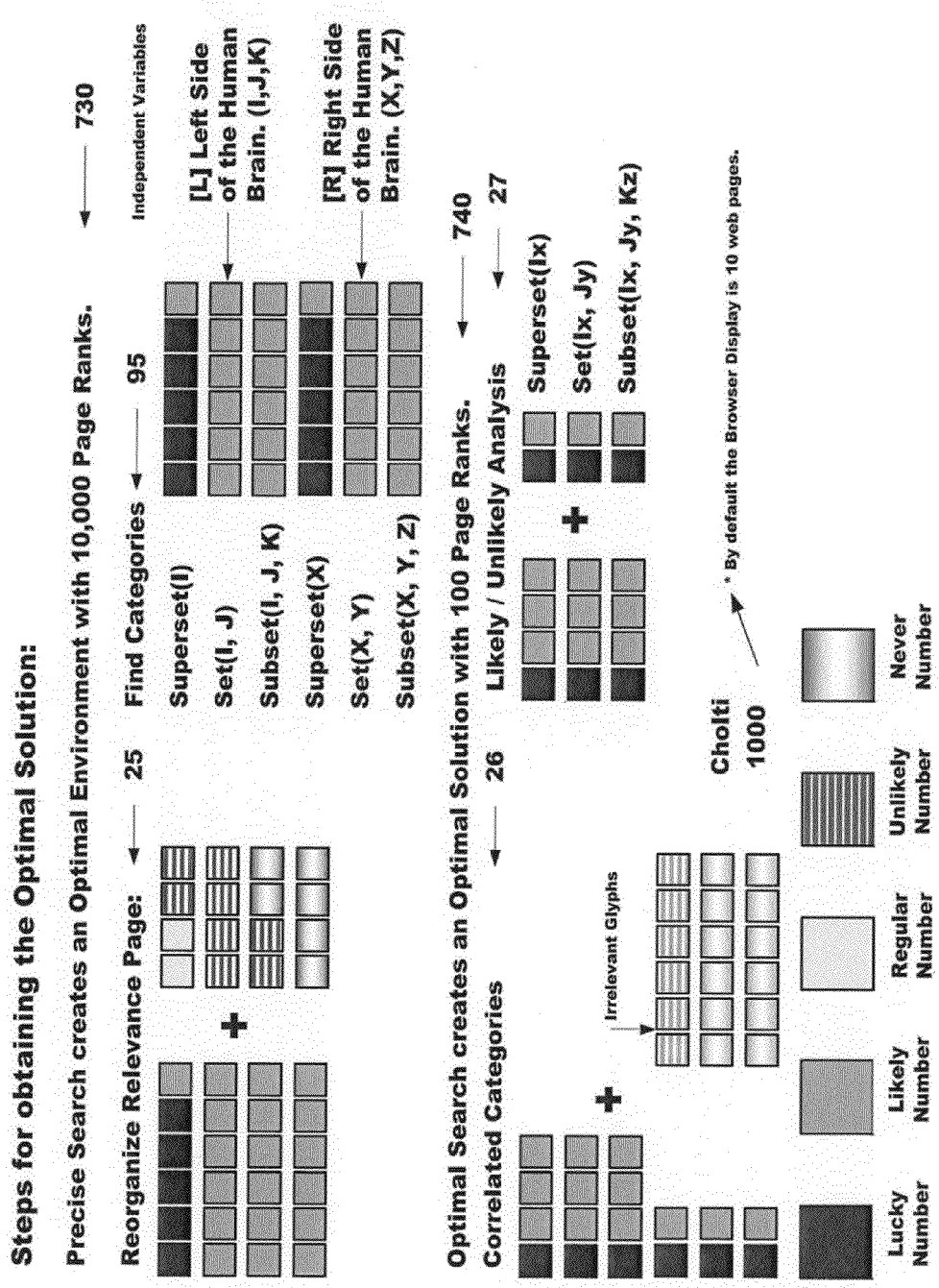
FIG. 29: Likelihood Analysis.

FIG. 29 is a diagram of the Likelihood Analysis steps and procedures. Cholti (1000) to create a (730) Hybrid Pyramid or Sub Block with 10,000 web pages. Reorganizes the Relevance Analysis page (25), adds (95) key featured associations. 3rd maps each object from Sub Block to the independent variables. Assigns and (26) maps Glyphs to categories and Events. Performs Likely/Unlikely Analysis (27) of Categories and Events to create the (740) Complex Pyramid or Mini Block that map an optimal solution with 100 web pages.

10. Content Value Final Step

Figure 30:
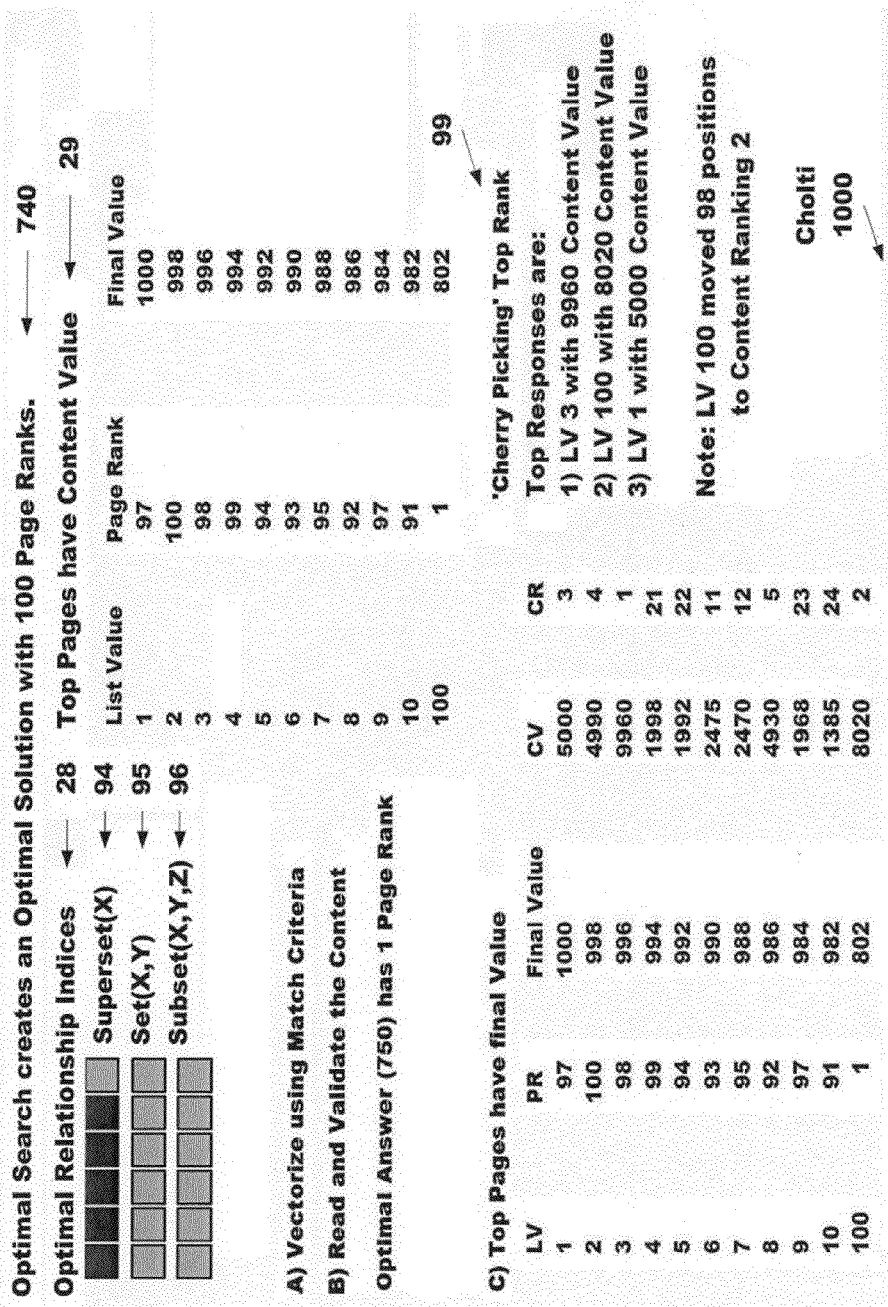
FIG. 30: Cherry Picking Process.

FIG. 30 is a diagram of the 'Cherry Picking' process used by Cholti (1000) to create the (740) Complex Pyramid or Mini Block that maps an optimal solution with 100 web pages. Assigns and maps Glyphs to categories (28), adds (94, 95, 96) key featured associations. Determines the Boolean algebra popularity value based on inductive reasoning of each page. (a) Vector each page of the Mini Block. (b) Validates the content of each page and (c) assigns final value.

Performs exact match comparisons (29) to measure the content value of each web page against the optimal Relationship Indices and assigns a final score. Selects the top best content pages. In this example only web pages (3 and 100)

have an exact match with the independent variable (I, J, K) Glyphs and (94, 95, 96) key featured associations.

11. Z_Price Bitmaps

Figure 31:
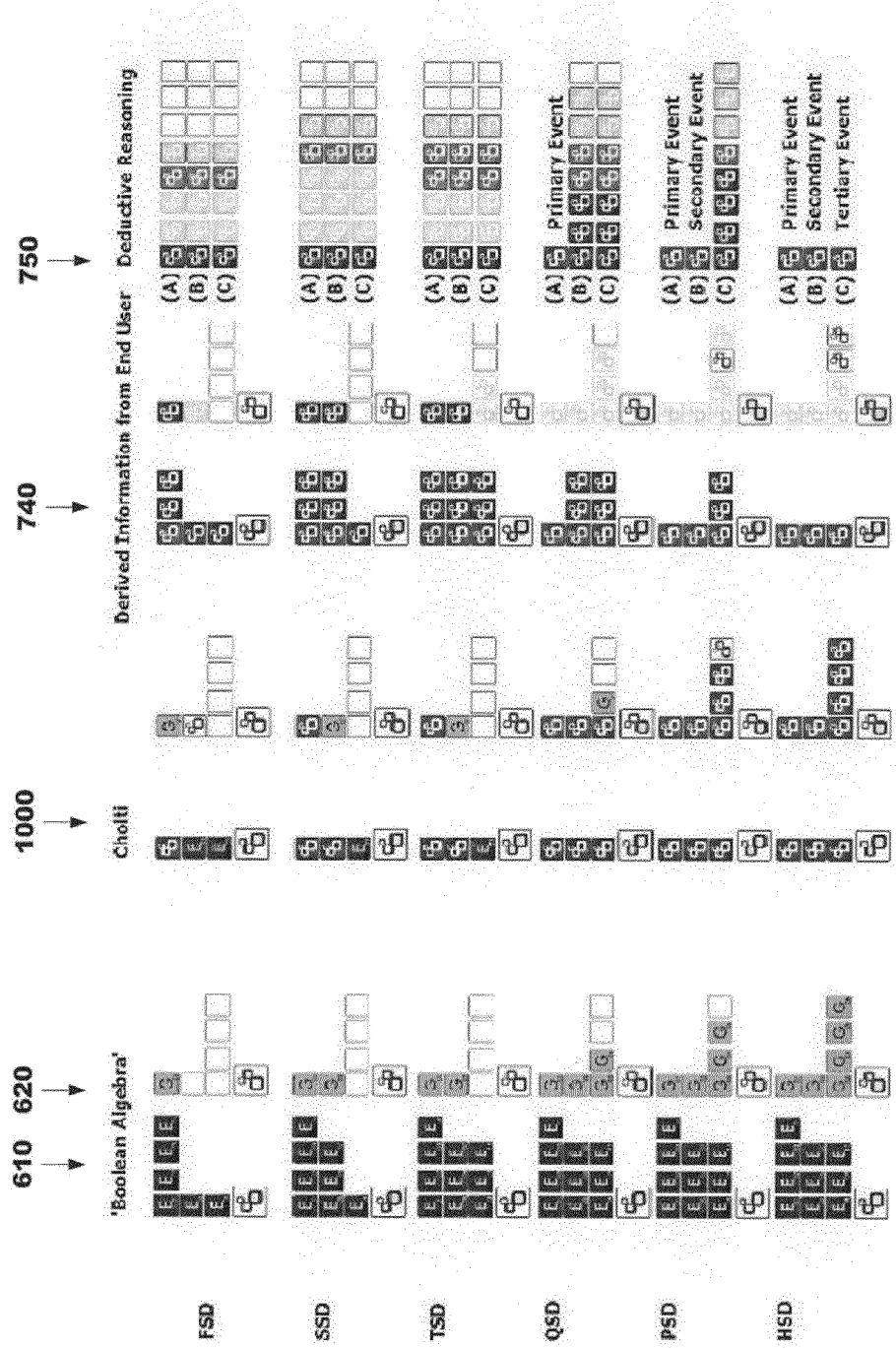
FIG. 31: Block Matrix comparison of Z_Price Bitmaps.

FIG. 31 is a diagram of a block matrix comparison of Z_Price Bitmaps. $1^{st}$ column: (610, 620) Boolean algebra or Existing Technologies shows different Basic Glyphs combinations based on the independent variables from 1 to 6.

$2^{nd}$ column: shows arrangements of different Improved Glyphs combinations based on the independent variables from 1 to 6. Cholti (1000) expands Super Glyphs related to a particular request by identifying missing gaps of information, and nesting directly related clusters and keywords.

$3^{rd}$ column: Codex shows arrangements of the different combinations of Codex Search Pages based on the independent variables from 1 to 6. The arrangement shows combinations after performing the steps of: a) Association, b) Relevance and c) Likelihood to plot precise searches that map an (740) optimal solution to forge an idea fashioned pattern.

$4^{th}$ column: Comparative Analysis between Boolean algebra, Cholti and Codex. Codex improves over [AX] and [BX] by plotting optimal searches and sessions, then associates independent variables to categories, maps relevant Glyphs to Events, and uses probabilities to find the (750) optimal answer. Then valorizes Super Glyphs based on their proximity to the independent variables within the actual content as human do when reading/scanning through web pages.

12. Human Brain Search Model

Figure 32:
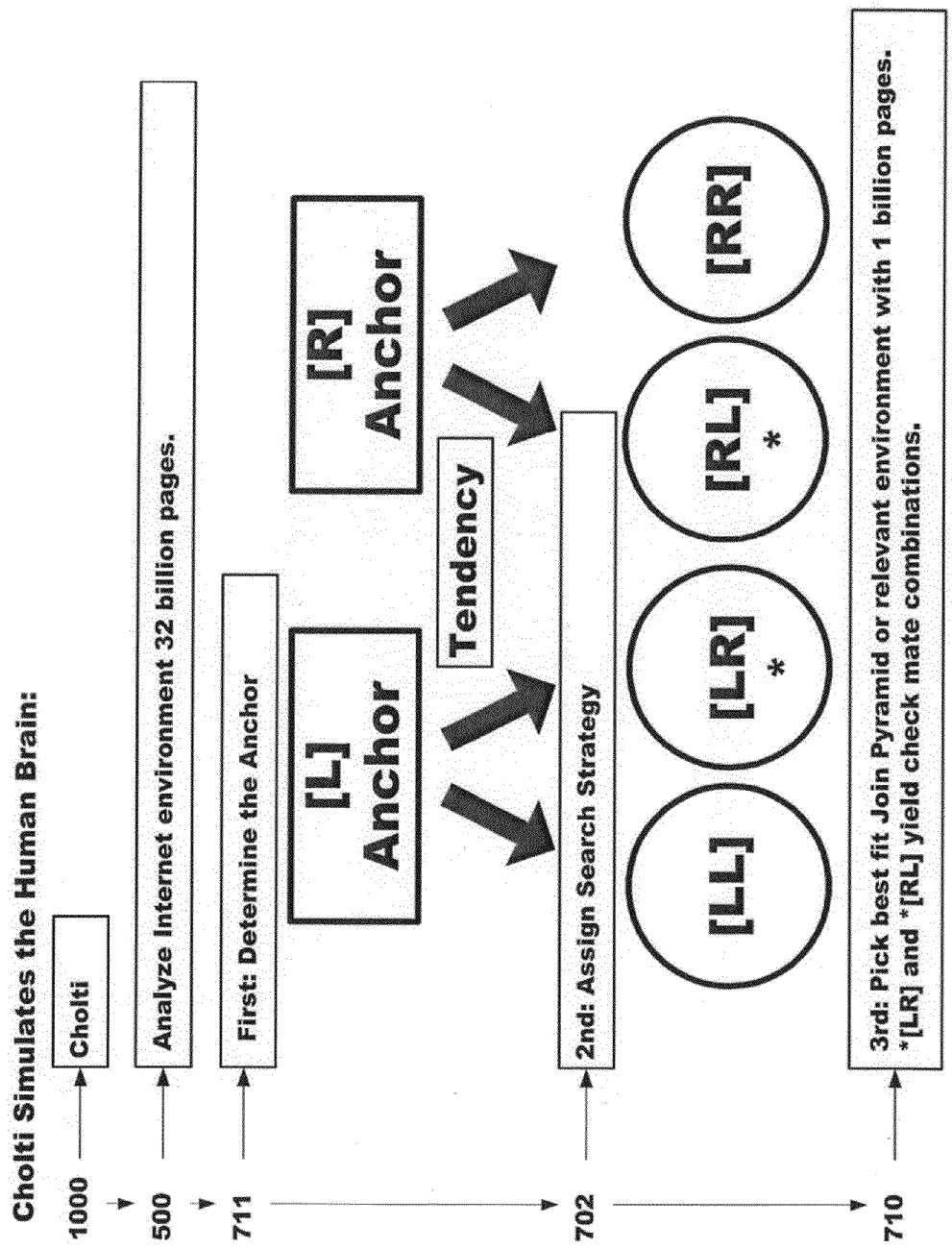
FIG. 32: Cholti simulates the human brain.

FIG. 32 is a diagram that shows how Cholti (1000) simulates the human brain. Each linguistic Glyph is assigned to the [L] left side of the brain and each geospatial Glyph is assigned to the [R] right side of the brain. The Anchor is the session broadest common denominator. The (711) Anchor Glyph and the Dominant Tendency of each request is given a [L] linguistic or [R] geospatial tendency, and then Cholti (1000) maps and plots the Glyphs to create a Managerial Hierarchical Relationship Index and picks for each vague search or session one of four (702) Search Strategies: [LL], [LR]. [RL], and [RR], which have different set of business rules to analyze the (500) Internet environment and creates the (710) Join Pyramid that maps a relevant environment with 1 billion web pages.

Figure 33:
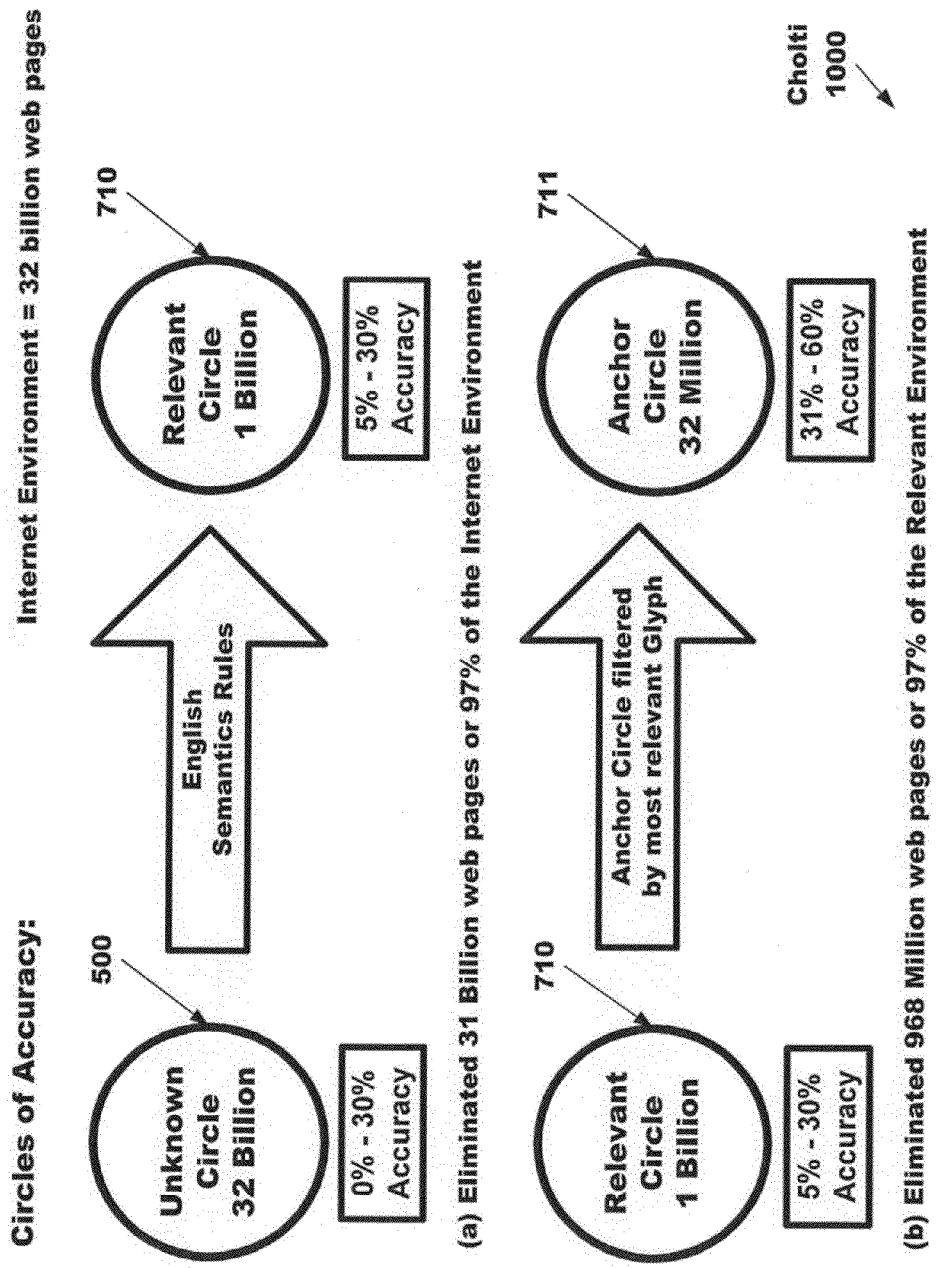
FIG. 33: Circles of Accuracy.

FIG. 33 is a diagram that describes the Circles of Accuracy. Circle of accuracy are different level of informational certainty that give human knowledge to Cholti (1000) as follows: Creates the (710) Join Pyramid that maps a relevant environment with 1 billion web pages and binds the final destination within a vague search that eliminates the exponential rate of growth of the Internet. Determines the Point of Origin by selecting the session's significant Glyphs that improves the search and filters the relevant environment with the (711) Anchor Glyph to plot the Point of Origin that maps 32 million web pages from which all calculations using the lowest informational certainty level.

Figure 34:
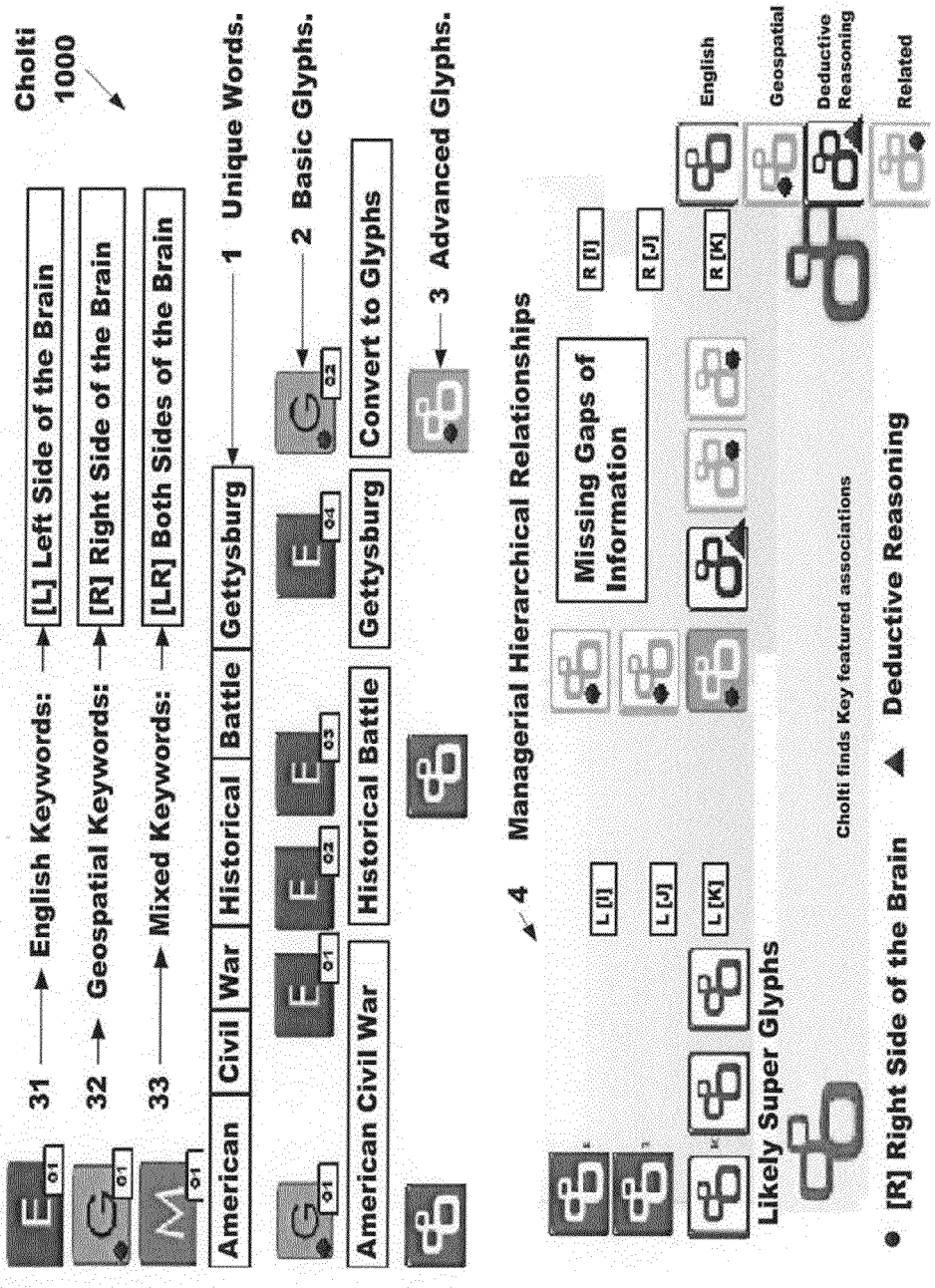
FIG. 34: Cholti uses both sides of the brain to represent an idea.

FIG. 34 is a diagram of how the Human Brain Search model uses both side of the brain. (1) Unique words are converted into (2) Basic Glyphs there are three types of Basic Glyphs (E) English, (G) Geospatial, (M) Mixed. (31) (E) English are assigned to the [L] Left Side of the Brain, (32) (G) Geospatial to the [R] Right Side of the Brain, and (33) (M) Mixed to both sides. Cholti (1000) converts the Basic Glyph vague search into (3) Advanced Glyph concise search and then (4) rearranges Glyphs into Managerial Hierarchical Relationship Indices to create precise and optimal searches.

Figure 35:
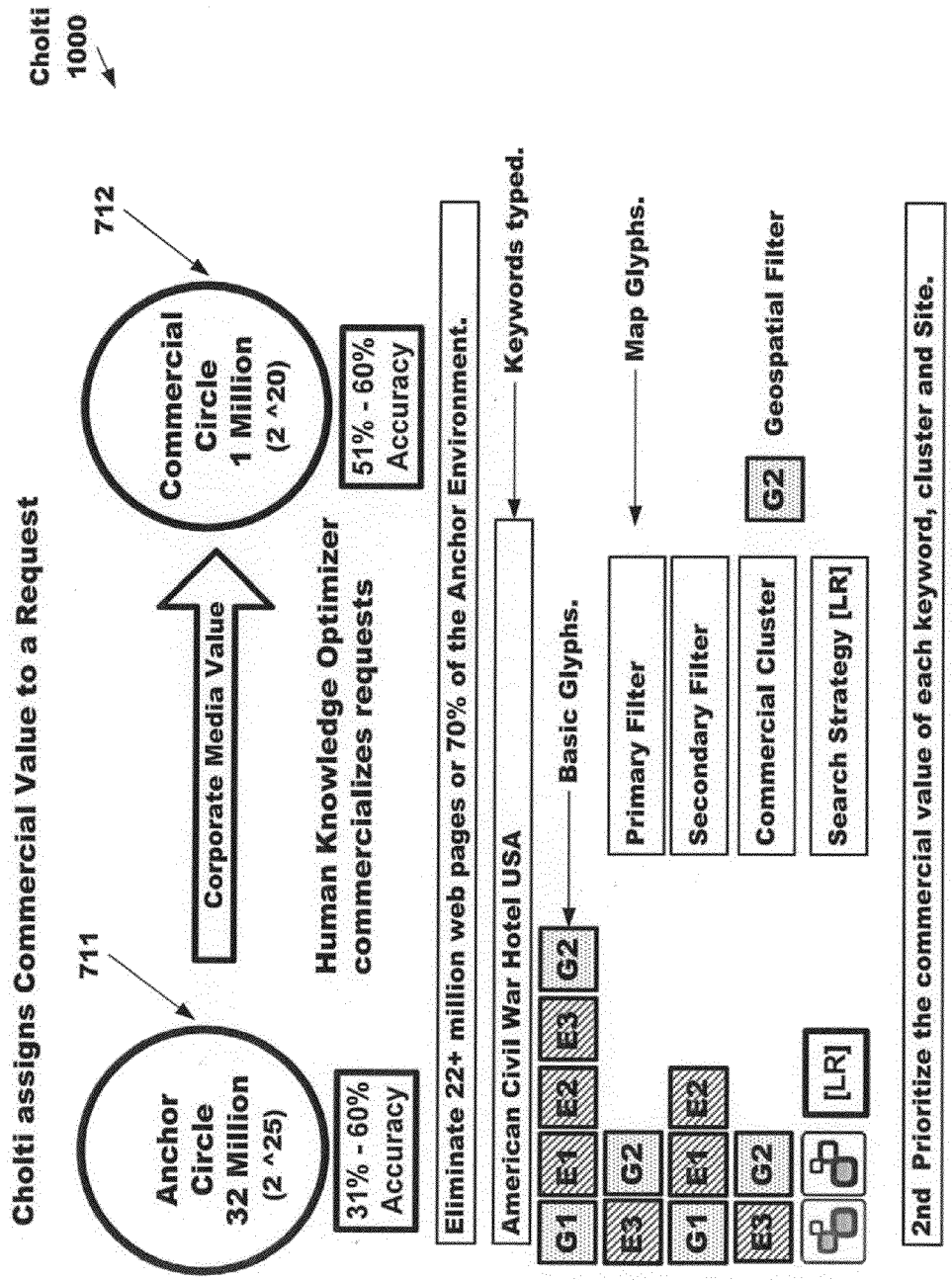
FIG. 35: Cholti commercializes a request.

FIG. 35 is a diagram that shows how Cholti (1000) commercializes a request by recalculating from FIG. 34 the (711) Anchor Circle environment by emphasizing the (712) commercial Glyph to set and maps a new Point of origin with 8,000,000 web pages! The Basic Glyphs Equation uses Super Site (a, b, c) values to prioritize Glyphs having the highest corporate media value in order to commercialize the process.

Figure 36:
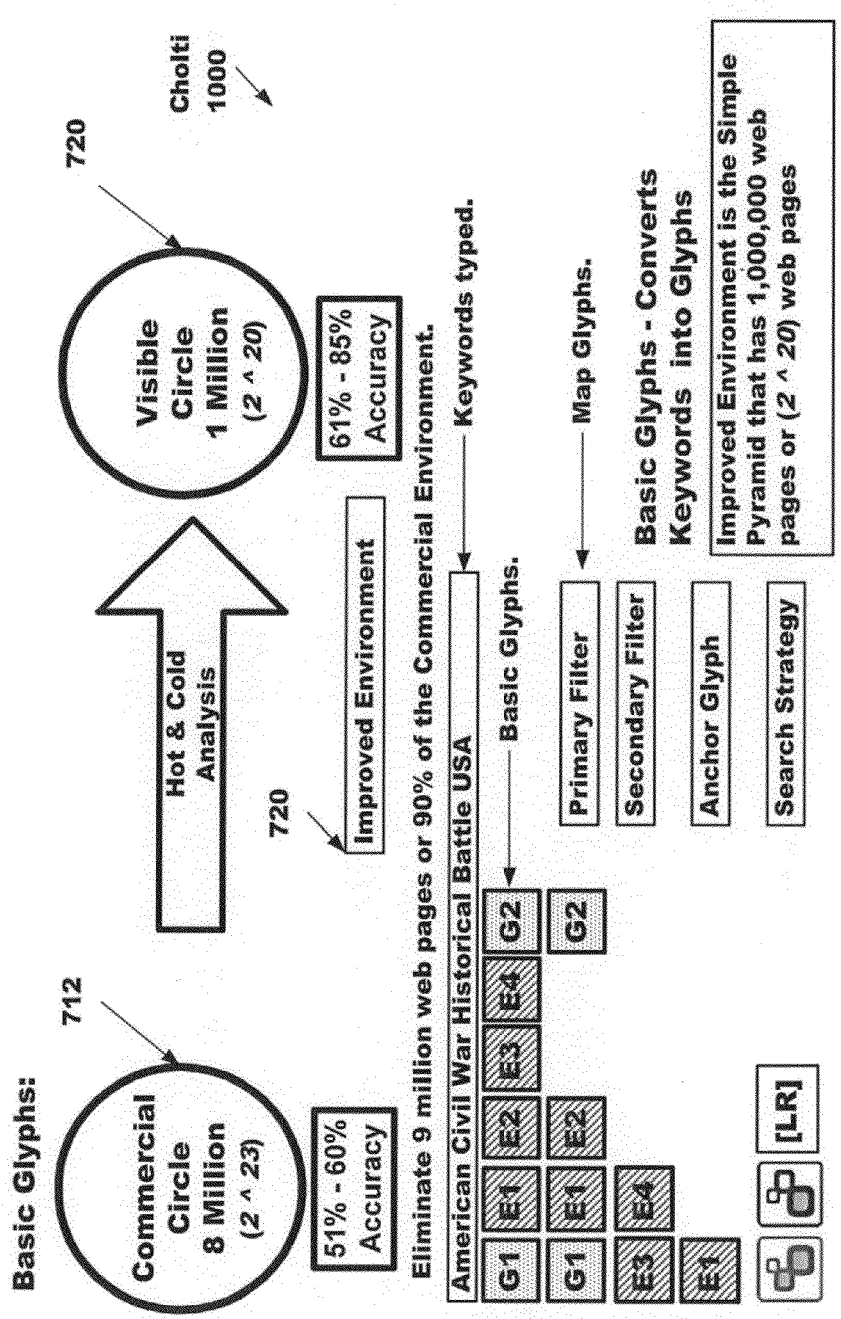
FIG. 36: [AX] Basic Glyphs Overview.

FIG. 36 is a diagram of an [AX] Basic Glyphs Overview. The $1^{st}$ step of Triangulation Deductive Reasoning is to transform requests into vague searches and sessions by reorganizing the static request into Basic Glyphs and use the vector values to create the (720) Simple Pyramids with average informational certainty level. Cholti (1000) replaces confounding elements of the [AX] Basic Glyph equation, such as Zero Clusters and replaces them with more relevant valued Glyphs.

Figure 37:
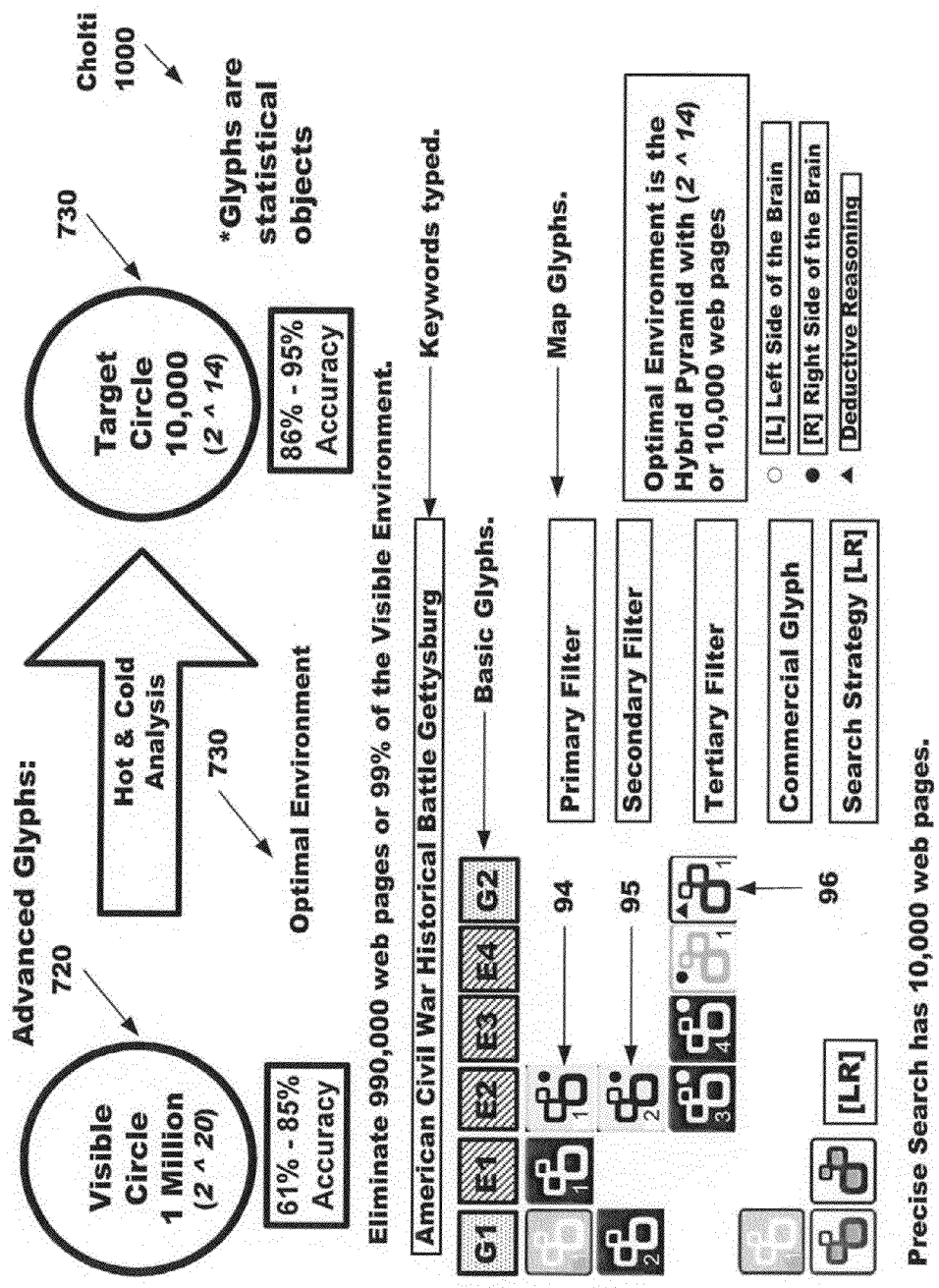
FIG. 37: [BX] Advanced Glyphs Overview.

FIG. 37 is a diagram of an [BX] Advanced Glyphs Overview. Cholti (1000) distills and analyzes concise searches and sessions, and vectors the top Sites and Pages of the (720) Simple Pyramid. The $2^{nd}$ step of TDR plots (94, 95, 96) key featured associations and logically finds Missing Gaps of Information and fills [L] and [R] brain managerial hierarchy to complete Advanced Glyph Equation that creates the (730) Hybrid Pyramid that maps an optimal environment with 10,000 web pages that has good informational certainty level.

Figure 38:
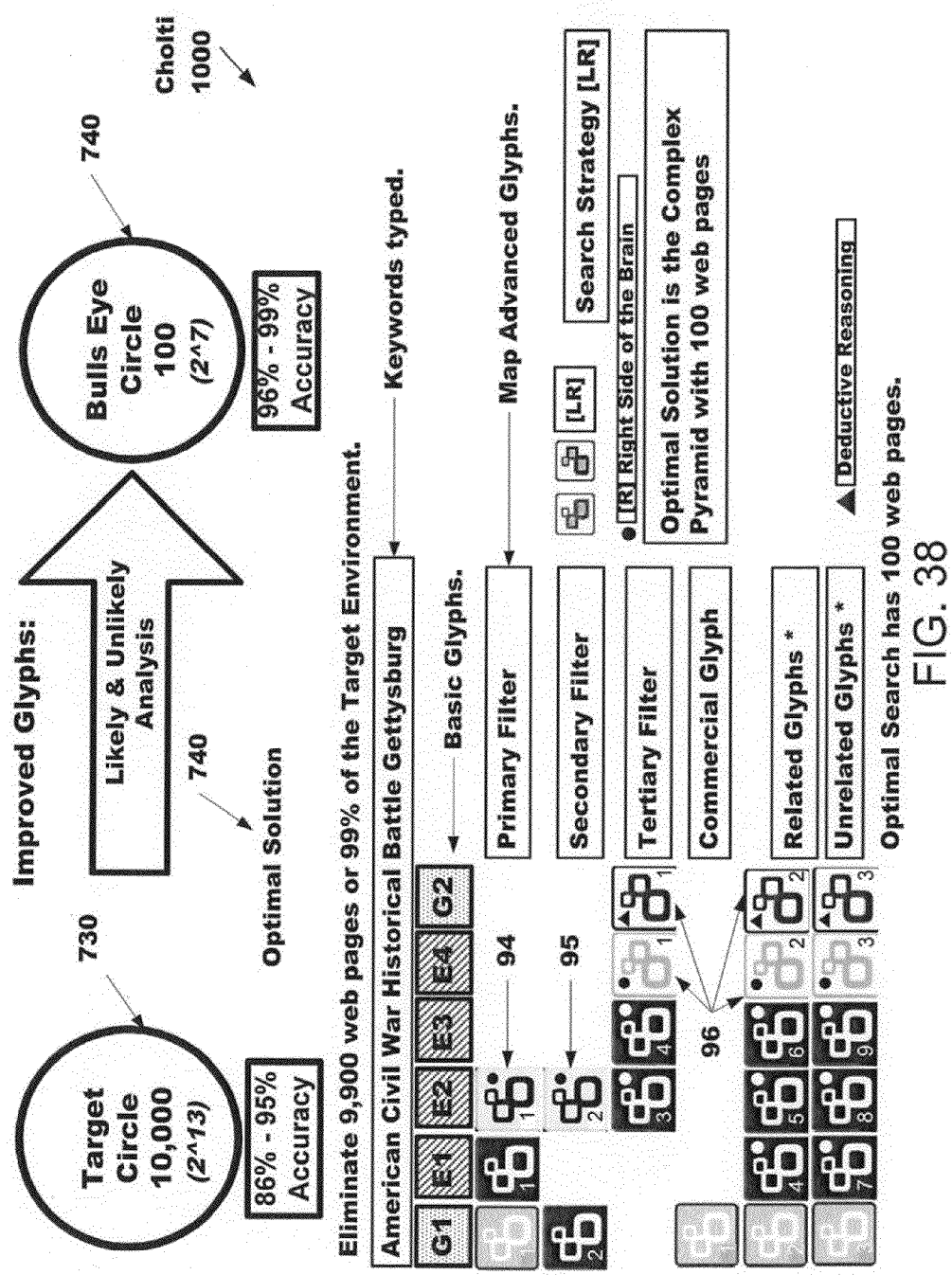
FIG. 38: [CX] Improved Glyphs Overview.

FIG. 38 is a diagram of an [CX] Improved Glyphs Overview. The 3rd step of TDR is the Likely/Unlikely Analysis that quantifies each precise search and session link by probabilistically weighing related (94, 95, 96) key featured associations and unrelated English and Geospatial Glyphs to complete the Improved Glyph Equation that yields the (740) Complex Pyramid that maps an optimal solution with 100 web pages and has a precise informational certainty level.

Figure 39:
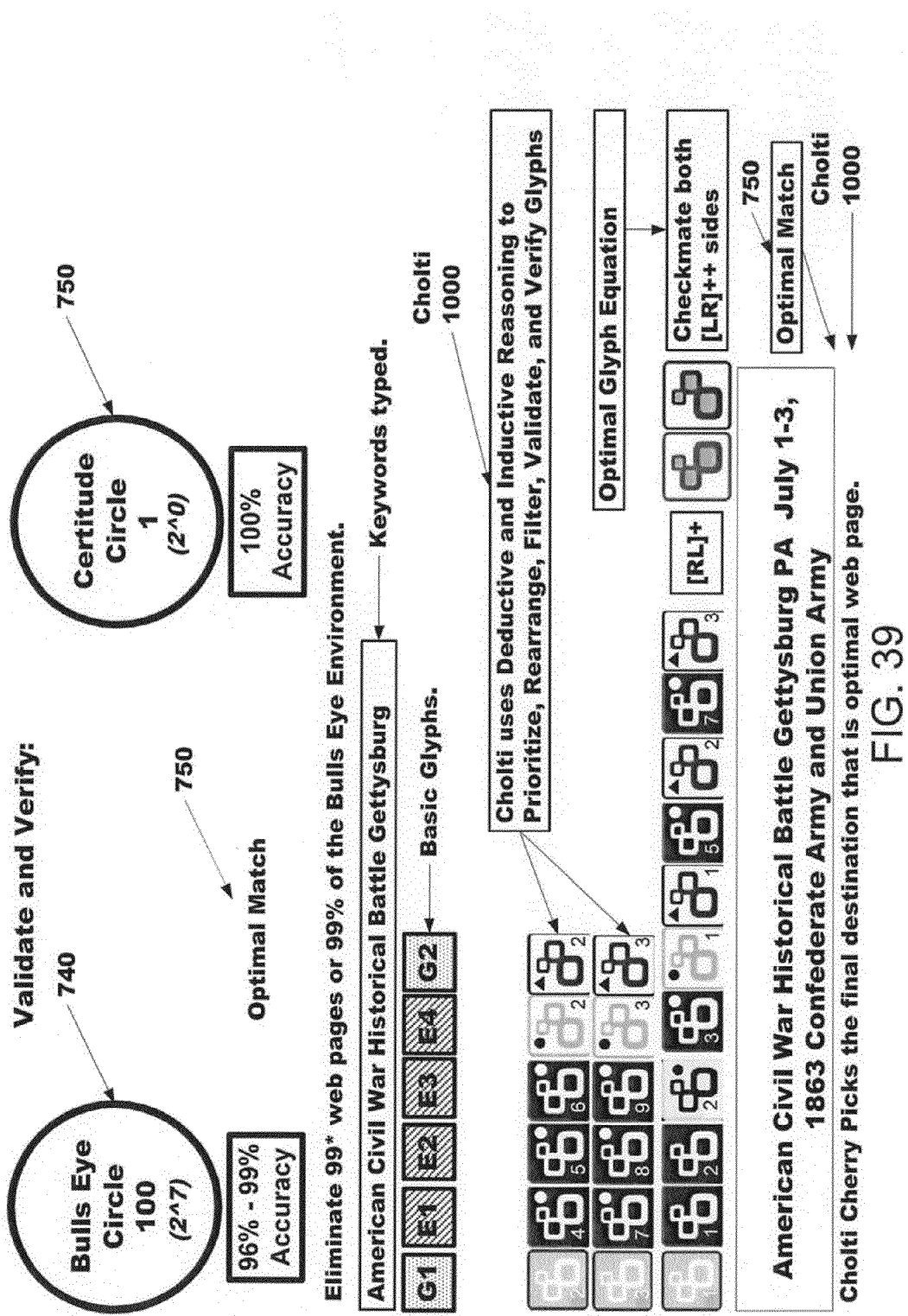
FIG. 39: [DX] Cherry Picking Process Overview.

FIG. 39 is a diagram of an [DX] Optimal Glyphs Overview. The 'Cherry picking' process parses, validates and verifies each word, sentence, paragraph, and page belonging to the (740) Complex Pyramid that maps an optimal solution and identifies the (750) Optimal Pyramid and has highest informational certainty level. This process uses the latest dynamic keyword values of the request to compare both inductive and deductive reasoning as if reading in behalf of the end user and then figures out with the highest informational certainty level of accuracy the (750) optimal answer or final destination.

13. Point of Origin Based on Technology

Figure 40:
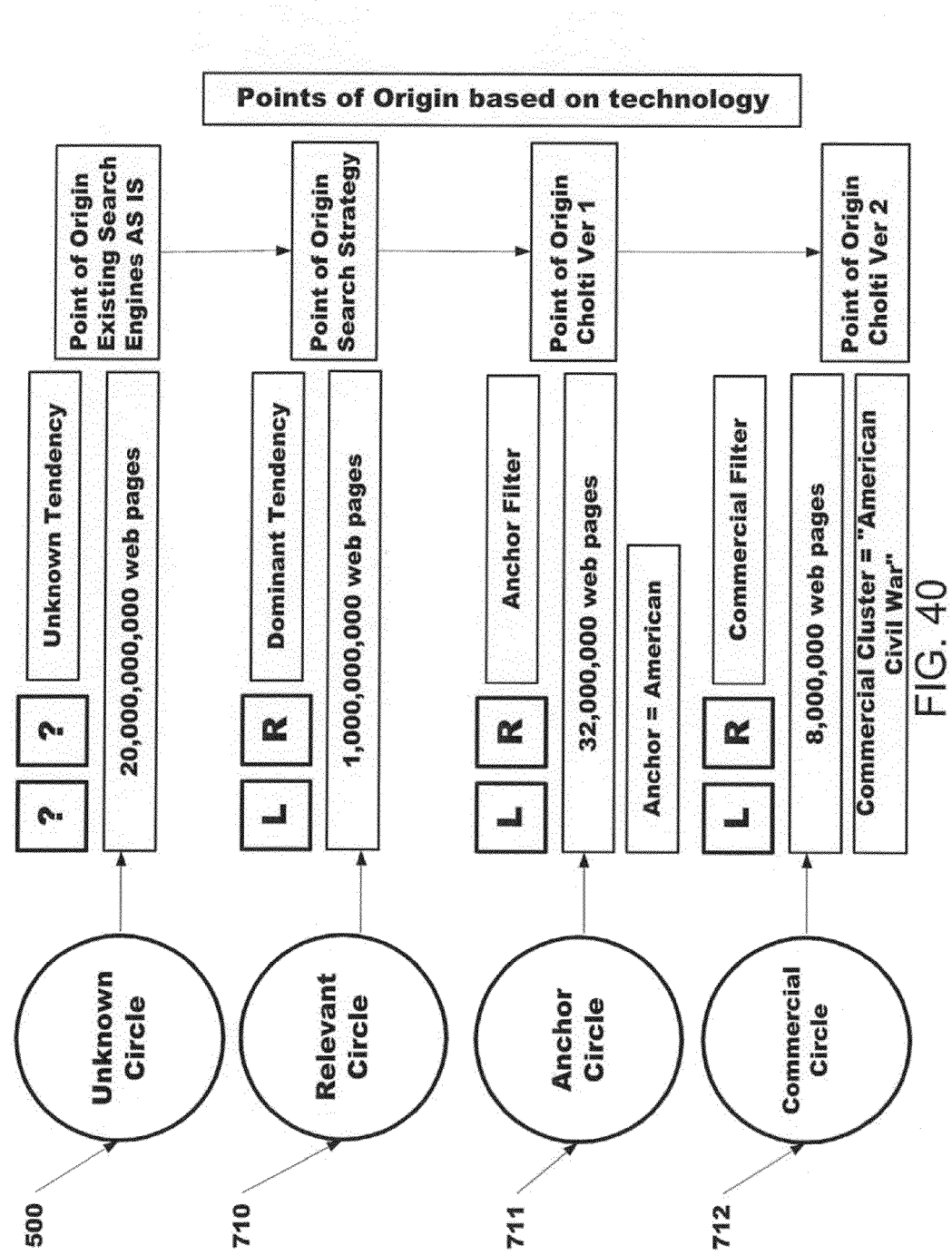
FIG. 40: Points of Origin.

FIG. 40 is a diagram that describes the different Points of Origin based on the technology being used to find the final destination while surfing the Internet.

(500) The Internet environment is synonymous with Unknown Circle of Accuracy comprising 32,000,000,000 pages based on Boolean algebra inductive reasoning popularity scores with chaos and anarchy.

$1^{st}$: Dominant Tendency binds the search process to the (710) Relevant Circle of Accuracy comprising 1,000,000,000 or (2^30) pages limiting the geometrical rate of growth of the Internet. Each Super Site hierarchy is assigned corporate Glyph that contains all the relevant business information and associate collections.

$2^{nd}$: Search Strategy and anchor Glyph filter down the session to 32,000,000 web pages by using Q(x, y, z) filters. Each Super Site hierarchy is assigned an advertisement Glyph with relevant media values and associate collections.

$3^{rd}$: Commercial Glyph binds the request to the (712) Commercial Circle of Accuracy comprising of 8,000,000 web pages by using Q(x, y, z) filters supply and demand Super Glyph (c) values as filters. Each Super Site hierarchy is assigned a pricing Glyph and has relevant supply and demand values and associate collections.

Figure 41:
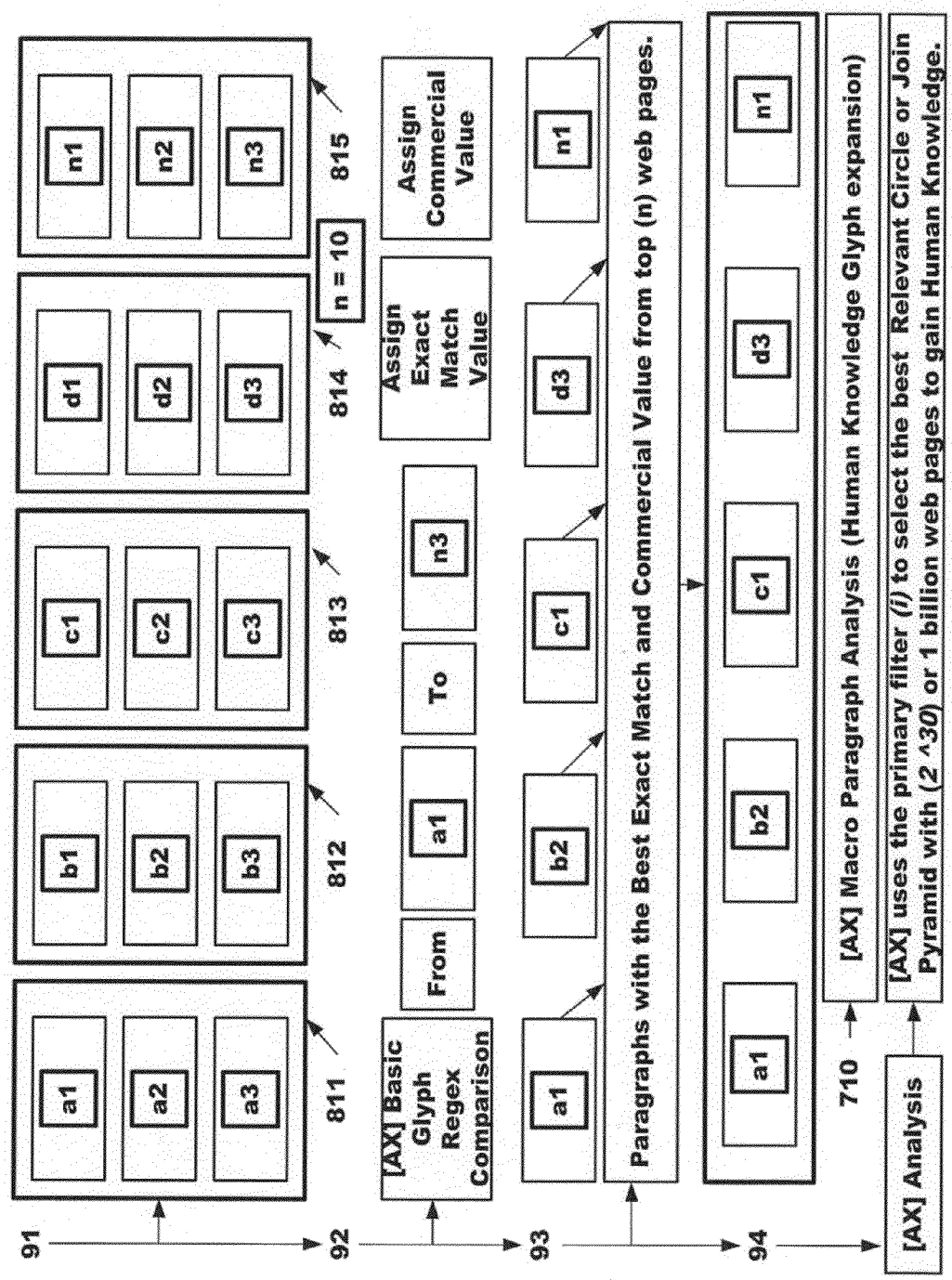
FIG. 41: [AX] Analysis (Vague Search).

FIG. 41 is a diagram of the [AX] Analysis (Vague Search) that does the following: $1^{st}$ (91) find the best [AX] web pages (811, 812, 813, 814, 815) and parsers through the content paragraph by paragraph (a1, a2, a3, b1, b2, b3, c1, c2, c3, d1, d2, d3, n1, n2, n3) and n=10 by default.

$2^{nd}$ performs a regular expression (92) of each web page (811 to 815) and parses paragraph by paragraph (from a1 to n3) assigning them based on the [AX] Basic Glyph equation an exact match value Q(x, y, z) and Simple Pyramid (corporate, advertisement, supply and demand) values or Super Site (a, b, c) Super Glyphs.

$3^{rd}$ selects for each web page (811 to 815) the best content paragraph (93) having the highest Basic Glyph exact match value (x) and commercial value (y) in this case (a1 for 811, b2 for 812, c1 for 813, d3 for 814 and n1 for 815).

$4^{th}$ Perform the [AX] Macro Paragraph analysis by matching/merging paragraphs (a1, b2, c1, d3, and n1) and using (710) Join Pyramid (Joins, Blocks, Walls and Ceilings) eliminates irrelevant keywords of each paragraph and converts the relevant keywords into Glyphs objects and expands the Basic Glyph equation by adding (94) key featured associations.

Figure 42:
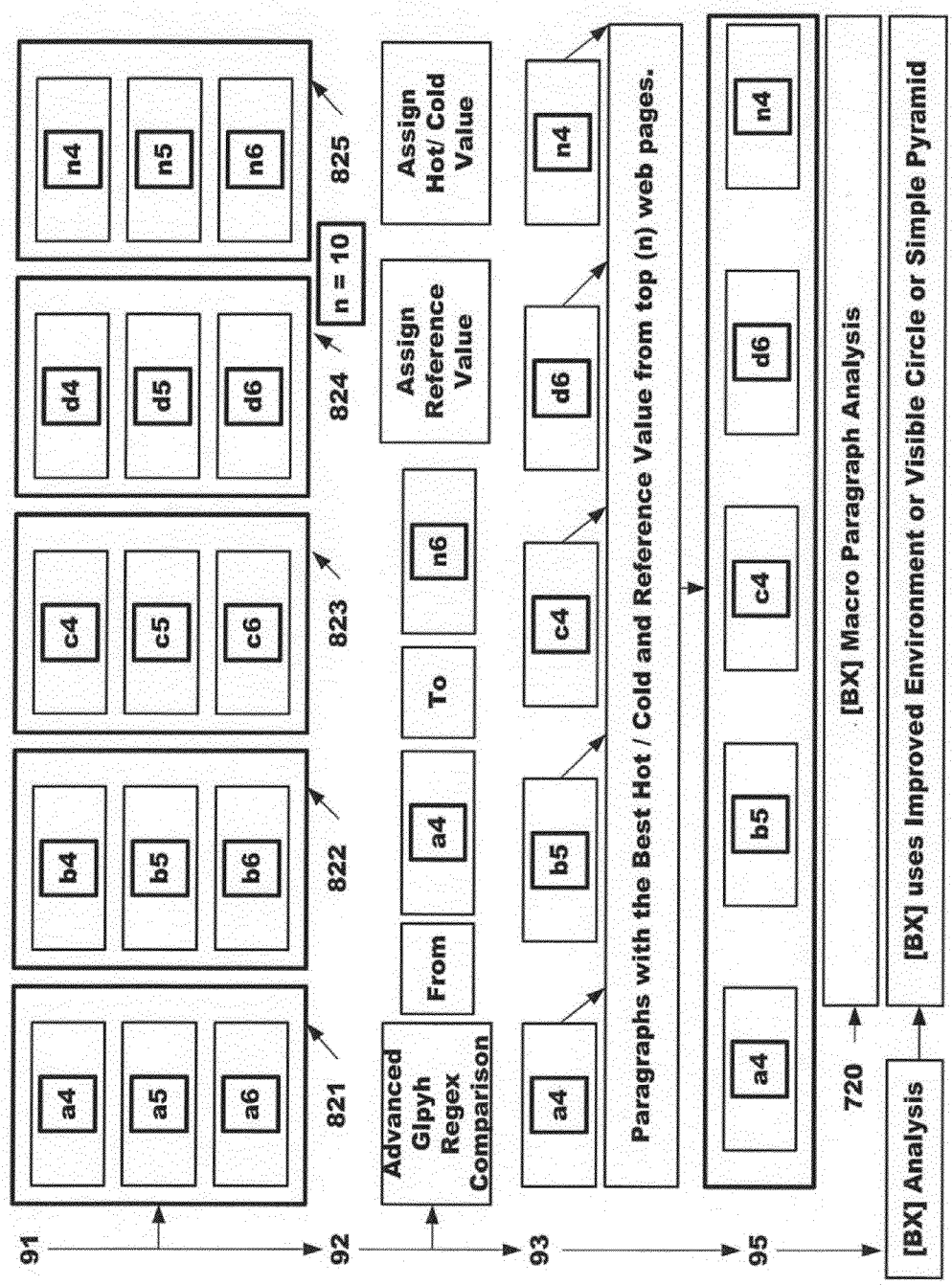
FIG. 42: [BX] Analysis (Concise Search).

FIG. 42 is a diagram of the [BX] Analysis (Concise Search) that does the following: $1^{st}$ (91) transform request into managerial relationship indices and assigns independent variables (I, J, K, X, Y, Z). $2^{nd}$ picks the best content pages using their commercial rank. $3^{rd}$ select the best web pages (821, 822, 823, 824, 825) and parsers through the content paragraph by paragraph (a4, a5, a6, b4, b5, b6, c4, c5, c6, d4, d5, d6, n4, n5, n6) and n=10 by default.

$3^{nd}$ performs a regular expression (92) of each web page (821 to 825) and parses paragraph by paragraph (from a4 to n6) assigning them based on the Advanced Glyph equation an exact Reference value (y) and Hot/Cold value (z) and Hybrid Pyramid actual content values or Super Site (a, b, c, d) Super Glyphs.

$4^{th}$ measures Glyphs within the [AX] Macro Paragraph and in the definition of each of the Managerial Relationship Indices independent variables (I, J, K, X, Y, Z) definitions becomes a collection of relevant and associated subject matter that is used to measure with wisdom the best web pages. Uses human brain intelligence to create smaller sized environments, whereas the latest Cholti (1000) incorporates wisdom to expand the Advanced Glyph Equation with relevant collections of (94, 95, 96) key featured association to the subject matter associated to the top (n) responses and (I, J, K, X, Y, Z) definitions. Each Super Site hierarchy is assigned relevant actual content values and associate reference collections.

$5^{th}$ Performs the [BX] Macro Paragraph analysis and reads each web page (821 to 825) and picks the (93) best paragraph with Advanced Glyphs in this case (a4 for 821, b5 for 822, c4 for 823, d6 for 824 and n4 for 825) and match/merges paragraphs (a4, b5, c4, d6, n4) and then using (720) Simple Pyramid (Joins, Blocks, Walls and Ceilings) to eliminate irrelevant keywords of each paragraph and converts relevant keywords and clusters into Glyph statistical objects and expands the Advanced Glyph equation by adding key featured associations (95).

Figure 43:
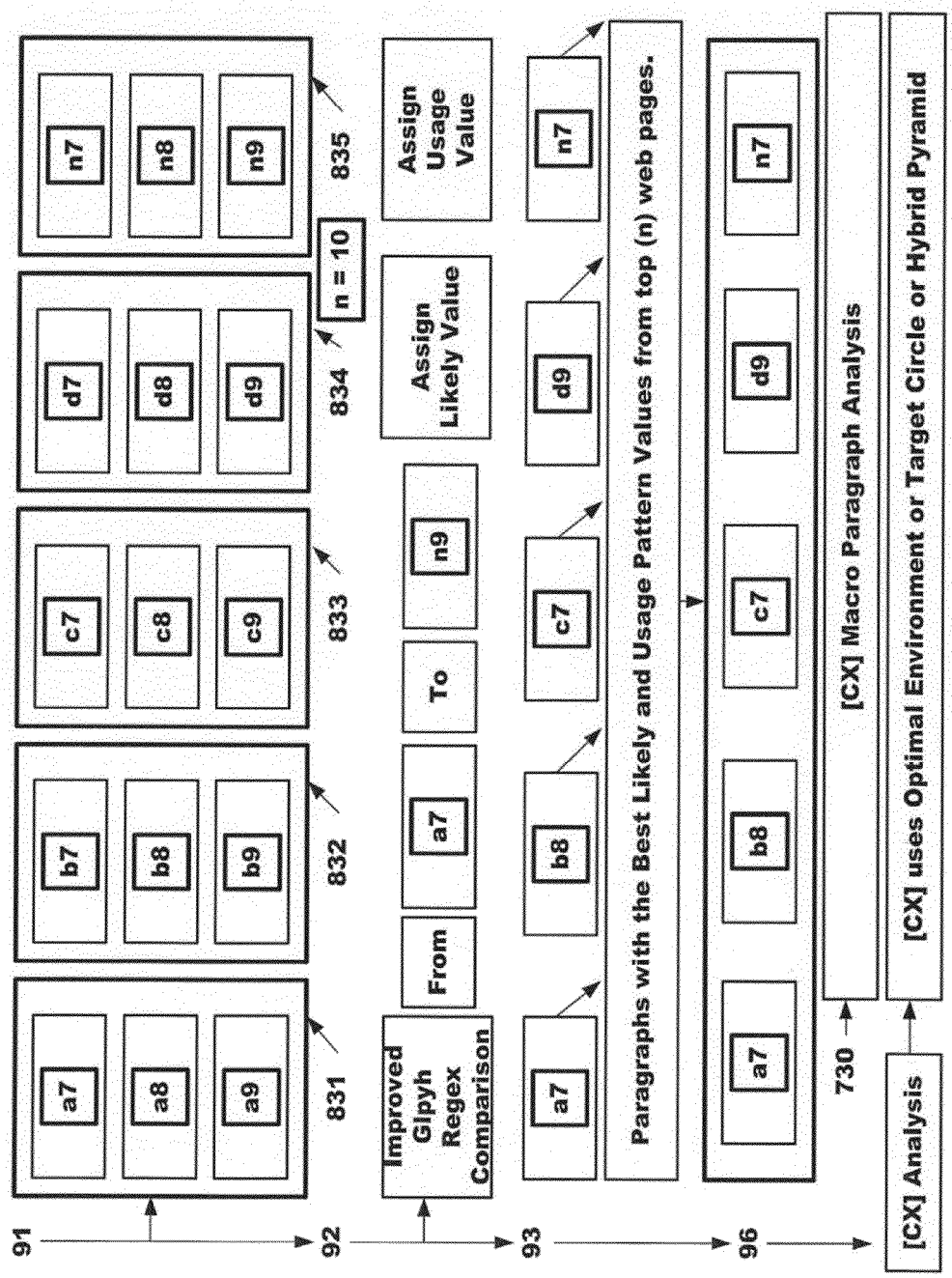
FIG. 43: [CX] Analysis (Precise Search).

FIG. 43 is a diagram of the [CX] Analysis (Precise Search) that does the following: $1^{st}$ reorganizes (91) the end user request into managerial relationship indices and assigns independent variables (I, J, K, X, Y, Z). $2^{nd}$ picks the best web pages using hot/cold value (y) and reference value (z). $3^{rd}$ selects pages (831, 832, 833, 834, 835) and parsers through the content paragraph by paragraph (a7, a8, a9, b7, b8, b9, c7, c8, c9, d7, d8, d9, n7, n8, and n9) and n=10 by default.

$3^{rd}$ selects (92) the top (n) pages from [AX] and [BX] comprising of web page (100 to 500) and parses paragraph by paragraph (from 11 to n3) assigning them based on the Improved Glyph equation an exact Likely value (v) and Usage value (w) and Super Site (a, b, c, d, e) filters.

$4^{th}$ processes real time Internet trending to expand the Improved Glyph Equation with new Glyphs.

$5^{th}$ Perform the [CX] Macro Paragraph Analysis and reads each web page (831 to 835) to pick (93) the best paragraph with Improved Glyphs in this case (a7 for 831, b8 for 832, c7 for 833, d9 for 834 and n7 for 835) and match/merges paragraphs (a7, b8, c7, d9, and n7) and then using (730) Hybrid Pyramid (Joins, Blocks, Walls and Ceilings) to eliminate irrelevant keywords of each paragraph and then converts keywords and clusters into Glyph statistical objects and expands the Improved Glyph equation by adding key featured associations (96).

Figure 44:
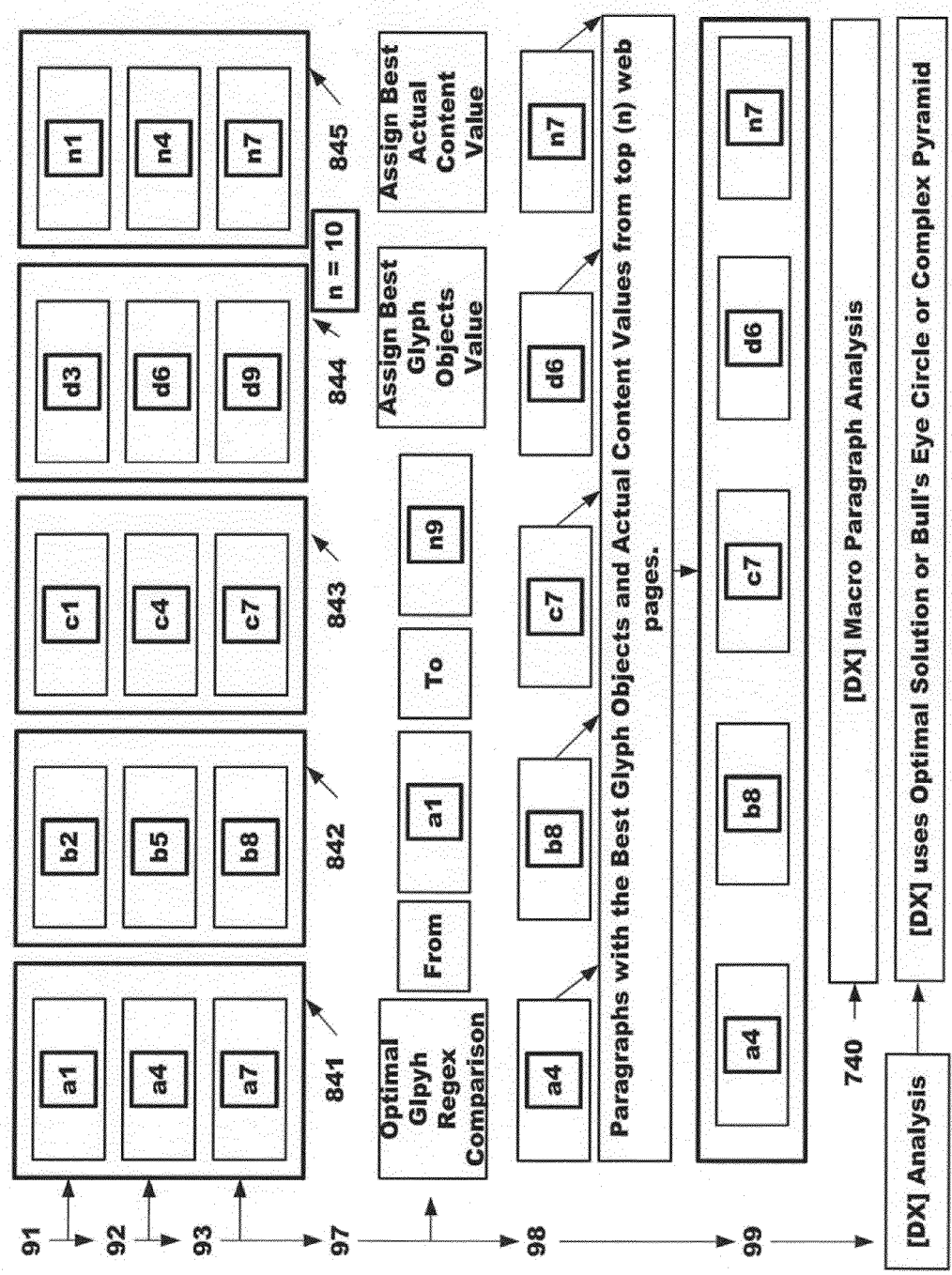
FIG. 44: [DX] Analysis (Optimal Search).

FIG. 44 is a diagram of the [DX] Analysis (Optimal Search) that does the following: $1^{st}$ reorganizes (97) the end user request into managerial relationship indices independent variables (I, J, K, X, Y, Z). $2^{nd}$ determines the best web pages using Q(x, y, z), hot/cold value (v) and reference value (w) and Super Site (a, b, c, d, e) filters. $3^{rd}$ determines the best web pages (841, 842, 843, 844, 845) and then parsers [AX] (a1, b2, c1, d3, n1), [BX] (a4, b5, c4, d6, n4), and [CX] (a7, b8, c7, d9, n7) Macro Paragraph data. Cholti (1000) performs the following:

$4^{th}$ Assigns to each visible page belonging to the (720) Simple Pyramid or Superset(I) environment Super Site (a, b, c) filters where (a)=corporate, (b)=advertisement and (c)=supply and demand values.

$5^{th}$ Assigns to each visible page belonging to the (730) Hybrid Pyramid or Set(I, J) environment Super Site (a, b, c, d) filters where (d)=gray matter and actual content values.

$6^{th}$ Assigns to each visible page belonging to the (740) Complex Pyramid or Subset(I, J, K) environment Super Site (a, b, c, d, e) filters where (e) usage patterns of behavior and TQM level of satisfaction value.

$7^{th}$ Picks (98) the top (n) pages from [CX] comprising of web page (841 to 845) and parses paragraph by paragraph (from 11 to n3) assigning them based on the Optimal Glyph equation using Q(x, y, z) and Super Site (a, b, c, d, e) filters and performs [DX] Macro Paragraph Analysis that measures (a1 to n9) and determines the best content paragraph.

$8^{th}$ eliminates irrelevant keywords from each paragraph using (740) Complex Pyramid (Joins, Blocks, Walls and Ceilings) and then match/merges the top Glyph statistical objects and then solves for the final destination.

Figure 45:
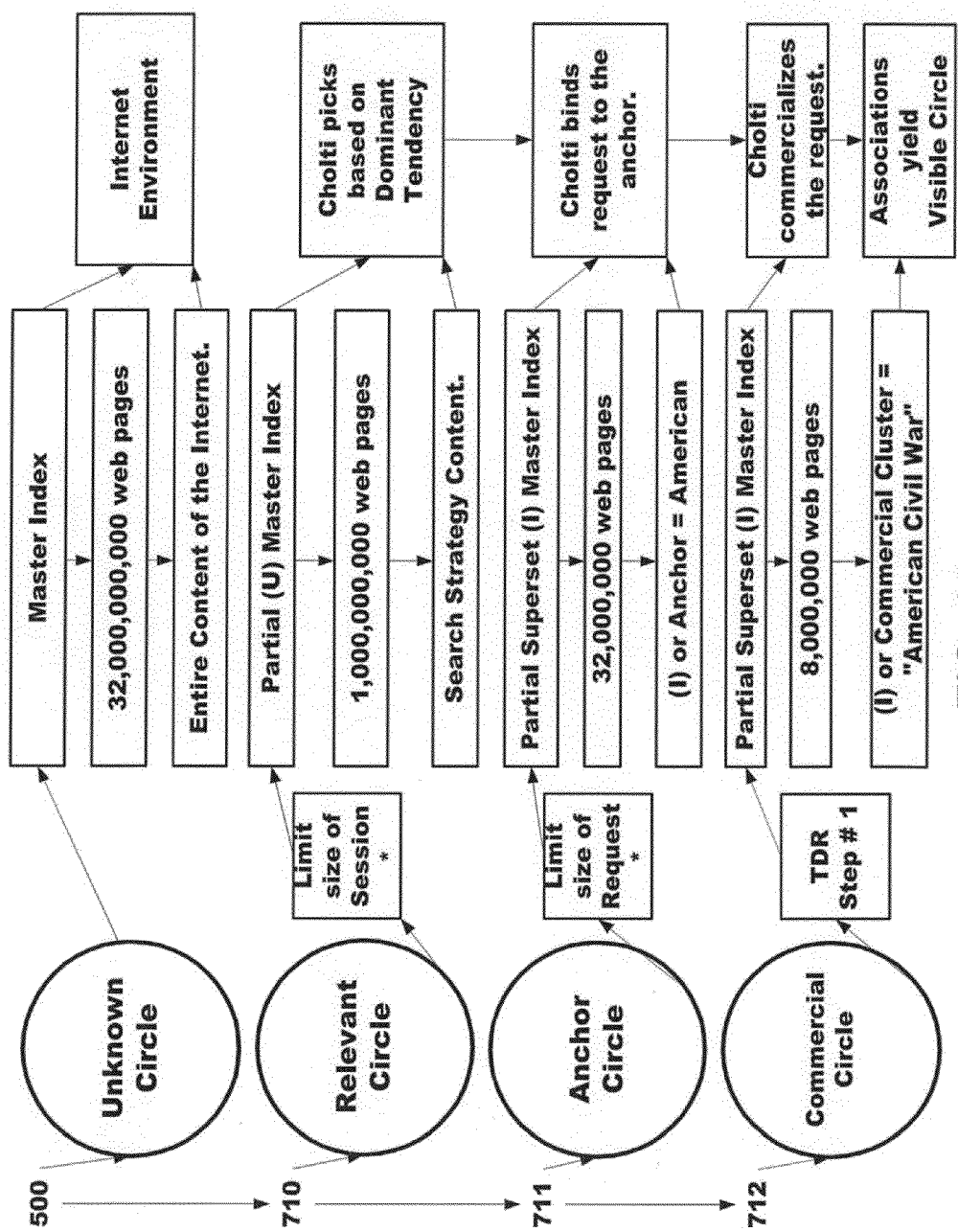
FIG. 45: Circles of Accuracy.

FIG. 45 is a diagram of the Circles of Accuracy.

(500) Unknown Circle: the Internet environment with 32,000,000,000 web pages.

The Search Strategy performs the following: $1^{st}$ creates (710) Join Pyramid (Relevant Circle) that maps a relevant environment with 1,000,000,000 web pages and assigns Super Site (a)=corporate values relative to the partial (U) environment. The partial (U) environment or relevant environment is a 1 billion rank within the 32 billion Master Index where the Search Strategy binds the final destination.

$2^{nd}$ plots (711) Anchor Circle that are sovereign working partial environments based on anchor Glyphs as filters with 32,000,000 web pages and assigns Super Site (b)=advertisement values.

$3^{rd}$ plots (712) Commercial Circle that are sovereign working partial environments based on commercial Glyphs as filters with 8,000,000 web pages and assigns Super Site (c)=supply and demand values.

Figure 46:
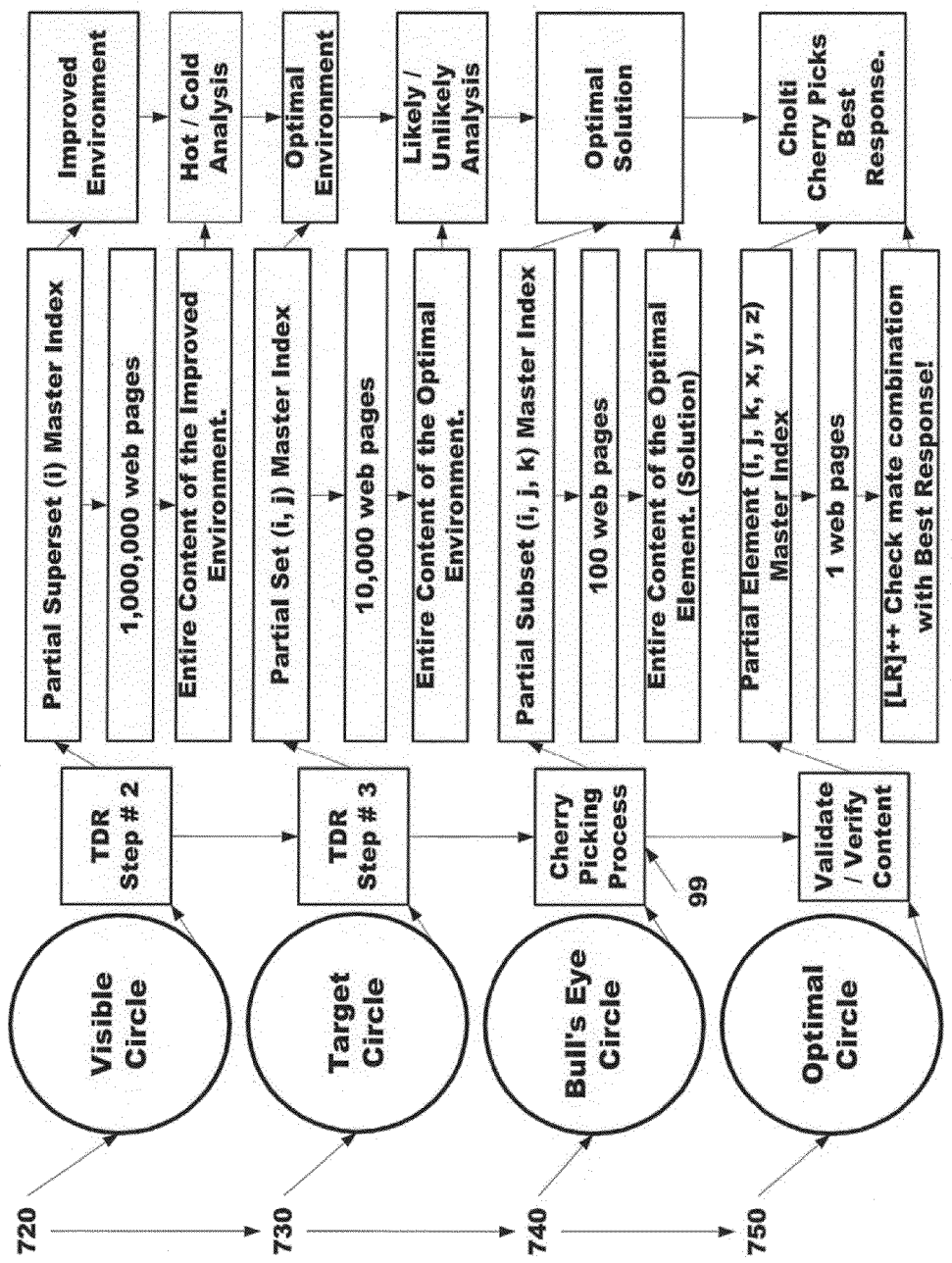
FIG. 46: Circles of Accuracy Part 2.

FIG. 46 is a diagram of the Circles of Accuracy Part 2 and continuation of FIG. 45

$4^{th}$ creates a (720) Simple Pyramid (Visible Circle) that maps an improved environment with 1,000,000 web pages using Q(x, y, z) filters and performs the Hot/Cold Analysis to removes from calculation independent variable (I).

$5^{th}$ plots (721) Prepare Circle that uses Set(a, J) independent variables and Super Site (d) actual content or gray (matter) against the improved environment to map the Prepare Circle with 100,000 web pages.

$6^{th}$ creates a (730) Hybrid Pyramid (Target Circle) that maps an optimal environment with 10,000 web pages and performs the Relevancy Analysis to removes from calculation independent variables (I, J).

$7^{th}$ picks (731) Aim Circle: uses Subset(I, J, K) independent variables and Super Site (e) usage patterns of behavior against the optimal environment to create the Aim Circle with 1,000 web pages.

$8^{th}$ creates (740) Complex Pyramid (Bull's Eye Circle) that maps an optimal solution with 100 web pages and performs the Likely/Unlikely Analysis to removes from calculation independent variables (I, J, K).

$9^{th}$ 'Cherry picks' the (750) Optimal Pyramid (Optimal Circle) by measuring each page of the optimal solution and using inductive and deductive reasoning selects the optimal answer with the highest informational certainty.

14. Expansion of Super Glyph Equations

Figure 47:
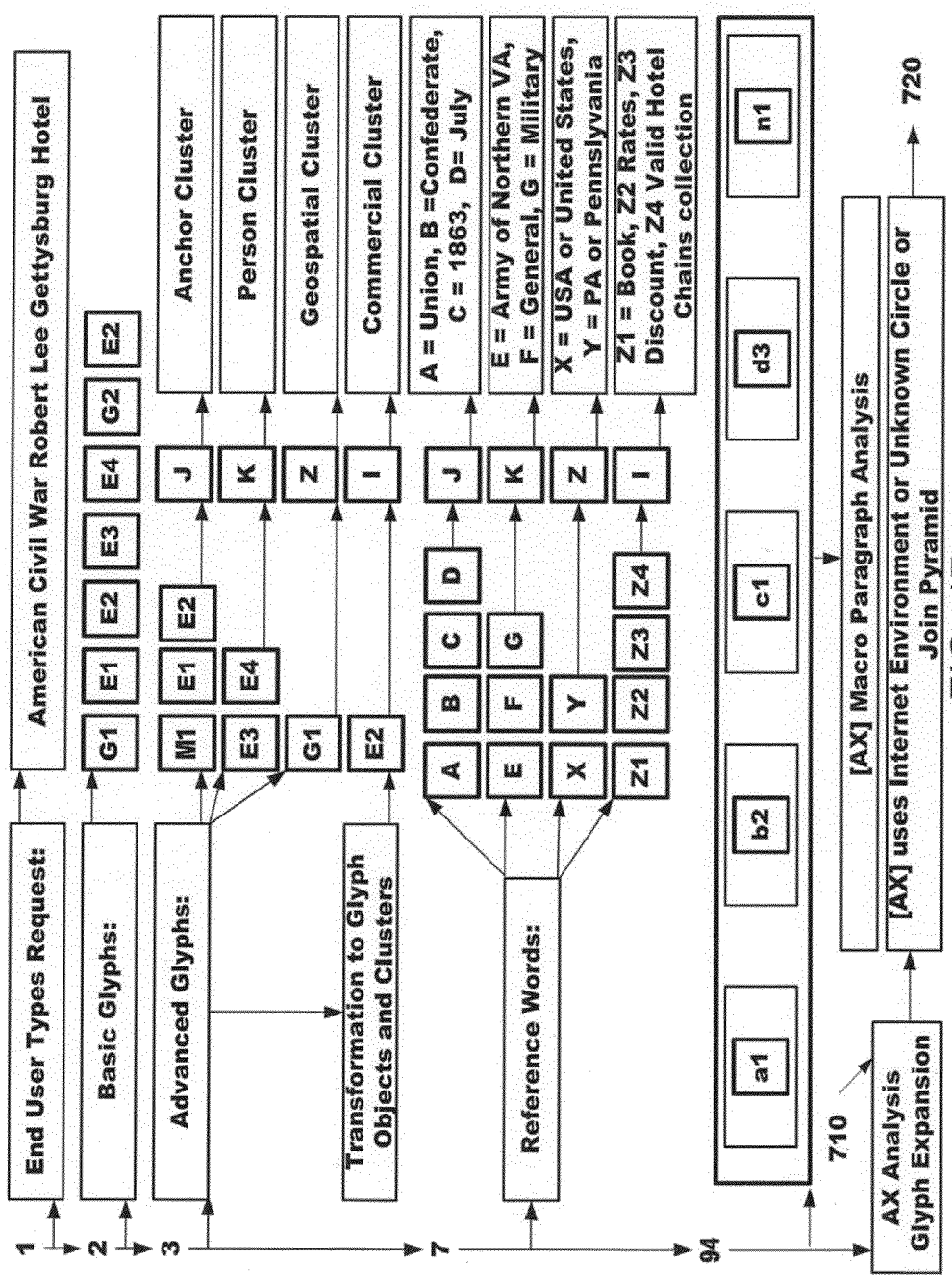
FIG. 47: AX Analysis Glyph Expansion.

FIG. 47 this diagram shows the [AX] Analysis Glyph Expansion using deductive reasoning to create (720) Simple Pyramid that maps an improved environment with 1,000,000 web pages. (1) End User type request: "American Civil War Robert Lee Gettysburg Hotel". Cholti (1000) performs the following: (2) converts vague search keywords into American=M1, Civil=E1, War=E2, Robert=E3, Lee=E4, Gettysburg=G1 and Hotel. Then maps and transforms (3) managerial relationship indices (I, J, K) into (M1+E1+E2), (E3+E4)+G1 into Cx or American Civil War, Cy or Robert Lee=Cz or Gettysburg where Cx=(I), Cy=(J) and Cz=(K).

Commercializes the vague search into a Basic Glyph equation. Hotel is converted into a Commercial Cluster, adjusting the 4 independent variables as follows: Hotel=(I), American Civil War=(J), Robert Lee=(K) and Gettysburg=(Z). Obtains reference words (7) for the anchor Superset(I) American Civil War: (Union=A, Confederates=B, 1863=C and July=D); for the commercial Superset(I) Hotel: (Book=Z1, Rates=Z2, Discount=Z3 and valid Hotel collection Z4 {x}; for Set(I, J) Robert Lee: (Army of Northern Virginia=E, General=F, and Military=G); and for Subset(I, J, K) Gettysburg: (USA or United States=X and PA or Pennsylvania=Y); where C, D, X and Y are geospatial Glyphs.

Correlates the [AX] Macro Paragraph Analysis based on (a1, b2, c1, d3, and n1) with the best paragraphs from the top (n) pages and expands the Basic Glyph equation by adding (94) key featured associations. Vague searches use the (500) Internet environment with 32 billion web pages, whereas, the [AX] analysis mimics the human brain and uses a Search Strategy to binds a vague search or session to a (710) Join Pyramid that maps a relevant environment with 1 billion pages and uses the Super Site (a, b, c) filters. (a)=corporate values, (b)=advertisement values, and (c)=pricing values.

Adds Super Site (a, b, c) values for all the web pages the resultant for any Join Pyramid is identical. Once [AX] creates (720) Simple Pyramid (Visible Circle) that maps an improved environment, Cholti (1000) maps, plots, adjusts and recalibrates Super Site (a, b, c) values in order for the summation of all the (a), (b) and (c) values for all the web pages the resultant is identical and so forth for all Pyramids (Join, Simple, Hybrid, Complex, Optimal). Thus the (a) value for a Simple Pyramid=top 1,000,000 web pages of the Join Pyramid, and (a) value for a Complex Pyramid=top 100 web pages of the Join Pyramid. This can be done, since the inventories are logical in nature and the mapping and plotting is instantaneous.

Figure 48:
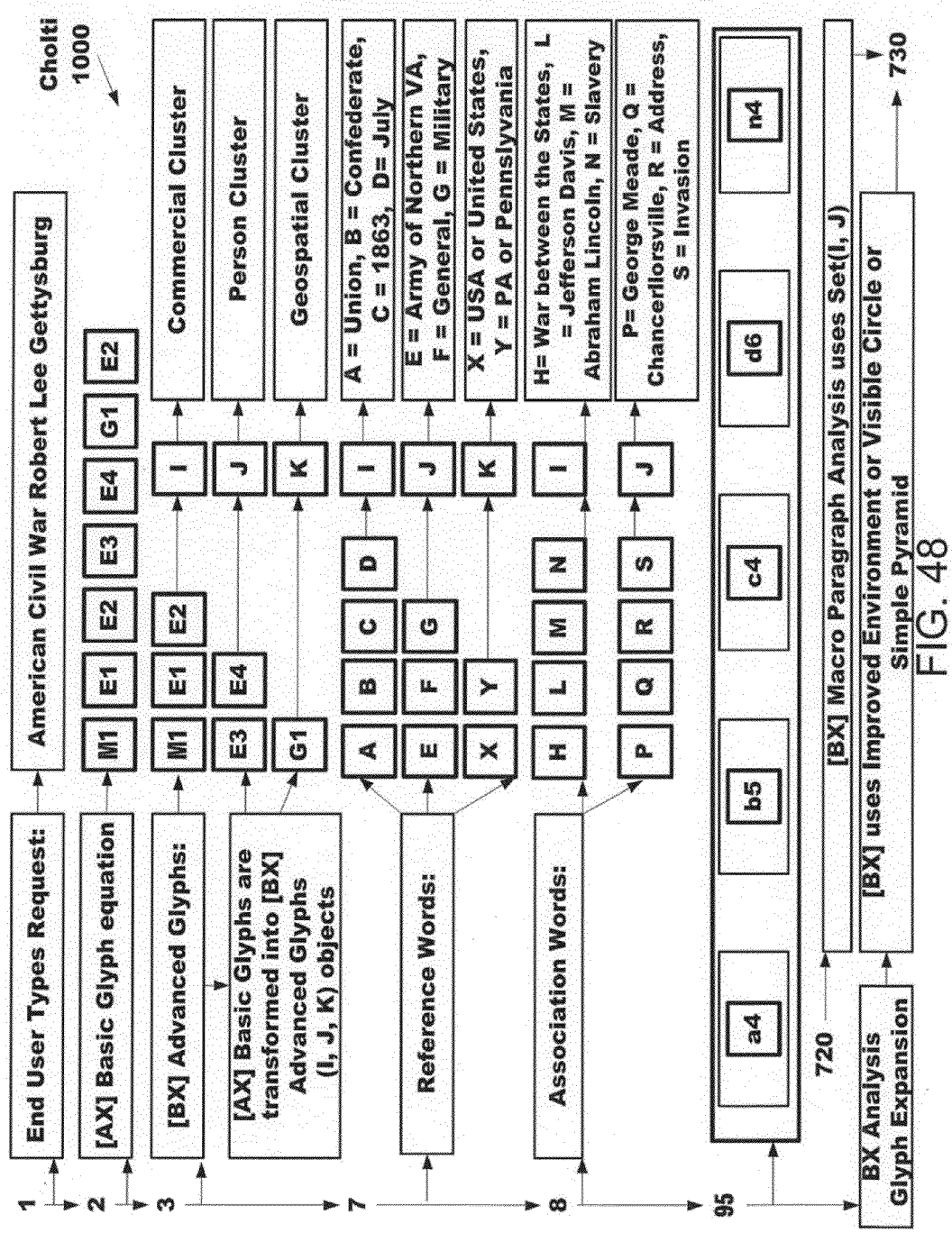
FIG. 48: BX Analysis Glyph Expansion.

FIG. 48 this diagram shows the [BX] Analysis Glyph Expansion using deductive reasoning to create (730) Hybrid Pyramid that maps an optimal environment with 10,000 web pages. (1) End User types: "American Civil War Robert Lee Gettysburg Hotel". Cholti (1000) performs the following: (2) transforms concise search keywords into American=M1, Civil=E1, War=E2, Robert=E3, Lee=E4, Gettysburg=G1 and Hotel=E5. Converts and reorganizes (3) the vague search into an Advanced Glyph equation, and "American Civil War" becomes the Commercial Cluster and no independent variable are added or found. Obtains reference words (7) for the anchor Superset(I) American Civil War: (Union=A, Confederates=B, 1863=C and July=D); for Set(I, J) Robert Lee: (Army of Northern Virginia=E, General=F, and Military=C); and for Subset(I, J, K) Gettysburg: (USA or United States=X and PA or Pennsylvania=Y); where C, a X and Y are geospatial Glyphs and the rest are English and Mixed Glyphs.

Adds associated words (8) of managerial relationship indices that are directly related such as "American Civil War" and "Robert Lee" as follows: Anchor Superset(I) American Civil War: (War between the States=H. Jefferson Davis=L, Abraham Lincoln=M and Slavery=N); for Set(I, J) Robert Lee: (George Meade=P, Chancellorsville=Q, Address=R and Invasion=S); and for Subset(I, J, K) Gettysburg: all known ANI data; where C, D, X and Y are geospatial Glyphs and the rest are English and Mixed Glyphs. Correlates the [BX] Macro Paragraph based on (11, 22, 31, 43, n1) with the best paragraphs from the top (n) pages and expands the [BX] Advanced Glyph equation by adding (95) key featured associations. Concise searches mimics the human brain and uses a Search Strategy to binds a session to a (720) Simple Pyramid that map an improved environment comprising 1,000, 000 web pages, whereas requests use the (500) Internet environment with 32 billion pages.

Figure 49:
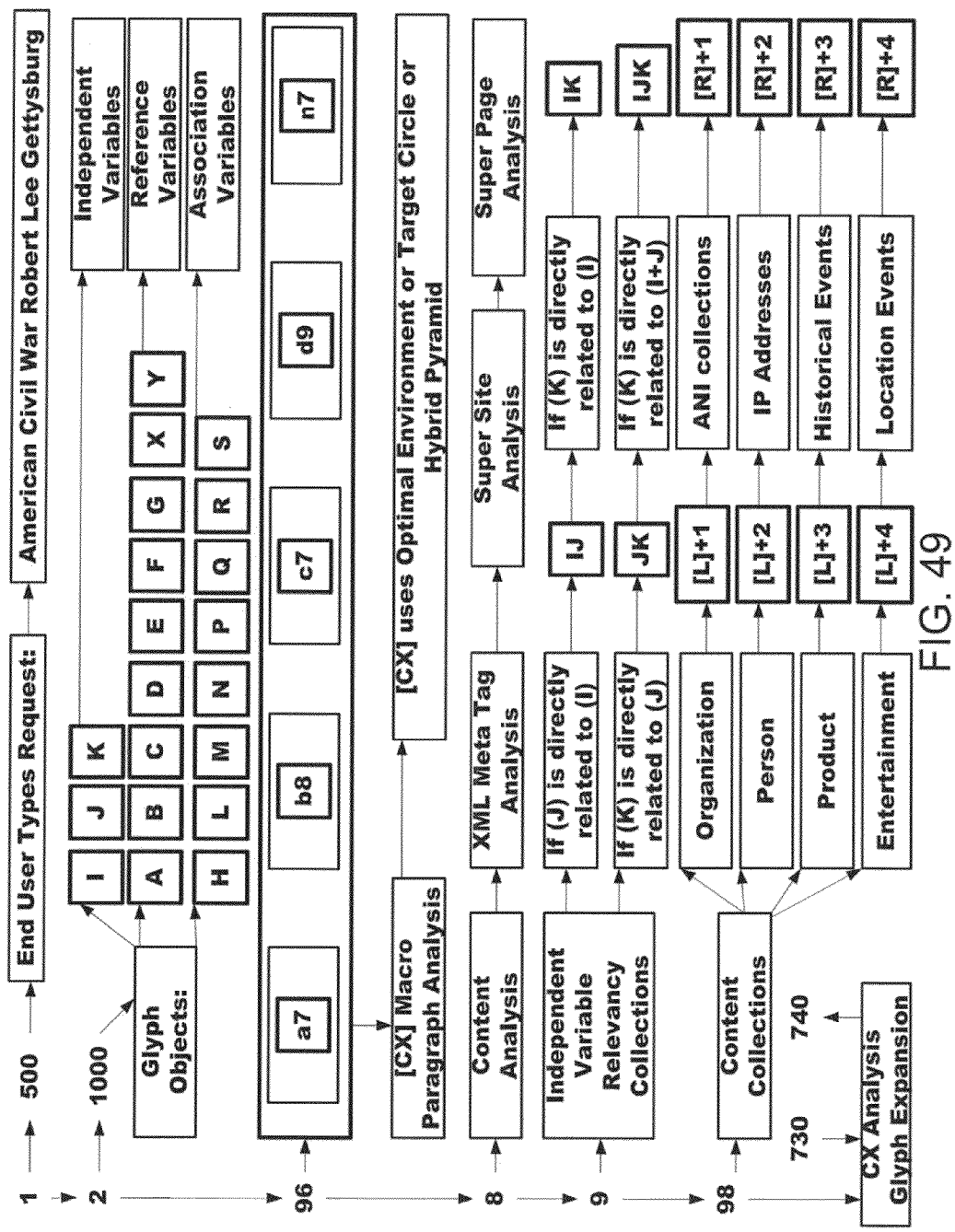
FIG. 49: CX Analysis Glyph Expansion.

FIG. 49 this diagram shows the [CX] Analysis Glyph Expansion using deductive reasoning to create the (740) Complex Pyramid that maps an optimal solution with 100 web pages. (1) End user types a request. Cholti (1000) based on FIG. 48, performs the following: (2) converts all the keywords into Super Glyphs and independent variables (I, J, K) and then adds reference Super Glyphs (A, B, C, D, E, F, G, X, Y) and by association (H, L, M, N, P, Q, R, S). Correlates the [CX] Macro Paragraph based on (a7, b8, c7, d9, n7) with the best paragraphs from the top (n) pages and expands the [CX] Improved Glyph equation by adding (96) key featured associations. The [CX] precise search mimics the brain and uses a Search Strategy to binds a session to a (730) Hybrid Pyramid that maps an optimal environment with 10,000 web pages, whereas requests use the (500) Internet environment with 32,000,000,000 web pages.

Derives information (9) from Super Sites and XML Meta tag analysis and performs (8) independent variable relevancy tests and determines the following conditions: $1^{st}$: if (J) is related to (I), $2^{nd}$: if (IQ is related to (I), $3^{rd}$ if (K) is related to (J) and $4^{th}$: if (K) is related to (I+J). The condition is valid since Gettysburg (K) is directly related to Robert Lee (J) and to American Civil War (I). Expands the Improved Glyph equation by (98) tagging content collections, in this case People {x}, Historical Events {y} and Location Events {z} are relevant, [CX] Macro Paragraph information and Super Site info will create Organization {a}, ANI {b}, IP Address {c} and Products and Entertainment {d} collections are irrelevant.

Figure 50:
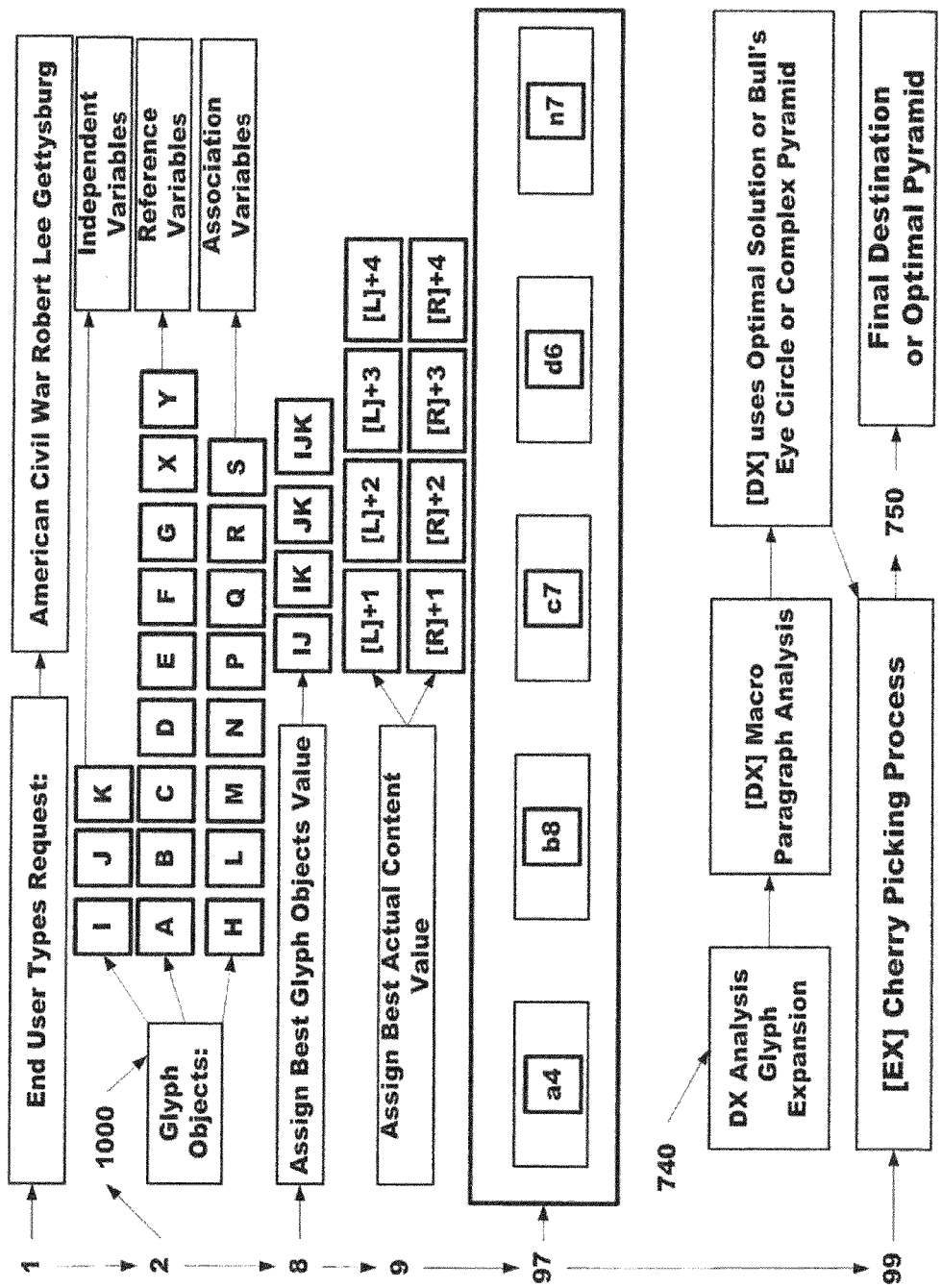
FIG. 50: DX Analysis Glyph Expansion.

FIG. 50 this diagram shows the [DX] Analysis Glyph Expansion using deductive reasoning to create the (750) Optimal Pyramid that maps the optimal answer with 1 page. (1) End user types a request, Cholti (1000) based on FIG. 48, performs the following: (2) converts keywords into Super Glyphs and identifies independent variables (I, J, K) and adds reference Super Glyphs (A, B, C, D, E, F, G, X, Y) and association Super Glyphs (H, L, M, N, P, Q, R, S). (8) Based on FIG. 49 derives the best Super Glyph objects and (9) Actual Content that is directly relevant and associated with the initial keywords typed by the end user.

Correlates the [DX] (97) Macro Paragraph Analysis based on (a4, b8, c7, d6, n7) the best paragraphs from the top (n) pages, and [DX] the optimal search mimics the human brain and uses a Search Strategy to binds a session to a (740) Complex Pyramid (Bull's Eye Circle) that maps an optimal solution with 100 web pages, whereas inductive reasoning requests are subject to the geometric rate of growth of the (500) Internet environment with 32,000,000,000 web pages.

DETAILED DESCRIPTION OF THE ARCHITECTURE

1. XCommerce

Simulation Network: is a parallel clustered multi-tiered Supercomputer that consists of a plurality of nodes. Each node is programmed with Artificial Intelligence, commercially known as Intelligent Components or IC, to perform predefined and ad hoc tasks based, that must be logistical rationalized based on the requirements derived from the environment. Cholti (1000) performs the following:

Incorporates a plurality of artificial intelligence programmed independent nodes, also referred to herein as Intelligent Components, which uses business rules to determine, and restrict, based on traffic volumes and available resources. Each node matches/merges raw data and correlates it into primed data. Each Intelligent Components dependent on traffic volumes and known throughput make their own decisions using business rules, permitting them to perform complex tasks. After receiving all messages to a particular transaction a Vector CDR is built having all the Partial Vector segments components, permitting subordinate Intelligent Components to complete non-critical tasks.

Delegates to Summit nodes the ability and authority to create summary data and command instructions that coordinate, synchronize and prioritize their chain of command, and then gathers, distills and disseminates the network wide data, so it can assign, control, coordinate and synchronize directives to their entire organization to process tasks. Using a 3D mentality the organization managerial hierarchy is rendered as Pyramid like structure.

Works in an organized managerial hierarchical manner to simulate all the Internet web pages and their associated content and the massive transactional traffic volumes derived from the interactions with the environment.

Receives each request and breaks it into keywords and identifiable clusters, and then transforms them into statistical data structures known as Glyphs, which store vector values and determines how many independent variables are present in a request and then stores information as a Search Pattern.

Analyzes and understands dynamic Search Patterns based on at least one request belonging to a session. Then based on the number of independent variables (I, J, K) from the left side of the brain and (X, Y, Z) from the right side of the brain it can find, forecast and derive the maximal domain size. Otherwise, when no independent variables are present the entire Internet or (U) is visible consisting of billions of web pages.

Uses Triangulation Deductive Reasoning (TDR) that mimics the brain's deciphering process. The Optimizer uses the Left Brain that analyzes with linguistics, and the Right Brain that measures geospatial information to determine from the collection of keywords typed what is the end user's idea. The Optimizer artificial intelligence mimics human intelligence when applying independent variables and Circle of Accuracy business rules, and possess human wisdom through means of expanding the equation with reference content and correlated Super Glyphs belonging to the top (n) pages.

Determines, which keywords or clusters are independent variables and converts, reorganizes, and correlates the request into a managerial hierarchical probabilistic vector. Each relevant Glyph is probabilistically associated to an information category, e.g. person or product. Employing the Left Brain to analyze with linguistics, and the Right Brain to measure geospatial information to determine from the keywords typed what is the end user's idea and probabilistically binds keyword featured associations.

Identifies from the Left Brain independent variables (I, J, K) and from the Right Brain (X, Y, Z). Left brain determines Superset(I), Set(I, J) and Subset(I, J, K) dataset Right Brain can replace Left Brain independent variables when null or below a limit. The Optimizer mimics human intelligence when applying independent variables Q(x, y, z) to eliminate web pages and uses Circle of Accuracy business rules to reach informational entropy, and possesses human wisdom through the analysis of top (n) pages and reference sources in order to expand [AX], [BX], [CX] and [DX] Super Glyphs equations.

Creating events by match/merging independent variables from both sides of the brain [L+R]. E.g. (I) and (X) are merge to (I!), (J) and (Y) to (J!) and (K) and (Z) to (K!). For each identifiable event the Search Pattern receives an exclamation or (!) that represents better informational entropy. E.g. Subset (I, J, K)!!!, means the request is exact, and Cholti (1000) with certitude will figure out the final destination.

Superset(I): when (1001) independent variable(I) is present, the vague search is restricted to a Superset (I) domain that is a partition of the (500) Internet environment and is referred to a (720) Simple Pyramid or Block that maps an improved environment that possesses all the relevant Sites consisting of 1,000,000 web pages. The [AX] Macro Page Analysis uses human knowledge to add (94) the $1^{st}$ group of keyword featured association dependent variables.

Set (I, J): when (1001, 1002) independent variables (I, J) are present, the concise search is restricted to Set (I, J) domain that is a partition of Superset(I) and is referred to a (730) Hybrid Pyramid or Sub Block that maps an optimal environment that possesses all the relevant Sites, consisting of 10,000 web pages. The [BX] Macro Page Analysis uses human wisdom when adding the $2^{nd}$ group of (95) keyword featured association dependent variables.

Subset(I, J, K): when (1001, 1002, 1003) independent variables (I, J, K) are present, the precise search is restricted to a Subset(I, J, K) domain that is a partition of Set(I, J) and is referred to a (740) Complex Pyramid or Mini Block that maps an optimal solution that possesses all the relevant Sites, consisting of 100 web pages. [CX] Macro Page Analysis uses human understanding when adding the $3^{rd}$ group of (96) keyword featured associations dependent variables.

[Ax] TDR $1^{st}$ Step: applies rules of association to each vague search and expands the Glyph equation by attaching additional keywords and clusters related with the set of Glyphs typed by the end user.

BX] TDR $2^{nd}$ Step: applies rules of relevance to each concise search and expands the Glyph equation by finding missing gaps of information, and assigns each independent variable to a Category.

[CX] TDR $3^{rd}$ Step: applies rules of likelihood, using probabilities to weigh each precise search with the final value of each web page and expands the Glyph equation by adding 'Related Objects', and determines if 2 independent variables become an Event.

[DX] TDR $4^{th}$ Step): 'Cherry Picks each page of each optimal search are selected after reading, inspecting and matching in behalf of the end user the content of the top (n) valued web pages to create a dynamically weighted content value that replaces page rank as a means in determining the optimal solution.

2. DCommerce

Determine Customer Satisfaction: DCommerce (3000) measures for each request the end user's Purchasing Value and the Valorized Optimal Value by determining (m) Customer Satisfaction Value, (n) Advertisement Value and then using End User information (o) Profile Value or (p) Purchasing Value.

$1^{st}$ Step: (m) assigns a Customer Satisfaction Value to each end user.

$2^{nd}$ Step: (n) assigns an Advertisement Value based on the end user profile, purchasing power and the freshness value of the advertisement.

$3^{rd}$ Step: (o) End User Profile Value (satisfying method $4^{th}$ Step: (p) End User Purchasing Value (preferred method).

TABLE 7

Customer Satisfaction Value

| | | |
|---|---|---|
| a. | Static Request with valid Commercial Cluster | Z = 0 |
| b. | Dynamic Request with valid Commercial Cluster | Z = 1 |
| c. | Static Request with valid Anchor Keyword | Z = 2 |
| d. | Dynamic Request with valid Anchor Keyword | Z = 3 |
| e. | Request with 0 independent variables | Z = 4 |

TABLE 8

Advertisement Value

| | | |
|---|---|---|
| a. | $1^{st}$ Request to Commercial Cluster | Z += 3 |
| b. | Request to Commercial Cluster | Z += 2 |
| c. | $1^{st}$ Request to Anchor Keyword | Z += 1 |

Applying Optimal Value Advertisement using (m), (n), (o) and (p) dimensions to display to the end user the best fit Corporate Sponsors.

Static Request: consists of a vague search that uses the static mass of (1001) primary independent variable (I) to create (720) Simple Pyramid or Block that maps an improved environment with 1,000,000 web pages.

Dynamic Request: consists of a vague search that uses the dynamic mass of (1001) primary independent variable (I) to create (720) Simple Pyramid or Block that maps an improved environment with 1,000,000 pages.

At this point for both vague searches and sessions utilize relevant associated keywords to act as independent variable (J, K) to create (730) Hybrid Pyramid that maps an optimal environment comprising 10,000 web pages.

Set(I, J) Requests: consists of a concise search that uses independent variable (I) to create (720) improved environment with 1,000,000 web pages, and then employs independent variable (J) to create (730) Hybrid Pyramid that maps an optimal environment with 10,000 web pages. Independent variables Q(x, y, z) filters shrink the environment.

Event Request: consists of a concise search of the [L] left side of the brain that is directly related to a geospatial keyword such as an historic event General {"Robert E Lee"}. E.g. "Robert E Lee" is the independent variable (I) used to create (720) Simple Pyramid or Block that maps an improved environment with 1,000,000 web pages and the keyword General creates the (730) Hybrid Pyramid that maps an optimal environment with 10,000 pages.

Now for all vague and concise searches cases DCommerce (3000) then adds Media Value or D(I) of each Super Site to create (740) Complex Pyramid that maps an optimal solution with 100 web pages.

In the case of a Set(I, J) DCommerce (3000) adds the D(J) filter to create (740) Complex Pyramid.

Subset(I, J, K) Requests: is a precise search that uses independent variable (I) to create (720) Simple Pyramid or Block that maps an improved environment with 1,000,000 web pages, and then uses independent variable (J) to create (730) Hybrid Pyramid or Sub Block that maps an optimal environment with 10,000 web pages, and utilizes independent variable (K) to create (740) Complex Pyramid or Mini Block that maps an optimal solution with 100 web pages.

Set(I!, J) and Set(I, J!) Requests: Precise searches and sessions replace and substitute independent variables and uses the Event (!) or (X) variable as (K) and performs the shrinking of the environment in the similar fashion of Subset (I, J, K) requests. Independent variables use Q(x, y, z) filters to shrink the environment.

Optimal Searches use independent variables (I, J, K) to shrink the environment. Remember the (!), (!!) and (!!!) variables are usually derived by deductive reasoning by analyzing the entire end user's session and are not typed in the latest request. DCommerce (3000) analyzes the managerial relationship indices by using a rotation process first to select and choose D(I), then D(J), and finally then chooses D(K) media values to derive the optimal size environments.

Precise and Optimal Searches DCommerce (3000) adds the D(I), D(J) and D(K) of each Super Page to help create (750) Optimal Pyramid and Display Circle of Accuracy with 10 web pages that is used as output.

DCommerce uses Corporate Placement Ranking: Each Super. Site pays for a Corporate Placement ranging between (0 and 3), where 0 denotes that the Super Site has the lowest priority of placement and 3 the highest. From the 'Cherry Pick' final list of top pages derived from content and the media value of each Super Page the final display ordering of links is determined and billed to the appropriate Media Sponsor. Corporate Placements with value=3 are placed $1^{st}$, value=2 are placed $2^{nd}$, etc, and are billed according to how many positions they were moved upwards in the list as so forth.

If all the pages have the same Corporate Placement then the 'Cherry Pick' final list is unchanged. In the case the highest Corporate Placement web pages are at the top and the next highest Corporate Placement web pages next and so forth until all the pages are used then the 'Cherry Pick' final list is also unchanged.

Circles of Accuracy: DCommerce (3000) improves over the Codex technology by adding the media value of each Super Site based on keyword and thus the dynamic creation of the relevant, improved, optimal environments and solutions is quicker. Pinpointing the final destination more accurately by commercializing the end user's typed interaction during a session simplifying the 'Cherry Picking' process of selecting the top (n) pages and then introducing the Corporate Placement constraints makes the overall technology robust, since a technology is as good as the financial bottom line, and DCommerce accomplished its main objective which is to maximize advertisement revenues and profits.

3. Description of the Intelligent Component

An Intelligent Component is a node that is part of the Simulation Network and uses artificial intelligence to perform a particular task depending on the tier it belongs.

All the components work collectively as a HIVE, and still simultaneously perform the task analyzing, evaluating, gathering and processed information from the environment in real time or from the moment of incipiency of receiving the fuzzy logic piece of information that triggers new and updates pending activities or tasks. An Intelligent component can be programmed to belong to any of the following three tiers:

Summit Tier: (Managerial Pyramid Switch)
a) Controls Basic Glyphs Search Patterns.
b) Creates [AX] and [BX] Macro Paragraphs
c) Automatically responds to Static Requests.
d) Controls all Commercial and Visible Circle of Accuracy Environments
e) Assigns the Commercial Value to each Super Page and Super Site.

Middleware Tier: (Synergy Interface Switch)
a) Controls Advanced Glyphs Search Patterns.
b) Creates [CX] Macro Paragraphs.
c) Controls all Target Circle of Accuracy Environments.
d) Validates each Dynamic Request
e) Assigns the Ranking Value to each Super Page and Super Site Lower Tier: (Team Work Switch)
a) Controls Improved Glyphs Search Patterns.
b) Performs the 'Cherry Picking' Process.
c) Creates [DX] Macro Paragraph.
d) Controls all Bull's Eye and Optimal Circle of Accuracy Environments.
e) Assigns the Content Value to each Super Page and Super Site.

The lower tiers analyze, update, monitor, control, validate, verify and administer information independently. This alone eliminates the need for a central mainframe, and also reduces the raw workload in an unobvious manner. The method of the invention removes redundant data at incipiency, enabling the system to function in real time, which is a significant aspect of the present invention Depending on the size of the network, the architecture defining the way the computers are linked together may comprise varying types and degrees of scope, such as, e.g. retailer, wholesaler, and supplier organizations, each with its own parent and subordinates. For the purposes of this invention, retailer, wholesaler, and supplier define available scopes that best reflect supply side organizations and their resources.

Heart Beat: the Summit tier gives a heart beat to the Simulation Network.

UCommerce 2010: The X_FOB and Y_CDIF Inventory Control Bitmaps referred as managerial relationship indices summary results, with pre-calculated look up information to eliminate redundant and resource intensive calculations.

DETAILED DESCRIPTION OF THE TECHNOLOGY

Search Engine Supercomputers: many inductive reasoning Search Engines exist in the lucrative market of delivering popular score content via the Internet, such as Ask, Bing, Google, and Yahoo, to name a few, that use large scale Supercomputers of thousands of CPU (U) that are subdivided into groups (sets) and clusters (subsets) of 64 specialized nodes or elements that a lightning speed identifies the best satisfying response for a given parameters of regular expressions. Note: clusters of 64 nodes distributions are the most cost/efficiency arrangement based on the magnitude of Superset(U). These search engines perform millions of daily searches and lion share of the responses occur within 0.1 seconds.

XCommerce (2000): is an UCommerce (4000) Inventory Control system, where the distribution of goods and services is expanded to include electronic links and their corresponding HTML content. Since the browser entities are a very lucrative endeavor and enjoy long term stream of revenues due in part to the teachings of mass media Target Advertisement from the Berkeley's University professor Dr. Goldhaber. Note: this technology will use Optimal Value Advertisement that takes into account economies of scale, limited advertisement budgets and mathematical algorithms to maximize satisfaction.

Gather Information: (U) or (500) Internet environment contains the information that is obtained by web crawlers that are programmed to scan predefined subdivision of the chaos and anarchy, and split and geographically organize with balance, harmony and proportion, so that a cluster of 64 CPU can divide and conquer its content. Each node has 1/n links or content of the Internet. These nodes parse the information with a plurality of regular expressions designed to identify common denominator patterns of alphanumeric characters that are hereinafter referred as Keywords. Each unique IP Address is considered a link that is comprised by a plurality of HTML web pages with content, hereinafter referred as PAGES. The cluster, using a dictionary of valid Keywords and databases of LINK values, helps populate the multi independent variables associated with solving the Eigenvector most satisfying solution based on the known content (U).

Standardize Information: Search Engines gather the information from the (500) Internet environment and standardize the mountains of meaningless data into the essence of the matter that mathematically explains with quantifiable values what is good, bad or redundant. XCommerce (2000) simplifies the process by immediately eliminating all bad and redundant pages before any calculation or parsing is performed and converts into Glyph all good HTML and stores the information in a data warehouse. Eigenvectors normalize, quantify and qualify as statistical distribution that permits which discrete group of PAGES (I, J, K) or elements of Superset(U) is the most satisfying response to the end user inquiry.

Organized Information: Now, that the information has been normalized and standardized, the cluster can correlate the data to eliminate bad or incomplete information and through the process of simplification remove the lion share of data which is redundant, leaving only exact data that is highly useful and unique. As each link is extracted and valorized for content value of its subordinate pages, the system places signature values such as (I) Keyword, (J) Frequency, (K) Linguistic Word Patterns. (X) Link Value, (Y) Reliability and (Z) Popularity, with a mini set or micro universe of the browsers (UB) limitations to a discrete number of responses n, where the cluster cherry picks the discrete sorted by valuing the resultant of the maximized Eigenvector (UB) with (I, J, K, X, Y, Z) characteristics that respond to a simple regular expression inquiry. Linguistic Word Pattern valorization method is explained in the new art concerning XCommerce (2000)

Transform Information: As the content of a HTML is converted into Keywords and Word Patterns values, all of a sudden, the raw meaningless data can be expressed as the primed correlated Informational Certainty vector that has independent variables (I, J, K, X, Y, Z). Independent variables (I, J, K) analyze the KEYWORD content as it refers to a group of logically organized words, used to communicate a message that is translated into a lingua franca language that is not confounded. Independent variables (I, J, K) normalize links within the scope of each partition, and belong to (500) Superset(U) and are relational with dimensions based on quality, popularity, product and satisfaction patterns of behavior.

Analyze Information: (Data Mart) statistics help understand what the end user is searching and augment Keywords, Linguistic Word Patterns and Link values.

Evaluate Information: Business Intelligence allows the human intelligence to better understand the environment as it relates to each customer.

Identify Customers: (From Universal to Personal) Understanding personalized means of advertisement have a greater significant impact on persuading an individual and to satisfy a craving need.

Target Advertisements: (Paying the Bills) Corporate advertisers must be able to use the Internet to reach the public better than traditional mass media technology.

Corporate Sponsors Value: (cost justifying with results) a personalized relationship between the corporate sponsors and customers is generated. This bond of trust and confidence facilitates sales.

1. Web Browser System (Existing Technologies)

Rule 1: The web host Supercomputer uses the inductive reasoning to obtain the highest rank content based on parameters from the (500) Internet environment.

Rule 2: The web host Supercomputer is ideally subdivided into sub clusters.

Rule 3: A sub cluster is composed of a plurality of nodes that possess programming means to search, find, identify and valorize its subset of the domain.

Rule 4: A master node for each sub cluster match/merges the responses of its subordinates based on synergistic proprietary intellectual property guidelines.

Rule 5: The web host Supercomputer must integrate Browser Engine, Shopping Cart, Advertisement means and Business Intelligence to identify what satisfies the consumer.

Rule 6: The web host Supercomputer brings law and order to the chaos and anarchy of the Internet. The Internet is considered a $4^{th}$ generation Telco network of 2,000,000,000 subscribers and an independent geospatial Superset.

Rule 7: The web host Supercomputer subcomponents: Browser Engine, Shopping Cart), Advertisement means, Billing and Business Intelligence are considered informational functions of Superset.

Rule 8: Superset consists of many nodes that are distributed into sets of parallel working clusters, possessing subcomponents functionality that are physically and geographically separated for redundancy and greater fault tolerance.

Rule 9: Each Superset is partitioned into Sets, and each Set is further partitioned into Subsets possessing a plurality of sub clusters, ideally and for simplicity to this document of a configuration of 8 by 8 or 64 nodes.

2. The System: W_RANK Basic Characteristics

Rule 10: Each node is an element belonging to a Superset, Set, Subset and sub cluster configuration.

Rule 11: W_RANK is the Summary Data of optimal inventory that measures the (500) Superset(U) or Internet environment based on quality, quantity, and commercial values and consists many Superset, Sets, Subsets, Elements.

Rule 12: Each link is considered to be a container that has a plurality of pages.

Rule 13: Each page consists of a plurality of valid words used to measure the value of each page in the Internet.

Rule 14: End users can use a valid word or Keyword to make a broad search of the content of the Internet that has the same characteristics of an Order.

Rule 15: Advanced Keyword Searches consist of associating valid words and operands to form a group set that has the same characteristics of a Micro Order.

Rule 16: Each cluster has a hash table for the most valuable results of a Keyword Search and contains the pointer address of location within the compressed files possessing the content of the Internet. The hash table contains information of the domain of each node.

Rule 17: The Master node possesses a hash table for the entire Internet that helps derive the filtering parameters to instantiate a query response.

Rule 18: Site and Page based Eigenvectors quantify and qualify with mathematical formulas Advanced Keyword Searches, so the system can derive an optimal discrete query response. The Master node match/merges the response of each node and then correlates into a single list.

Rule 19: The $1^{st}$ Keyword is primary, the $2^{nd}$ keyword secondary, and so forth. A primary Keyword has a higher weighted value than a secondary one, and so forth.

Rule 20: The system matches/merges an Advanced Keyword Search or a Regular Expression instantiates the equivalent of a Micro Order container.

Rule 21: The system categories the magnitude of each Keyword from 0 to 15, where 0 is vague expressed in billions of responses, and 15 unique.

Rule 22: The system for each Keyword creates three structures: Simple, Hybrid and Complex Pyramids that gather, distill, analyze, organize and transform the content into geospatial bitmap data.

Rule 23: A (720) Simple Pyramid or Block maps and contains an improved environment with 1,000,000 optimal query responses that resemble a resultant Macro Order after correlating a plurality of Partial Vector Set Searches.

Rule 24: A (730) Hybrid Pyramid or Sub Block maps and contains an optimal environment with 10,000 optimal query responses that resemble a resultant Super Order after correlating a plurality of Partial Vector Set Searches.

Rule 25: A (740) Complex Pyramid or Mini Block maps and contains an optimal solution with exactly 100 pages that resemble a resultant Global Order after correlating a plurality of Partial Vector Set Searches.

Rule 26: A plurality of vague searches derives the most valuable weighted 1,000,000 query responses that make up a (720) Simple Pyramid object with a magnitude of 7.

Rule 27: A plurality of concise searches derives the most valuable weighted 10,000 query responses that make up a (730) Hybrid Pyramid object with a magnitude of 10.

Rule 28: A plurality of precise searches derives the most valuable 100 query responses that make up a (740) Complex Pyramid object with a magnitude of 15.

Rule 29: The system must first identify the magnitude of each valid word.

Rule 30: A valid word with a magnitude of 2 or more is considered a Keyword. Thus a set of characters and their associated magnitudes help define the process of converting it into geospatial bitmap data.

Rule 31: Each Search Pattern creates a (720) Simple Pyramid that contains an improved environment.

Rule 32: Each Search Pattern creates a (730) Hybrid Pyramid that maps and contains an optimal environment.

Rule 33: Each Search Pattern creates a (740) Complex Pyramid that maps and contains an optimal solution.

3. W_RANK Pyramid Search Characteristics

Rule 34: When the end user makes a single keyword vague search with a magnitude of 0, 1, 2; Cholti (1000) replaces the keyword with a (712) Commercial Glyph with a higher magnitude and shrinks the (500) Internet environment using (Joins, Blocks, Walls, Ceiling) collections to create (720) Simple, (730) Hybrid and (740) Complex Pyramid. Then uses vector math to add up the relevant Keywords in the requests and adds Geospatial and Linguistic Collections to create exact magnitude objects.

Rule 35: The process of converting a simple Keyword into a Search Pattern is the process of transforming confounded and worthless information into standardized geospatial bitmap data. W_RANK method takes into account the human limited capacity to measure and understand quality for discrete (n=10) quantities.

Rule 36: A Keyword that becomes a geospatial bitmap data will possess a higher magnitude value. W_RANK method takes into account the human nature that considers time as money, whereas it can be amusing to have a query response with millions responses, they don't want to have to distill, analyze and find on their own the most valuable answer.

4. Lingua Franca Standard

Rule 37: The system reads the entire content of Superset (U) and determines for each link the valid languages, such as English, French, German or Spanish, to name a few.

Rule 38: A link can have a plurality of valid languages associated to it.

Rule 39: A Keyword is compared against a language identifier dictionary and to geospatial libraries.

Rule 40: A Keyword can belong to a plurality of languages.

Rule 41: Cholti (1000) uses concise search purification of words inside each Page, based on magnitude 0 to 6 Keywords or (720) Simple Pyramid Structure 1) Joins, 2) Blocks, 3) Walls, and 4) Ceilings. The weighted algorithm ranks the content of the document versus a given language standard from 0 to 10000.

Rule 42: Pages that have a value less than the language limit are irrelevant.

Rule 43: Pages that have a value greater than the language limit and below the language structural limit are confounded. 0 Pages are eliminated from the process.

Rule 44: The content of a Page derives linguistic and geospatial characteristics.

Rule 45: Cholti (1000) a precise search purification of words inside each Page based on magnitude 7 to 10 Keywords or (730) Hybrid Pyramid Structure 1) Joins, 2) Blocks, 3) Walls, and 4) Ceilings.

Rule 46: Cholti (1000) performs an optimal search purification of words inside each Page based on magnitude 11 to 14 Keywords or (740) Complex Pyramid Structure 1) Joins, 2) Blocks, 3) Walls, and 4) Ceilings.

Rule 47: The Keyword Value and Keyword Quality filtering algorithms results are converted into Summary Data from the point of view of a Subset(I), where the common denominator element is the primary Keyword.

Rule 48: The Keyword Validation mechanism identifies if the data is valid.

Rule 49: The Keyword Value mechanism identifies if the content is relevant.

Rule 50: The Keyword Quality mechanism identifies if the content is good or bad.

Example Classical Divide and Conquer Browser Search: use a search engines to derive an optimal query response. E.g. an end user wants to find out the World Cup Final match between France and Italy, in Germany Jul. 9, 2006:

a. Let's assume the end user is randomly surfing the Internet.

b. Request {WORLD} has 2,500,000,000 responses.

c. Request {WORLD, CUP} has 35,000,000 responses.

d. Request {WORLD, CUP, FIFA} has 16,000,000 responses.

e. Note: 2)-4) will suggest www.fifa.com as the top link still the end user must find the information within, easy during the tournament, not 6 months after the fact when League Tournaments, Olympic, Women World Cup soccer event dominate the spotlight.

f. The Simple Pyramid Structure validates and filters out (WORLD, CUP, FIFA) 16,000,000 responses minus 90% redundancy or pork equals 1,600,000 responses, still the end user is not satisfied since over a million responses exist or is not impressed using 1) www.favoritesite.com or 5) www.fifa.com, using the regular expression {WORLD, CUP, FIFA}, and English language only.

g. End user adds Keyword {GERMANY} with 2,000,000 responses.

h. End user adds Keyword {ITALY} with 1,000,000 responses.

i. End user adds Keyword {CHAMPION} with 500,000 responses. Fact Italy is the FIFA Germany 2006 World CUP Champion. This logically eliminates the need to use France since they are runners up and any news making reference to the final in future tense.

j. The Hybrid Pyramid Structure validates and filters out {GERMANY, ITALY, CHAMPION} 500,000, responses minus 50% redundancy or pork equals 250,000 responses k. End user adds Keyword {RED} with 250,000 responses.

l. End user adds Keyword {GOLD} with 75,000 responses.

m. End user adds Keyword {PENALTY} with 25,000 responses. Fact Z. Z. was given a red card and ejected from the game, he was also awarded the Golden Ball award for being the best tournament player, and his team France lost the final in penalty kicks.

n. The Hybrid Pyramid Structure that validates and filters out {RED, GOLDEN. PENALTY} 25,000 responses minus 50% redundancy or pork equals 12,500 responses.

Example Pyramid Structures Browser Search Analysis: Cholti (1000) creates the Informational Pyramid Structures for FIFA content, which includes the World Cup and League Tournaments. (720) Simple Pyramid Calculations: uses Simple Pyramid (Joins, Blocks, Walls and Ceiling) collection to create 1,000,000 cells: World is a Join with magnitude 0 and is a location; Cup is a Join with magnitude 0 and is an object; and FIFA is a Block with magnitude 2 and is a company.

(730) Hybrid Pyramid Calculations: uses Hybrid Pyramid (Joins, Blocks, Walls, Ceilings) collection to create 10,000 cells: Germany is a Join with magnitude 1 and is a country and geospatial. Italy is a Join with magnitude 1 and is a country and geospatial. Champion is a Block with magnitude 2. Red is a Join with magnitude 0 and is a color. Gold is a Join with magnitude 1 and is a color. Penalty is a Join with magnitude 1.

Using player collection, for example Diego Armando Maradona, is associated as a player that played for Boca Juniors, Argentina, Barcelona, Spain and Napoli, Italy. Zidane can be associated as a player that played for Bordeaux, France, Juventus, Italy and Real Madrid, Spain. Boca Juniors, Real Madrid and Napoli are members of the Teams collections. Both Maradona and Zidane won the Adidas Golden Ball 1986 and 2006 respectively.

(740) Complex Pyramid'Calculations: uses Complex Pyramid (Joins, Blocks, Walls, Ceilings) collection to create 100 cells: {WORLD, CUP, FIFA, GERMANY, ITALY, CHAMPION, RED, GOLD, PENALTY, ZIDANE, BUFFON, CANNAVARO, SHAKIRA} have a magnitude of 15.

(720) Simple, (730) Hybrid and (740) Complex Pyramid collections may use the same English language semantics KEYWORDS, nevertheless they use different quality values to create objects of exact magnitudes.

Example: When the end user makes a request such as {WORLD, CUP, FIFA}, the query requires the (8×8) cluster to perform an eigenvector search to derive the highest valued replies to the end user. W_RANK identifies the HQ1 owner of the FIFA KEYWORD Summary Data Pyramid Structure for the result, absent any calculations, since the data within the supplier system is current. Finally, W_RANK uses a weighted algorithm instead a Regular Expression filterine mechanism (or Caesar's Divide and Conquer) strategy.

5. Definitions

HIVE: is an artificial intelligence managerial hierarchical structure refers to a decentralized parallel clustered large scale supercomputer consisting of a plurality of nodes that are specifically arranged in tiers.

Search Pattern: is the conversion of at least 1 relevant keyword and cluster to independent variables.

Browser: software that receives human input and sends the input as request message to a search engine that in turn processes the request, and forward chains the output response to the end user's terminal.

Glyph: is a database object that represents a keyword or cluster and stores all static global variables.

Super Glyph is a dynamically statistical database object for each Glyph with personalized and dynamic statistics of the analysis of the end user's interactions within a session.

Triangulation Deductive Reasoning or TDR: the methodical analysis and logical prioritization and rearranging of end user's keywords, solving for missing gaps of information, inserting and expanding available keywords used in a session to find the final destination. Determining the independent variables (I, J, K) that best represents the smallest identifiable partition of the Internet and then transforming the valid content of each Site and web page into dynamical statistical database objects. Valorizing the top dynamical statistical database objects to find and determine by using association, likelihood and relevancy guidelines additional independent variables that are used to distill and sub divided in real time the visible environment to a session.

Cholti (1000) selects a Search Pattern and using TDR performs the following purification as follows: (0) Limits the (500) Internet environment and bind it within a Search Pattern with a (710) Join Pyramid or Super Block that maps a relevant environment with 1 billion web pages. (1) Superset(I) or (I) shrinks the relevant environment and binds it within an (720) Simple Pyramid or Block that maps an improved environment with 1,000,000 web pages and finds (94) $1^{st}$ key featured associations. (2) Set(I, J) or (J) shrinks improved environment and binds it within an (730) Hybrid Pyramid or Sub Block that maps an optimal environment with 10,000 web pages and find (95) $2^{nd}$ key featured associations. (3) Subset(I, J, K) or (K) shrinks the optimal environment and binds it within a (740) Complex Pyramid or Mini Block that maps an optimal solution with 100 web pages and finds (96) $3^{rd}$ key featured associations. (4) Cherry picks the optimal solution by measuring the inductive reasoning popularity score and the deductive reasoning actual relevant content score.

Search Strategy: is the TDR (0) purification process that uses the dominant tendency of the human brain based on the keywords typed by the end user and the (712) Commercial keyword to bind the search process with a (710) Join Pyramid or Super Block that maps a relevant environment 1 billion web pages.

Basic Glyph Equation: is the TDR (1) purification process that shrinks the environment from 1 billion to 1 million web pages by using the (1001) primary independent variable to create a (720) Simple Pyramid or Block to map an improved environment with 1,000,000 web pages and using rules of association during the [AX] Macro Page Analysis using human knowledge to probabilistically selects the (94) $1^{st}$ key featured association collection.

Advanced Glyph Equation: is the TDR (2) purification process that shrinks the environment from 1 million to 10,000 web pages by using independent variable (K) to create a (730) Hybrid Pyramid or Sub Block to map an optimal environment with 10,000 web pages and using rules of relevance during the [BX] Macro Page Analysis using human wisdom to probabilistically selects the (95) $2^{nd}$ key featured association collection.

Improved Glyph Equation: is the TDR (3) purification process that shrinks the environment from 10,000 to 100 web pages by using independent variable (K) to create a (740) Complex Pyramid or Mini Block to map an optimal solution with 100 web pages and using rules of likelihood during the [CX] Macro Page Analysis using human understanding to probabilistically selects the (96) $3^{rd}$ key featured association collection.

Optimal Glyph Equation: is the TDR (4) purification process that shrinks the environment from 100 to 1 web pages to create the (750) by using the inductive reasoning popularity score and physically reading and parsing the actual content belonging to the best pages to derive with deductive reasoning the final score.

Codex is a massive book that stores the billions of common denominator search patterns possessing a Super Glyph equation to derive optimal responses for static requests, and optimal sized environments for dynamic and personalized sessions consisting of 2 or more consecutive requests.

Mass is the overall quality of a Search ranging from lowest to highest as follows:

a) Mass less searches have no independent variable with the lowest rate of accuracy, and the response has (2^30) or one billion web pages.

b) Lowest Mass searches have at least 1 independent variable with a low rate of accuracy, and the response has (2^20) or one million web pages.

c) Average Mass searches have at least 2 independent variables with a average rate of accuracy, and the response has (2^10) or one thousand web pages.

d) High Mass searches are targeted with at least 3 independent variables with a highest rate of accuracy, and the response has (2^7) or one hundred web pages.

e) Highest Mass searches are deciphered with at least 4 independent variables with certitude, and the response has (2^0) or one web page.

Significant Levels of Difference: represent the total number of relevant independent variables are available in a given Codex Page after analysis of end user's keywords and clusters and then finding additional independent variables through means of deductive reasoning. End user's sessions are capped at 4 independent variables, to achieve higher levels resource intensive data mining triggered by analysis of the correlated lowest identifiable common denominator environment.

Zero Significant Difference: (U) the environment has no mass for vague searches and (x) is greater than 200 and the number of web pages is: $(x!-(x-6)!)/6!$.

First Significant Difference: (FSD) the environment Mass is between 1 and 3 for vague searches and (x) ranges from 120 to 60 and the number of web pages is: $(x!-(x-5)!)/5!$.

Second Significant Difference: (SSD) the environment Mass is between 3 and 5 for concise searches and (x) ranges from 60 to 40 and the number of web pages is: $(x!-(x-4)!)/4!$.

Third Significant Difference: (TSD) the environment mass is between 5 and 6 for precise searches and (x) ranges from 40 to 30 and the number of web pages is: $(x!-(x-3)!)/3!$.

Fourth Significant Difference: (QSD) the environment mass is between 6 and 6.5 for optimal searches and (x) ranges from 30 to 25 and the number of web pages is: $(x!-(x-2)!)/2!$.

Fifth Significant Difference: (PSD) the environment mass is between 6.5 and 6.95 for optimal searches and (x) ranges from 25 to 15 and the number of web pages is: $(x!-(x-1)!)/1!$.

Sixth Significant Difference: (HSD) the environment Mass is 7, and thus optimal and (x)=10 is $(x!-(x-0)!)/0!$ or 1 web page. Also known as Direct Search where the end user knows the destination with certainty.

[R] or Right Brain Conversions: Right Brain environmental independent variables are expressed as (x), (y) and (z), which are replaced with Quad, Pentane, and Hexane (500) Internet is (U) comprising an environment of 32 billions+ web pages. Block: is a common denominator environment that is based on at least 1 search pattern. Each Block can be further subdivided into a Sub Block provided at least 1 relevant search pattern exists. Each Sub Block can be further subdivided into a Mini Block provided at least 1 relevant search pattern exists.

An Element is the smallest identifiable partition of the Internet that the XCommerce (2000) optimally derived from correlating, data mining and valorizing the top results. Once the lowest subdivision of the Internet is found using Search Patterns a unique Codex Page is created, otherwise a Codex Page already exists with its corresponding Z_Price Bitmap collection of top (n) pages results.

Super Site is a database object converts each web page belonging to the lowest sub division of the Internet, after match/merging and then correlating all visible web pages belonging to an Internet Site, and then adds statistical characteristics used for deductive reasoning analysis of at least 1 request belonging to a session.

Super Page is a database object that consists of each web page belonging to the lowest possible attainable sub division of the Internet, after all the relevant Super Sites have been identified, and then adds statistical characteristics used for deductive reasoning analysis for each request belonging to a session.

The environment contains a list of linguistic and geospatial keywords and clusters and then Cholti (1000) converts the keywords into Glyph dynamic statistical objects.

Rules of Association: synonymous with TDR purification process (1) where each independent Glyph is associated to a category, e.g. person, historical event, product or related object.

Rules of Relevance: synonymous with TDR purification process (2) where each independent Glyph is associated to a category, e.g. person, historical event, product or related object.

Rules of Likelihood: synonymous with TDR purification process (3) where each independent Glyph is associated to a category, e.g. person, historical event, product or related object.

Categories: Cholti (1000) associates Glyphs to Categories by using the rules relevance and likelihood to correlate linguistic and geospatial related categories to expand the number of independent variables. When a Left Brain and Right Brain category are merged as one variable they become an Event. Once 1 Event is found they become the primary and most significant Managerial Hierarchical Relationship Indices belonging to a search pattern.

Mimicking the Brain: a language based expert system method that mimics the brain to decipher at least 1 end user's final destination by continuously at least one browser request by arranging keywords into Left Brain linguistic and Right Brain geospatial objects that helps create an optimal relationship index that partitions the environment by determining the best fit search pattern that is stored in a Codex that dynamically analyzes, valorizes, quantifies, qualifies, reorganizes, reformulates and interprets end user's intentions to identify the best way to find the final destination of a session.

Deciphering: synonymous with TDR purification process (2) where each independent Glyph is associated to a category, e.g. person, historical event, product or related object. The force behind the process of deciphering with certainty the best response is the ability to measure the available inventory contained in the smallest environmental partition by using logic to make web pages from irrelevant to relevant, by using resource management that weights the quality and probability value that best matches the best fit search pattern, and then reads, locates and selects the highest level of satisfaction content.

Deductive Reasoning: the process of identifying the highest number of independent variables that create the smallest identifiable partition that serves as a common denominator that describes the end user's intentions as follows:

Hot and Cold Analysis trending valuation of each keyword belonging to a session. Each request with at least 1 independent variable is converted into a Search Pattern and stored as a Codex page and is assigned a (710) Join Pyramid.

Preprocessed Search Pattern: Cholti (1000) measures the quality of the Search Pattern and determines if the optimal response is readily available. If yes: immediately sends the top (n) responses to the end user, avoiding any calculation, since the top (n) responses are contained in a pre processed Z_Price Bitmap data structure. If no:

Association using Set Theory: TDR $1^{st}$ Step expands the Glyph equation and qualifies each keyword and reevaluates what is the newly derived best search pattern. Keywords are transformed into Glyphs with linguistic, geospatial and statistical dimensions. Cholti (1000) $1^{st}$ inserts missing gaps of information and uses rules of association using Set Theory to assign to each Glyph category characteristics. Once the most probable categories are known. $2^{nd}$ adds (94) key featured association of probable keywords to create (720) Blocks with 1,000,000 web pages and checks in its inventory to determine if the optimal response is available to immediately send the top (n) responses to the end user.

Relevancy Analysis: TDR $2^{nd}$ Step: expands the Glyph equation and adds the most relevant collection of Super Glyphs and then applies likely and unlikely analysis to correlate the top information and determines if 2 categories can be match/merged into 1 event, which in turn expands the number of independent variables. Cholti (1000) finds an Event via the relevancy analysis it create (730) Sub Block partitions with 10,000 web pages and then determines if the optimal response is readily available it immediately send the top (n) responses to the end user.

Likely and Unlikely Analysis: TDR $3^{rd}$ Step: expands the Glyph equation and adds the most relevant collection of Glyphs and then applies likelihood analysis based on the best category characteristics to correlate the top information and then determines if 2 categories can be match/merged into 1 event, which in turn expands the number of independent variables. Once an event is found using the likelihood analysis it creates (740) Mini Block with 100 web pages and checks in its inventory to determine if the optimal response is readily available, and then immediately send the top (n) responses to the end user.

'Cherry Picking' optimal Content Value: Cholti (1000) uses the "Seeing is believing" approach to pick the top (n) content value results (750) element with 10 web pages that are forwarded to the end user.

Vague Search: Basic Glyphs uses human knowledge to derive the (711) Anchor Circle of Accuracy from the (500) Internet with 32 billion web pages, and then purifies each Search Pattern by adding trending dimensions to grant higher numerical values to keywords in order to identify Commercial Clusters and creates the (720) Simple Pyramid.

Anchor Circle of Accuracy: the Dominant Tendency of the human brain binds the Basic Glyph Equation to a (710) Join Pyramid that maps a relevant environment with 1 billion pages in order to eliminate the geometric rate of growth of the Internet, and then using human knowledge (or Intelligence) in order to select an Anchor. The Anchor Glyph $Q(x, y, z)$ maps the (711) Anchor Circle of Accuracy that serves as the Point of Origin with 32,000,000 web pages. The Anchor Glyph becomes the new primary independent variable Superset(I) or (I) and serves as the Search Pattern's Point of Origin.

Commercial Circle of Accuracy: Basic Glyphs incorporates TQM values to each Glyph and thus commercializes and monetizes the search process. Then transforms the highest relevant Glyph into a Commercial Cluster, which in turn becomes the new primary independent variable Superset(I) maps the (712) Commercial Circle of Accuracy that serves as the new Point of Origin with 8,000,000 web pages. Omitting the Anchor Circle when Anchor and Commercial Glyph are the same.

Visible Circle of Accuracy: Basic Glyph Equation dependent variable y, z) filters and rules of association to create (720) Simple Pyramid that maps an improved environment with 1,000,000 web pages.

How to create the Relevancy Circle of Accuracy: (Static Analysis) Cholti (1000) converts each keyword and cluster into Glyph and then determines which of the human brain sides has the Dominant Tendency [L] or [R]. Then based on the quantity and quality of the Glyph selects a Search Strategy [LL], [LR], [RL] or [RR] and then using the keyword with the lowest magnitude (highest frequency) selects from a collection of valid environments (710) Join Pyramid that maps a relevant environment with 1 billion pages.

How to create the Anchor Circle of Accuracy: [AX] Basic Glyph equation creates the Point of Origin using human knowledge using $Q(x, y, z)$ fillers to map (711) Anchor Circle with 32,000,000 web pages.

How to create the Commercial Circle of Accuracy: [AX] Basic Glyph equation creates the $2^{nd}$ Point of Origin using human knowledge to commercially filter and map (712) Commercial Circle with 8,000,000 pages.

How to create the Visible Circle of Accuracy: $1^{st}$ selects the Point of Reference for a particular Basic Glyph Equation. $2^{nd}$ parses and analyzes the top (n) pages and correlates the content in order to create the AX Macro Paragraph that yields (94) key featured associations to create the (720) Simple Pyramid (Visible Circle) with 1 million pages.

How to create the Target Circle of Accuracy: Advanced Glyphs parses and analyzes the top (n) pages and correlates the content in order to create the [BX] Macro Paragraph that yields (95) key featured associations to create the (730) Hybrid Pyramid (Target Circle) with 10,000 web pages.

How to Trend the Search Process: Advanced Glyphs incorporate Usage Patterns of Behavior and News and thus trends the search process by assigning a usage and news values to each Glyph and transforms the highest relevant Glyph into a Usage Cluster that derives the Aim Circle of Accuracy with 1,000 web pages.

How to create the Bull's Eye Circle of Accuracy: Improved Glyphs parses and analyzes the top (n) pages and correlates the content in order to create the [CX] Macro Paragraph that yields (96) key featured associations to create the (740) Complex Pyramid (Bull's Eye Circle) with 100 web pages.

Commercial Value D(i): DCommerce (3000) is an artificial intelligence supercomputer that mimics the brain by adding the supply and demand financial decision making and pricing values to the Search Engine Capacity.

Ranking Value R(j): Cholti (1000) is an artificial intelligent supercomputer that mimics the brain by adding Intelligence to the Search Engine Capacity by assigning Circles of Accuracy based on the number of Independent Variables within a Static or Dynamic Request and expanding the initial equation with missing gaps of information dependent variables.

Actual Content Value C(k): Human Knowledge Optimizer (1000) is an artificial intelligence supercomputer that mimics the brain by adding Wisdom to the Search Engine Capacity based on the references, relevant keywords and (94,95,96) key featured associations to each particular request and further expand the initial equation.

How to Cherry Pick the Optimal Match: parses the actual content of the optimal solution and compares the top (n) pages against the [DX] Optimal Glyph Equation and assigns a (commercial, content, news, rank, usage value) to each page. Cholti (1000) artificial intelligence performs a quantitative and qualitative analysis and selects the optimal result. Note: The top commercial DM and rank R(j) and actual content C(k) are always part of the Display Circle of Accuracy. The dynamic Glyphs values as they appear in the actual content of the top (n) pages determine the optimal result.

EXAMPLES

1. Search Engine Optimizer

Example #1

Finds Missing Gaps of Information

End User's vague search: "A"+"B"+"C" with the following known clusters:

| | | | | |
|---|---|---|---|---|
| a. | (A + B + I) | 67%, | Value = 4, | Weight = 2.67. |
| b. | (J + B) | 50%, | Value = 3, | Weight = 1.50. |
| c. | (K + B + C) | 67%, | Value = 5, | Weight = 3.33. |
| d. | (L + C) | 50%, | Value = 5, | Weight = 2.50. |
| e. | (A + B + C) | 100%, | Value = 5, | Weight = 10.0.* |

The request has 4 known clusters 1-5 with "A", "B", & "C" as independent variables and "I", "J", "K", & "L" are Auxiliary Variables or AV. Cholti assigns to each AV a probability. Each Cluster is measured in the scale of 1 to 5. A keyword has a value of 1-3 depending on their raw Boolean algebra page results. Cluster (A+B+C) or "American Civil War" is broad and has a value of 1. A cluster possesses the value of Minimum (Sum (Keyword)+1, 5). "A", "C", "I" and "J" has a value of 1, "B" and "K" has a value of 2, and "L" has a value of 3. Weight is calculated by multiplying the probability*value. *If a cluster is an exact match the Weight is multiplied*2. As a SWAG accuracy=Minimum (Maximum (Weight−AV, 1), 10). ˆ denotes logical OR, + or & denotes logical AND. Cholti creates the following hierarchical set:

a. Superset(I)=(A+B+C) Value=5, Weight=10 & Accuracy=10.
 b. Set(I, 1)=(A+B+I) Value=5, Weight=6 & Accuracy=5.
 c. Set(I, 2)=(J+B) Value=4, Weight=4 & Accuracy=3.
 d. Set(I, 3)=(K+B+C) Value=5, Weight=8 & Accuracy=7.
 e. Set(I, 4)=(L+C) Value=5, Weight=4 & Accuracy=3.
 f. Set(I, 5)=(A+B+C)+JˆKˆL, Value=5, Weight=10 & Accuracy=10.

Example #2

Basic Glyphs

End User's vague search: $1^{st}$ "D"+"A"+"B"+"C". $2^{nd}$ "D" is the anchor. $3^{rd}$ "A+B+C" is Superset(I). $4^{th}$ "D" is Set(I, J). "D+A+B+C" is the request and has four independent variables "A", "B", "C", and "D". "A", "B" and "C" or "American Civil War" have a value of 1, and "D" or "Battlefield" has a value of 2. "D" is the strongest Keyword and is considered the Anchor. "A+B+C" is an exact cluster with a value of 5. Consequently, "A+B+C" becomes Superset(I) and "D" Set(I, J) used as anchor. Cholti creates the following hierarchical set:

a. Superset(I)=(A+B+C). Value=12. Weight=5. Accuracy=10.
 b. Set(I, J)="D". Value=10. Weight=10. Accuracy=10.
 c. Subset(I, 1, K)="D" & (B+C)ˆIˆC. Value=10. Weight=7. Accuracy=4.
 d. Subset(I, 2, K)="D" & (AˆCˆJ)ˆ"B". Value=10. Weight=7. Accuracy=5.
 e. Subset(I, 3, K)="D" & (AˆKˆB)ˆ"C". Value=10. Weight=7. Accuracy=6.
 f. Subset(I, 4, K)="D" & (AˆBˆL)ˆC. Value=10. Weight=7. Accuracy=5.
 g. Subset(I, 5, K) "D" & (AˆBˆC). Value=10. Weight=10 Accuracy=10.

* Each Subset(I, J, K) used has a plurality of AV & DV available to shrink the size of the environment.

Example #3

Advanced Glyphs

End User's Request: (1) "D"+"A"+"B"+"C"+"E". (2) "D" is the anchor. (3) ("A+B+C")+[DV1]+[DV2] is Superset(I). (4)+[DV3]+[DV4]+Set(I, J). (5) "E" geospatial data (w, x, y, z). "D", "A", "B", "C" & "E" is the request and has 5 independent variables "D", "A", "B", "C" & "E". "A" & "C" have a value of 1, "B" & "D" have a value of 2. "E" or "Gettysburg" is geographic (w, x, y, z) and has a value of 5. "E" is the strongest Keyword but is geospatial and is not the anchor, leaving "D" or "Battlefield" as the Anchor. "A+B+C" or "American Civil War" is an exact cluster with a value of 5. Consequently, "A+B+C" becomes Superset(I) and "D" or "Battlefield" Set(I, J) used as anchor.

"E" is geographic (w, x, y, z), where (w)=US, (x)=Pennsylvania, (y)=a plurality of valid Zip Codes, z=Gettysburg is the center of a circle with a radius of n miles that contains all the y collection of Zip Codes. "US" or (w) is associated with existing toll free Area Codes of 800 and 888 et al that are national in scope. "Pennsylvania" or (x) associated with the LATA where the Gettysburg is located.

In example #2, Cholti (1000) measured the value of [L] left side of the brain information and there is also [R] [R] right brain information. When calculating checkmate combinations the system determines if a 10 exists on both sides for an optimal result, otherwise if [L] side value+[R] right side value are greater than 10 it will display the improved result.

In this case there is no optimal result with a check mate value of 20. When determining Subsets "E" & "D" are matched/merged to "X" as follows:

a. Superset(I)=(A+B+C*). Value=6. Weight=6. Accuracy=10.
 b. Set(I, J)=(A+B+C+D*). Value=8. Weight=8. Accuracy=10.
 c. Subset(I, 1, K)=(D*+A+B)ˆ(IˆC). Value=12. Weight=10. Accuracy=9.
 d. Subset(I, 2, K)=(D*+(AˆCˆJ)+B). Value=12. Weight=8. Accuracy=6.
 e. Subset(I, 3, K)=(D*+(AˆK) (BˆC). Value=12. Weight=10. Accuracy=9.
 f. Subset(I, 4, K)=(D* & (AˆBˆL)ˆC. Value=12. Weight=8. Accuracy=6.
 g. Subset(I, 5, K)=(D* & (AˆBˆ C). Value=12. Weight=10. Accuracy=10.

The probability was modified to square root p(x). The Weight was rounded to its highest integer value, and does not exceed 10. Thus 0.5 was modified to 0.7 and 0.67 to 0.8. Each Subset(I, J, K) uses geographic (w, x, y, z) Glyph filters to further shrink the size of the environment.

Example #4

Super Glyphs

End user's requests are identified, validated and verified into keywords. A keyword can be a 'Zero Cluster' and thus become a (yellow) Super Glyph. Geographic (w, x, y, z) hierarchy filters can become a (green) Super Glyphs. Exact language based clusters that are used as filters become (blue) a Super Glyph, corporate information become (red) a Super Glyph and personal information become a (purple) Super Glyph.

An end user is random surfing the Internet and after several requests the system has determined that a plurality of valid Advanced Glyphs exists as follows:

a. "War Gettysburg*" ([E1]+[G1]).
 b. "Civil War Gettysburg*" ([E2]+[E1]+[G1]).
 c. "American Civil War Pennsylvania" ([G2]+[E2]+[E1]+[G3]).
 d. "Robert Lee" ([E3]+[E4]).
 e. "General" ([E5]).
 f. "General Robert Lee" ([E5]+[E3]+[E4]).
 g. "Historical Battle Map USA*" ([E6]+[E7]+[E8]+[G4]).
 h. "American Civil War Battle Gettysburg*" ([G2]+[E2]+[E1]+[E7]+[G1]).

From this information USA=[G4], Pennsylvania=[G3], American=[G2] and Gettysburg=[G1] are geographic (w, x, y, z) and are represented with (green) Super Glyphs. The system has identified valid (blue) English Keywords and Clusters War=[E1], Civil War=[E2]+[E1], American Civil War=[G2]+[E2]+[E1], General=[E5], Historical Map=[E6]+[E8], Battle Map=[E7]+[E8]) and Historical Battle=[E6]+[E7]. The system identifies purple or personal Super Glyphs such as General Robert Lee=[P1], Abraham Lincoln=[P2], General Meade=[P3], General Hancock=[P4], General Stuart=[P5], General Longstreet=[P6], General Ulysses Grant=[P7] and Robert Lee=[P8].

Geospatial data (green) and English (blue) language clusters consists of Gettysburg or [G1] is assumed to appear in all, Pennsylvania or [G3] in all except request 7, and USA or [G4] in requests all except 3 and 7. American Civil War or [G2]+[E2]+[E1] weight is 10, Civil War or [E2] [E1] weight is 5, and "War" or [E1] weight is 1.

Personal (purple) Super Glyph consists of General Robert Lee or [P1] has a weight of 10, Robert Lee or [P8] has a weight of 5, and General or [E5] has a weight of 1. Historical Battle Map or [E6]+[E7]+[E8] has a weight of 10, Historical Battle or [E6]+[E7] has a weight of 3, and Battle Map or [E7]+[E8] has a weight of 3.

War or [E1] is the most frequent keyword appearing in request 1, 2, 3, and 8, and Battle or [E7] is the hottest appearing in 7 and 8. Robert Lee or [P8] is the coldest since the last request they appear is in 6 and for the first time in 4.

The Hot & Algorithm parameters determine optimal Super Glyph combinations that will yield the reasonable results. XCommerce (2000) identifies "Gettysburg" or [G1] as the primary geographic (w, x, y, z) filter. The system selects American Civil War or [G2]+[E1]+[E2] as the anchor primary cluster or Superset(I), and General Robert Lee or [P1] as the secondary cluster or Set(I, J) and Historical Battle as the tertiary cluster or Subset(I, J, K).

The common related Superset(I) environment size is 8 million W_Rank, distributed in the following manner Superset(I) or "American Civil War" has (10/16)*8 million or 5 million W_Rank, Superset(2) or "Civil War" has (5/16)*8 million or 2.5 million W_Rank, and "War" the remainder 500,000 W_Rank.

The common related Set(I, J) environment size is (800,000 or 800K) W_Rank, distributed in the following manner Set(I, 1) "General Robert Lee" has ((10/16)*800K or 500K) W_Rank, Set(I, 2) or "Robert Lee" has ((5/16)*800K or 250K) W_Rank, and Set(I, 3) or "General" the remainder 50K W_Rank.

The common related Subset(I, J, K) environment size is (80,000 or 80K) W_Rank, distributed in the following manner Subset(I, J, 1) "Historical Battle Maps" has ((10/16)*80K or 50K) W_Rank, Subset(I, J, 2) or "Historical Battle" and Subset(I, J, 3) "Battle Map" both have ((3/16)*80K or 15K) W_Rank.

The following personal Super Glyphs have the following weights: [P1] or General Robert Lee=100, [P2] or Abraham Lincoln=70, [P3] or General Meade=70, [P4] or General Hancock=80, [P5] or General Stuart=70, [P6] or General Longstreet=90, [P7] or Ulysses Grant=80, and [P8] or Robert Lee=95.

The strongest keyword is Longstreet and General the weakest. The following geospatial Super Glyphs have the following weights: [G1] or USA=100, [G2] or Pennsylvania=90, [G1+G2] or USA+Pennsylvania=70, [G3] or Gettysburg=40, [G1+G3] or USA+Gettysburg=35, and [G1+G2+G3] or USA+Pennsylvania+Gettysburg=20.

The system measures by filtering Superset(I) "American Civil War" then Set(I, 2) or Set(I, 3) "Robert Lee" |General then Subset(I, 2, 2) or Subset(I, 3, 3) "Battle Map" to derive the TOP 1000 W_Rank. Then the top 1000 W_Rank are filtered against geographic (w, x, y, z) filter to determine the TOP 100. Finally, the system derives the TOP 10 W_Rank by comparing Super Site and personal Super Glyphs. Cholti 'cherry picks' the Top 1 or optimal based upon the highest Super Page weighted page rank. The method was explained step by step, yet Cholti (1000) performs all calculations in one shot up to the TOP 100, and then executes the resource intensive algorithm of deductive reasoning to solve for the optimal solution.

Example #5

Related Request

Example #5: Related Requests: 1. End User's [A], [B], [C], [D], [E], [F], & [G]. [A]=American, [B]=Civil, [C]=War, [D]=Robert, [E]=Lee, [F] Battlefield, [G]=Gettysburg.

a) [A+B+C] is Superset(I), [D+E] is Set(I, J), [F] is Subset (I, J, K), [G] Gettysburg is a Zero Cluster and geographic(w, x, y, z) centroid, [H]=USA, [I]=Pennsylvania, and [J]=Zip Code valid areas around Gettysburg, Pa. [A-F] consist of a left side of the brain check mate combination and [G] derives a right side check mate combination.

b) [K]=Harrisburg (717), [L]=Altoona (814) or Williamsport (570), USA [M]=(800) or (888) toll free Area Code in ANI and are active. [K], [L] & [M] are Super Glyph filters. (717)=95, USA (800) or (888)=80, (570) or (814)=70. Not mentioned by being probable Allentown or (484), (610), (835)=60, Pittsburgh (412), (724), (878)=50, and Philadelphia (215), (267)=50. The telecommunication side of the equation can quickly become complicated, for simplicity only those with a probability>=70% are used. Probabilities are assigned by distance to the center of the circle of calculation.

2. End User's request is [D], [E], [V], [W]. [D]=Robert, [E]=Lee, [V]=Union, [W] Confederates.

3. End User's request is [G], [X], [Y]. [G] is Gettysburg, [X] Historical, [Y] Maps.

Requests 1 to 3 are valid and each has a separate Superset (I), Set(I, J) and Subset(I, J, K). Cholti determines the following: (i) request 1 is directly related to request 2 via [D]+[E] "Robert Lee", (ii) request 1 is directly related to request 2 via [G] Gettysburg, and (iii) request 2 is indirectly related 3 via transitive (1→2).

The anchor Superset(I) is "Civil War", Superset(2) is "American Civil War", Superset(3) is "Robert Lee", Superset (4) is "Historical Maps". The anchor Superset(I) contains the other Superset(I) where I=2 to 4. The system assigns [F] Battlefield, [V] Union, & [W] Confederates as Set(I, J) filters. Set(I, J) and Subsets(I, J, K) are created by the AV list of all possible clusters of the related keyword of request 1-3. Cholti (1000) creates (720) Simple Pyramid with 1,000,000 W_Rank based on Civil War, where "Historical Map" is the hottest filter and "American Civil War" is the coldest.

In this case, [G] Gettysburg is the only hot keyword, and the message the end user gives to Cholti is to filter with the [R] side of the brain or geospatial data.

Example #6

Mulligan Requests

Cholti (1000) removes irrelevant requests from a session in order not to confound the search process.

a. End User's Request [A], [B], [C]. [A]=Blue, [B]=Gray, [C]=Gettysburg.

b. End User's Request [X1], [Y1], [Z1]. [X1]=US, [Y1]=History, [Z1]=Atlanta.

c. End User's Request [X2], [Y2], [Z2]. [X2]=Novel=[Y2] Newt, [Z2]=Gingrich

End User's [D], [E], [F], [G], [H], [I], & [C]. [D]=American, [E]=Civil, [F]=War, [G]=Robert, [H]=Lee, [I] Battlefield, [C]=Gettysburg.

[D+E+F] is Superset(I), (G+H) is Set(I, J), [I] is Subset(I, J, K), [C] Gettysburg is a Zero Cluster and geographic (w, x, y, z) centroid, [J]=USA, [K]=Pennsylvania, [L]=Zip Code valid areas with Gettysburg, Pa. [D-I] consist of a [L] side of the brain check mate combination. [C|Z1] derives a [R] side check mate combination.

[M]=(717), [N]=[814] or [570] & [O]=[800] or [888] toll free Area Code in ANI and are active. Only area codes or NPA that are reasonable or have a probability>=70% are included in this calculation. [P]=Atlanta (404) or (470) & [Q]=Greater Atlanta (678) or (770) are the Area Code in ANI ranges that become inactive via mulligan. Athens (706), Rome (762), Macon (478), Valdosta (229), and Savannah (912) are probabilistic.

[M], [N], [O], [P], & [Q] are Super Glyph filters. Validating [X1] as geographic ([US], X, Y, Z), [Z1] as geographic ([US], [GA], [Atlanta], Z), and (Y2+Z2) is a personal purple Super Glyph (for Alternate History Gettysburg Trilogy.) and [Y1] [X2] are a yellow Super Glyphs.

The system is able to match/merge requests 1 to 3 as a single request that is linked to request 4. The keywords used in the match/merge process are assigned as (yellow) unused Super Glyphs. Thus the before request 1 to 3 looks like this [A], [B], [C], [X1], [Y1], [Z1], [X2], [Y2], & [Z2]. The 'After' looks like this [A], [B], [C] (yellow) Super Glyphs. [X1], [Y1], [Z1], [X2], [Y2], [Z2], & geospatial data ([US], [GA], [Atlanta], Z) are valid Hot & Cold Algorithm variables values used for TDR or Deductive Reasoning as used throughout this document when solving the optimal solution.

Finally the system creates a resultant request based on 1 to 4 that are linked to a single request. [D], [E], [F] is converted to [W1], [G], [H] to [W2], and [Y2], [Z2] to [W3]. The final resultant is [W1]+[W2]+([I]|[A]|[B])+(geographic ([US], [GA], [Atlanta], Z)+geographic ([US], [PA], [Gettysburg], Z)|([X1]|[Y1]|[Z1]|[X2] |[W3])).

Example #7

Optimal Answer

From previous example, once the system creates the optimal [DX] hierarchical set, the system is able to value and weight each Super Page and Super Site. As noted before Super Pages and Super Sites are dynamic objects that store a plurality of weights and probabilities for all the valid requests belonging to a session.

Cholti (1000) finds the optimal solution that maps the top 100 pages from the TOP 1,000 W_Rank page results. Then it compares by paragraph, which English language or [L] side of the brain matches have the highest values, and compares to the Super Page known valid geospatial data (w, x, y, z). At this time the mulligan keywords in particular Zero Clusters are finally used in a Boolean algebra approach to maximize a paragraph weight using the Ex value and sets the weight of page to equal the maximum of ([DX] Super Page weight, Ex or Paragraph value*2).

The system 'cherry picks' the highest value from top to bottom until the list of 100 pages is in ascending order. The highest value is the optimal result and the remaining (n) results are also sent to the end user as output.

Example #8

Cholti Method Overview

In Examples #1 to #6 each queries begin as keywords and numeric combinations that are converted into a regular expression and the using Boolean algebra the search engine find the destination. Cholti (1000) calculates the preprocessed [AX] and [BX] values to shrink the size of the environment and then uses the Hot & Cold Algorithm parameters and Q(x, y, z) values to further shrink each member of the hierarchical set to have the smallest possible size.

The unrelated keywords and mulligan keywords are now used to parse and valorize paragraph by paragraph the content of each page. Then the system selects the highest valued as the optimal result. Once the optimal environment is known with the best results a mathematical equation is created that describes the hierarchical set characteristics and is then converted into Cholti style unloaded and loaded Glyphs with Q(x, y, z) and optionally with Q(w, x, y, z) values that replaces the end user's regular expression. This regular expression has the essence of the matter of [AX], [BX], [CX], and [DX] samples, furthermore it has the Ex or paragraph values to solve for the end user's request. When a request has a common denominator Z_Price bitmap and a plurality of independent variables the preprocessed optimal environmental hierarchical set is known with the appropriate Q(w, x, y, z) values leaving the Ex calculation to be determined on the fly.

The mathematical Glyph equation when available will significantly reduce the processing power required to respond an end user request. The equation takes into account all the requests within a session to create a final hierarchical set.

Instead of assuming erroneously that a Boolean algebra search always reaches with certitude the final destination. Cholti dynamically adjusts to the end user usage patterns and mimics the end user ongoing trial and error method to reach the final destination, by improving over time as better feedback is obtained.

In a session certitude is achieved each time a significant difference event is detected, unfortunately Boolean algebra search engines consider all events important. Cholti knows betters and uses set theory rules of association and transitivity to link related and unrelated requests, and measures if the change between two consecutive request matters.

When the end user make a predefined Z_Price Bitmap request that the environment has detected millions of similar request in a specific time frame, the results are always certain and up to date, since the AI Spider continuously in real time updates and improves the content of the Cholti mathematical equation optimal environment. Information that is not in real time is confounded. The greater the time the more unreliable the information becomes. In the case of Cholti real time means upon AI spider detection of significant information as it scans methodically the content of the Internet. Upon detect a new page in the environment XCommerce (2000) has the information ranked absent of having to perform the resource intensive and time consuming Master index recalculation for all page ranks.

In this example collectively the improvements mentioned over existing (610, 620) Boolean algebra Search Engine capacities is what permits Cholti (1000) to achieve Informational Certainty 2. Human Knowledge Optimizer Example #9

Commercializing the Request

Example #9 Commercializing the Request: during the process of commercializing the Request, Cholti (1000) rearranges a request and add a commercial cluster which in turn solves an independent variable.

a. End User's Request [A], [B], [C]. [A]=Blue, [B]=Gray, [C]=Gettysburg.
b. End User's Request [X1], [Y1], [Z1]. [X1]=US, [Y1]=History, [Z1]=Atlanta.
c. End User's Request [X2], [Y2], [Z2]. [X2]=Novel=[Y2] Newt, [Z2]=Gingrich
d. Dominant Tendency is the [R] Right Side of the Brain
e. Anchor is USA
f. Superset(I) is New Gingrich; Superset(X) is USA
g. Set(J) is US History; Set(Y) is Pennsylvania
h. Subset(Z) is Gettysburg
(I, J, Y, Z) are the independent variables with Mass 6. 30_Lucky_4_Likely_5. (5) The precise search accuracy is about 96% to 99% with (25.5!–23.5!)/2! or 625 web pages. (6) The quality is set to 6.

Employing Human Knowledge to reach the final destination.
a. Cholti determines that Novel or. Book is the Commercial Cluster.
b. Dominant Tendency is the [L] Right Side of the Brain.
c. Anchor is USA and the Commercial Cluster Novel or Book
d. Superset(I) is Novel or Book; Superset(X) is USA
e. Set(J) is Newt Gingrich; Set(Y) is Pennsylvania
f. Subset(K) is US History, Subset(Z) is Gettysburg
(I, J, K, X, Y, Z) are the independent variables with Mass 6. Grey and Blue keywords are demoted to Unlikely dependent variables. 30_Lucky_5_Likely_3_Unlikely_2. (5) The optimal search accuracy is about 96% to 99% with (25.32!–24.32!)/1! or (integer) 25 web pages. (6) The quality is set to 6 and once the ISBN number is known for the actual book Newt Gingrich {"Gettysburg"} event the result is optimal!

Example #10

[AX] Macro Paragraph

[AX] Basic Glyph are incorporated as a comparison against existing (610, 620) Boolean algebra Search Engine capacities, and create preprocessed static Search Patterns, or when updating significant changes in the environment all the technology that are continuously scanning, distill, analyzing and updating the content of the Internet in real time. Cholti (1000): $1^{st}$ derives the information of a classical Boolean algebra request and in the case of the "American Civil War" several encyclopedia and Internet source reference have interesting and comprehensive explanation of the process.

$2^{nd}$ match/merges the best paragraphs of each of the web pages usually the $1^{st}$ one, nevertheless the overall quality of the actual content makes that determination. $3^{rd}$ converts the words into Glyph. Note: not all the words pass the Join Pyramid or Simple Pyramid (Join, Block, Ceiling, Wall) filters. The (710) Join Pyramid filters 70% of the words and (720) Simple Pyramid filters another 50% thus leaving 15% of the words to be incorporated as (94) $1^{st}$ key featured associations and in turn expands the Basic Glyph Equation. 1861, 1862, 1863, 1864, 1865, Abraham Lincoln, Jefferson Davis, Slavery, United States of America, Confederate States of America, Robert E. Lee, and George Meade are thus example of keywords that are related to the conflict.

Example #11

How to Incorporate Human Knowledge

For each independent variable $1^{st}$ analyzes each reference source definition, and analyzes the content of the top (n) pages once the Advanced Glyph Equation is created.

$2^{nd}$ match/merges the best paragraphs of each of the web pages usually the $1^{st}$ one, nevertheless the overall quality of the actual content makes that determination. $3^{rd}$ converts the words into Glyph. Note: not all the words pass the Join Pyramid or Simple Pyramid or Hybrid Pyramid (Join, Block, Ceiling, Wall) filters. The idea is that Join Pyramid eliminates 70% of the words, Simple Pyramid eliminates another 50% and Hybrid 33% thus leaving 10% of the words to be incorporated as (95) $2^{nd}$ key featured associations and in turn expands the Advanced Glyph Equation. 1861, 1862, 1863, 1864, 1865, Abraham Lincoln, Jefferson Davis, Slavery, United States of America, Confederate States of America, Robert E. Lee, George Meade, Fredericksburg, Mantissas, Gettysburg and military organizations and their corresponding nicknames and commanders are incorporated by reference are thus example of keywords that are related to the conflict.

Example #12

[CX] Macro Paragraph

For each independent variable $1^{st}$ analyzes each reference source definition, and further analyzes the content of the [AX] and [BX] top (n) pages once the Improved Glyph Equation is created.

$2^{nd}$ match/merges the best paragraphs of each of the web pages usually the $1^{st}$ one, nevertheless the overall quality of the actual content makes that determination. $3^{rd}$ converts the words into Glyph. Note: not all the words pass the Join Pyramid or Simple Pyramid or Hybrid Pyramid or Complex Pyramid (Join, Block, Ceiling, Wall) filters. The idea is that Join Pyramid eliminates 70% of the words, Simple Pyramid eliminates another 50% and Hybrid 33% and Complex 20% thus leaving 8% of the words to be incorporated as (96) $3^{rd}$ key featured associations and in turn expand the Improved Glyph Equation. 1861, 1862, 1863, 1864, 1865, Abraham Lincoln, Jefferson Davis, Slavery, United States of America, Confederate States of America, Robert E. Lee, George Meade, Fredericksburg, Manassas, Gettysburg and military organizations and their corresponding nicknames and commanders, geographical locations and battlefield references, are incorporated by reference are thus example of keywords that are related to the conflict. This comprises the (HUGE) "American Civil War" collection of Glyphs and association that are relevant and permit the artificial intelligence to perform deductive reasoning.

Now the Cherry Picking process becomes a real expert of the American Civil War, and can read any content of any web page and quantify and qualify using human (knowledge, wisdom and understanding) and perform TQM metrics in lieu of the end user by reading the actual content and cherry pick the final destination.

Example #13

Assigning Usage Patterns

When trending a request, Cholti (1000) has the opportunity to further rearrange a request and add a usage pattern of behavior cluster which in turn solves an independent variable.
a. End User's Request [A], [B]. [A]=Earthquake, [C]=Japan.
b. End User's Request [C], [D], [C]=Tsunami, [D]=March, [E]=2011.
c. Tsunami is the Commercial Cluster.
d. Dominant Tendency is the [L] Right Side of the Brain e. Anchor is Japan and the Commercial Cluster Tsunami f. Superset(I) is Tsunami; Superset(X) is Japan g. Set(J) is Earthquake; Set(Y) is Mar. 11, 2011

Cholti (1000) identifies Nuclear meltdown as the trending word and inserts the independent variable Glyph into the Search Process and now using human understanding does as follows:

a. Tsunami is the Commercial Cluster.

b. Nuclear Meltdown is the Usage Cluster.

c. Dominant Tendency is the [L] Right Side of the Brain d. Anchor is Japan, Commercial Cluster=Tsunami and Usage Cluster=nuclear meltdown.

e. Superset(I) is Tsunami; Superset(X) is Japan f. Set(J) is Earthquake; Set(Y) is Mar. 11, 2011 g. Subset(K) Nuclear meltdown. Cholti (1000) solved for independent variable (K)

Example #14

Using Super Site (a, b, c, d, e) Glyphs to Cherry Pick

For each Search Pattern a corresponding Join (710), Simple (720), Hybrid (730) and Complex (740) Pyramid exists and each Pyramid maps the environment, and derives critical information used during the filtering process.

Super Site (a, b, c) is metadata that helps create (720) Simple Pyramid: (a) Orange Glyph represents within a Circle of Relevance the influence a site has over the Search Strategy from min to max. (b) Black Glyph represents the advertisement value of the Super Site over a particular session from min to max. (c) White Glyph represents the supply and demand value of each page with the regards to the general public from min to max. Superset (i), dependent variables Q(x, y, z) and Super Site (a, b, c) values create (720) Simple Pyramid. Remember dependent variables Q(x, y, z) values are dynamic and end user's personalized values. When solving for a session independent variables Q(x, y, z) are used to shrink multiple environments into a (700) Informational Pyramid object, that has Informational Certainty level tiers for lowest to highest such as (710) Join, (720) Simple, (730) Hybrid, (740) Complex and (750) Optimal managerial hierarchical Pyramids.

Super Site (d) is metadata that helps create the Hybrid Pyramid: (d) Gray (matter) Glyph represents the Actual Content value within the (720) Simple Pyramid environment from min to max. Set(I,J), dependent variables Q(x, y, z) and Super Site (d) values create the (730) Hybrid Pyramid.

Super Site (e) is metadata that helps create the (740) Complex Pyramid: (e) Gold Glyph represents the real time trending value within the Hybrid Pyramid environment from min to max. Subset(I, J, K), dependent variables Q(x, y, z) and Super Site (e) values create the (740) Complex Pyramid.

Example #15

Preprocessed Static Search Patterns

End user types "American Civil War" and Cholti (1000) determines that the end user's vague search is static and up to date and then obtains the Search Pattern optimal information store in the database and rearward chains the optimal response to the end user as output. For each static request a Super Glyph equation exists in the Search Pattern (or Codex Page) database with the top (n) pages.

Example #16

Preprocessed Commercial Search Patterns

End user type "American Civil War"+"Hotel"+"Gettysburg". During the [AX] vague search analysis, "American Civil War" is the Anchor and Hotel is the commercial cluster. For each Anchor Circle of Accuracy, Cholti possess a preprocessed Commercial Cluster that commercializes the search process by using Black (advertisement) and White (supply and demand) Super Sites. Now lets add some statistics to better explain this follows:

$1^{st}$ Anchor "American Civil War" has no more than 32,000,000 web pages, $2^{nd}$ Commercial Cluster "Hotel" has no more than 8,000,000 and 3rd Complex Pyramid "Gettysburg" has no more than 100 pages. Let us suppose that web pages that have (Anchor+Hotel)=500,000 and web pages that have (Gettysburg+Hotel)=100. The Simple Pyramid has the following web page distribution: Anchor only=500,000, (Anchor+Hotel)=499,900, and (Anchor+Hotel+Gettysburg)=100. The Hybrid Pyramid has the following: (Anchor+Hotel)=9,900 and (Anchor+Hotel+Gettysburg)=100, and web pages pertaining to Complex Pyramid have (Anchor+Hotel+Gettysburg).

Example #17

Preprocessed Trending Search Patterns

Continuing with Example #16, when determining the Usage Pattern of Behavior all pages are assigned a gray (matter) Glyph and a gold (trending) Glyph filters and distill the Display Circle of Accuracy or top 10 pages, and the Optimal Circle of Accuracy or optimal page. These two filters, will simplify the [DX] 'Cherry Picking' process of reading, measuring, valorizing and determining the top (n) pages with best content that is directly related to the dynamic end user's session.

Cholti (1000) uses Super Site (a, b, c, d, e) filters based on the partial environment of Superset(I) in the case of (a, b, c), Set(I, J) in the case of (d) and Subset(I, J, K) in the case of (e), and also remember that Superset(I), Set(I, J) and Subset(I, J, K) have there own Q(x, y, z) filters based on the dynamic vector values of the keywords typed by an end user during a session while randomly surf the web to reach the final destination.

Example #18

Dynamic Search Patterns

When an end user types a concise, precise or optimal session, Cholti (1000) converts this information and assigns a dynamic value to each Super Glyph based on Hot/Cold algorithm, which possesses managerial hierarchical relationship indices, and independent variables that helps Cholti to find an existing static Search Pattern. At this point, Cholti determine the vector value of each Super Glyph and obtains the optimal Glyph equation and determines the $1^{st}$ valid environment from top to bottom. Cholti (1000) uses Super Glyph parameters to determine the following:

$1^{st}$ determines if Answer Search is valid, the dynamic request is of no significant difference and is a static request, and 'Cherry Picks' based on an environment of 10 web pages and responds to the end user immediately.

2$^{nd}$ determines if Optimal Search is valid, the dynamic request is of no significant difference and is a static request, and 'Cherry Picks' based on an environment of 10 web pages and responds to the end user immediately. Else if the Precise Search is valid, the dynamic request is of very small significant difference, and 'Cherry Picks' using the dynamic Super Glyph values based on an environment of 100 web pages and responds to the end user immediately bypassing [AX], [BX] and [CX] analysis.

3$^{rd}$ determines if Concise Search is valid, the dynamic request is of small significant difference, and 'Cherry Picks' using the dynamic Super Glyph values based on an environment of 100 web pages and responds to the end user immediately bypassing [AX], [BX] and [CX] analysis.

Otherwise the Vague Search is valid, the dynamic request is of average significant difference, and 'Cherry Picks' using the dynamic Super Glyph values based on an environment of 1,000 web pages responds to the end user immediately bypassing [AX], [BX] and [CX] analysis.

In all these cases the Search Pattern already has the [AX] and [BX] analysis have already been performed, and is already commercialized and human knowledge references are known and will begin at most using a Hybrid Pyramid comprising 10,000 web pages.

Example #19

Optimizing Dynamic Search Patterns

Continuation of Example #18. Once the [AX] and [BX] analysis have been perform and the partial environment already possesses Super Site (a, b, c, d) characteristics, Cholti will respond to the real time usage patterns of behavior and thus supply for each Dynamic Search Pattern the Super Site (e) trending value to create the end user's customized Bull's Eye Circle of Accuracy comprising of 100 web pages, and then 'Cherry Picks' the optimal response based on the quality of the actual content by measuring and comparing the end user's Super Glyph vector values that were obtained from the Hot/Cold algorithms while the end user randomly surfs the Internet to reach the final destination.

Simulation Comparison

'Boolean Algebra: End user types the keyword "Napoleon" or (i) and the Boolean algebra search engine assigns a "1" when a match occurs, and sums up the number of unique occurrences which is equal to 8,000.000 pages. Like always there is good, bad and ugly content. Based, on the business model of the search engine companies the lion share of their profit comes from advertisement, we will assign as (j) the commercialization process, which shrinks the environment to 10,000 web pages, and the further distill by using the web page quality value to create an environment of 100 web pages. At this point selecting the top (n) result is really easy, by just automatically selecting the pages with the highest page rank and then send the links to the end user's browser as output. In this case the top site will always be wikipedia.com since Ask.com and Powerset technologies made a great emphasis of the content quality value of these site and then all search engines followed. Encyclopedia Britannica is (2) and Encarta is (3) have a 10 in quality value and have a very high page rank.

Cholti: The Optimizer (1000) determines that "Napoleon" is the anchor and commercial keyword and using the human brain strategy creates an [LL] environment of 8,000,000 web pages that possess Super Site (a, b, c) characteristics, which is used to create the Simple Pyramid and [AX] Macro Page that converts "Napoleon" into "Napoleon Bonaparte" and adds "France", "General" and "Emperor" to the Advanced Glyph equation with magnitude of 7. At this point Cholti uses Super Site (d) actual content characteristics, to create the Hybrid Pyramid and [BX] Macro Page that adds "Austerlitz", "Waterloo", "Blucher" and "Wellington", and "1801 to 1815" to the Improved Glyph equation with magnitude of 10. Cholti now uses Super Site (e) trending characteristics, to create the Complex and [CX] Macro Page that adds a collection of military units, historical battle and quote or slogans to the Optimal Glyph equation with magnitude of 15. Now Cholti performs the 'Cherry Picking' process to select the top (n) pages by reading, deciphering, analyzing the actual content.

The Real Difference: Wikipedia.com will always be the optimal web page for the static and vague search, whereas Cholti has three paths (a) (Static Ranking) for concise searches Wikipedia.com is automatically the optimal response, (b) (Actual Content) for precise searches if the end user typed additional keywords, and Cholti (1000) determines that Encyclopedia Britannica is the best fit content, then Wikipedia.com is demoted from the automatic 1$^{st}$ position and sent to the 2$^{nd}$ position. (c) (TQM levels of satisfaction) for optimal searches where wikipedia.com had the top spot, but did not satisfy, and after the second request Encyclopedia Britannica had the top spot, and also did not satisfy, for the third request the top responses for the request (1-2) are demoted, and now Encarta Encyclopedia the other high quality content has the top spot. Cholti (1000) is dynamic and personalized whereas Boolean algebra search engines is static, and finally the heart and soul of the technology is (TQM) and thus customer satisfaction, and yes accuracy is directly related to the time from beginning to end, and the amount knowledge and work required from the end user to reach the final destination, Cholti (1000) previews the entire content in behalf of the human to minimize TIME and using deductive reasoning to reduce the amount of gray matter required to reach the final destination to maximize satisfaction.

We've overcome these "issues" or greatly improved the search optimally by doing the following: Generally stated end user's requests are converted into the Mayan style Glyphs that have left side and right side of the brain characteristics. The system understands that each request on its own can be optimally satisfying, and also knows that some require trial and error method. To solve this dilemma the optimizer creates Super Glyph that has weighted value for a plurality of instances within a session.

Method

Minimally the system needs to be a supercomputer with large data warehouse means that store a 'CORE List' that consists of statistics for each keyword or cluster performing the following steps:

a. Identify each keyword interactively.

b. Validate each keyword to belong to a group.

c. Verify if a keyword will be an active participant in the process of reducing the size of the environment.

d. Estimate the [AX] or 'Before' vague search environment size from the keywords typed by the end user.

e. Determine if the end user's request is significant.

f. Create Basic Glyphs that best reflects the essence of the [AX] or 'Before' request that will permit the creation of a hierarchical set consisting of a plurality of valid Superset(I), Set(I, J) and Subset (i, j, k).

g. Reorganize the end user's request to create Advanced Glyphs that further distills and shrinks the size of the environment using the [BX] or 'After' request.

h. Recognize Advanced Glyph so that the server can determine if it already exist in the 'CORE List'. If the Advanced Glyph exists in the 'CORE List' the optimal response is readily available and preprocessed no further calculations are required. Otherwise, the system must continue with [CX] or 'Improved' and [DX] or 'Optimal' samples.

i. Request the server to perform the 'Improved' sample by hierarchical distributing the search amongst subordinate based on ownership of the primary, secondary and tertiary keyword or cluster. The Basic and Advanced Glyphs are used to assign size parameter to each valid set of the hierarchical set.

j. Adjust dynamically the value of each keyword and cluster.

k. Exclude identified Zero Cluster keywords.

l. Emphasize through rules of association and transitivity a plurality of requests that are considered to have common denominator elements and are then correlated into a partial environment. The partial environment consists of a plurality of request. The partial environment retains the characteristic of each individual request.

m. Deemphasize unrelated keywords to the last significant end user's request. This process is also known as Mulligan and is uses set theory to determine the relationship between a keyword and the last significant request.

n. Maximize keyword values by using the Hot Algorithm that measures the usage pattern and significance of a keyword in a session.

o. Minimize keyword values by using the Cold Algorithm that weights keyword irrelevancy. 'Zero Clusters' and unrelated keywords have a reasonable probability of hiding the optimal result.

p. Correlate the many partial environments into the [CX] or 'Improved Samples. This process draconically reduces the environment size using Hot & Cold Algorithm parameters and stores the essence of the matter into Super Sites.

q. Assign a corporate signature to each Super Site.

r. Pick the small [CX] Sample top results of each hierarchical set to generate a collection of Super Pages.

s. Distill the small [CX] Sample using geospatial dimensions that have exact or estimated latitude and longitude components such as Country, Region, LATA, Zip Code, IP Address and ANI.

t. Commercialize keywords by available Corporate Media resources and priorities.

u. Decipher, analyze the actual content (gray matter), measure TQM level of satisfaction (trending) of each web page in order to pick using reasoning the [DX] or optimal sample.

v. Translate the end user's language based request into a Cholti language Super Glyph equation.

w. Respond to the client software with the optimal response. The optimal results may be identified as already existing in the preprocessed 'CORE List' in step h) "recognize all preprocessed calculations in the search pattern database. Alternatively for new search patterns not found in the search pattern database perform steps i) "request" to v) "translate".

x. Display to the end user the optimal request.

y. Recalculate each time the "optimal button" is clicked in the web browser and significant difference event is estimated compared to the latest Super Glyph equation or partial environment.

z. Consolidate a plurality of partial environment into a resultant environment that is contained with the valid environmental size of the hierarchical set.

Cholti (1000) transform the end user's requests follows:

$1^{st}$ transforms vague searches into concise searches by converting keywords into Super Glyph ideas and simulates the human brain to assign a search strategy [LL], [LR], [RL], and [RR] and anchor or commercial cluster and employees independent variable (I) to create the (720) improved environment with 1,000,000 web pages. Eliminates independent variable (I) from any further calculation.

$2^{nd}$ amends concise searches into precise searches employing rules of association and relevance to create the (730) optimal environment with 10,000 web pages. Eliminates independent variable (J) from any further calculation.

$3^{rd}$ improves precise searches into optimal searches and measures the content based on likeness and trending to create the (740) Optimal solution with 100 web pages. Eliminates independent variable (K) from any further calculation.

$4^{th}$ Ameliorates optimal searches into answer searches and 'Cherry Picks' the actual content to create an optimal environment of the top response, and also expands the Search Pattern Super Glyph equation when changing the environment from Internet to Improved, and from Improved to Optimal, and from Optimal to Optimal element, and from Optimal element to Optimal web page.

In conclusion static and vague searches use the Internet (500) environment with billions of web pages. Cholti (1000) converts the vague search into static or dynamic Glyph equations that create a Search Pattern that is best described as a managerial hierarchical informational pyramid object as follows:

$1^{st}$ maps English language keywords to the left brain equation and geospatial keywords to the right brain equation, and the determines the dominant tendency of the brain to assign a Search Strategy to create a (710) Join Pyramid or Super Block that maps a relevant environment with 1 billion pages as the lowest level of informational certainty.

$2^{nd}$ utilizes the anchor Glyph and Commercial Glyph to purify and shrink the size of the environment, and the uses (1001) primary independent variable (I) to changes the vague search into a concise search that creates a (720) Simple Pyramid or Block that maps an improved environment with 1,000,000 web pages that replaces and eliminates the (1001) primary independent variable (I) from further calculation. Assigning the (720) Simple Pyramid with a partial master index.

$3^{rd}$ uses independent variable (I) to changes the concise search into a precise search that creates a (730) Hybrid Pyramid or Sub Block that maps an optimal environment with 10,000 web pages that replaces and eliminates the (1002) secondary independent variable (J) from further calculation. Assigning the (730) Hybrid Pyramid with a partial master index.

$4^{th}$ uses independent variable (K) to changes the precise search into a optimal search that creates a (740) Complex Pyramid or Mini Block that maps an optimal solution with 100 web pages that replaces and eliminates the (1003) tertiary independent variable (K) from further calculation. Assigning the (740) Complex Pyramid with a partial master index.

$5^{th}$ Cherry picks the optimal solution using (1004) checkmate combination independent variables to find the (750) Optimal Pyramid with the final destination.

Final clarification when independent variables are eliminated from further calculation they create higher tiered (700) Informational Pyramid Structure objects as the informational certainty improves as follows a. Each Search Strategy eliminates the geometric growth of the Internet and binds a vague search into a (710) Join Pyramid that maps a relevant environment with 1 billion pages.

b. (1001) primary independent variable (I) changes the vague search into a concise search and creates the (720) Simple Pyramid that maps an improved environment with the top 1,000,000 web pages.

c. (1002) primary independent variable (J) changes the concise search into a precise search and creates the (730) Hybrid Pyramid that maps an optimal environment with the top 10,000 web pages.

d. (1003) primary independent variable (K) changes the precise search into an optimal search and creates the (740) Complex Pyramid that maps an optimal solution with the top 100 web pages.

e. (720) Simple Pyramid filters exclusively the relevant environment with (1001) primary independent variable (I) and thus the Superset(I) mathematical notation. The Internet absent of (F) relevant to the search.

f. (730) Hybrid Pyramid filters exclusively the improved environment with (1002) secondary independent variable (J) and thus the Set(I, J) mathematical notation. The Internet absent of (I, J) relevant to the search.

g. (740) Complex Pyramid filters exclusively the optimal environment with (1003) tertiary independent variable (K) and thus the Subset(I, J, K) mathematical notation. The Internet absent of (I, J, K) relevant to the search.

h. (720) Simple Pyramid mapped the improved environment and expands the mathematical Glyph equation by adding the (94) $1^{st}$ key featured associations. $2^{nd}$: (730) Hybrid Pyramid mapped the optimal environment and expands the mathematical Glyph equation by adding the (95) $2^{nd}$ key featured associations. $3^{rd}$: (740) Complex Pyramid mapped the optimal solution and expands the mathematical Glyph equation by adding the (96) $3^{rd}$ key featured association.

i. The 'Cherry Picking' process uses the (1004) checkmate combination variables to find the final destination by using the inductive reasoning popularity score and the deductive reasoning actual content score.

j. The final destination and top (n) pages are sent to the end user's browser as output.

In practicing the invention, the following method may be used. While the invention has been described, disclosed, illustrated and shown in various terms or certain embodiments or modifications which it has assumed in practices, the scope of the invention is not intended to be, nor should it be deemed to be, limited thereby and such other modifications or embodiments as may be suggested by the teaching herein are particularly reserved as they fall within the breadth and scope here appended.

I claim as my invention a Search Engine method mimicking the human brain by adding knowledge, understanding and wisdom to simulate deductive reasoning to create a language based (left brain) equation and a geospatial based (right brain) equation to buffer between an Internet browser and a search engine to interpret numerical and text data and convert the interpreted data into statistical Glyphs objects representing the mathematical equation use to figure out the optimal partition of the Internet, and then finds and supplies missing gaps of information, dynamically valorizes, reorganizes, commercializes, measures end user's satisfaction, and then hierarchically prioritizes said Glyphs as a Search Pattern used to obtain an optimal match in response to an end user valid request, the method comprising the steps of:

I claim:

1. A method of executing a word search on a computer with a software program to buffer between an Internet browser and a search engine to interpret numerical and text data and convert the interpreted data into a search pattern, wherein software program establishes a search pattern database, via a server which a set of software instructions and upon finding a match sends the output in response to the end user valid request, the methods comprising the steps of:

a. assigning a unique value from lowest to highest to each site and web page;
   b. establishing a pattern database means with a collection of all hierarchical index relationships wherein pattern database executes software instructions employing set theory constructs to process the impact of each exact search pattern to create a probabilistic spatial environment and selecting as output the highest valued web pages;
   c. establishing a glyph database means with a collection of all keywords and clusters based on language; wherein glyph database executes software instructions to interpret numerical and text data and convert the interpreted data into an exact search pattern;
   d. executing a set of software instructions to search the pattern database in order to identify said exact search pattern, via a server which executes a set of software instructions and upon finding an match automatically sending the preprocessed calculated results to the end user's browser as output.

2. A method of executing a word search on a computer with a software program mimicking the human brain by adding knowledge, wisdom and understanding to simulate deductive reasoning to create a language based equation and a geospatial based equation to buffer between an Internet browser and a search engine to interpret numerical and text data and convert the interpreted data into statistical glyphs objects representing the mathematical equation used to determine an optimal partition of the Internet, and then employs a search strategy to find and supply missing gaps of information, and dynamically valorizes, reorganizes, commercializes and measures end user's satisfaction, and hierarchically prioritizes said statistical glyph objects as a search pattern used to obtain an optimal match in response to an end user valid request, the methods comprising the steps of:

a. assigning a probabilistic value from lowest to highest to each site and web page;
   b. establishing a pattern database means with a collection of all hierarchical index relationships wherein pattern database executes software instructions employing fuzzy set theory constructs to process the impact of each probable search pattern to create a probabilistic spatial environment;
   c. organizing the Internet into a hierarchical set, using the pattern database, executing informatics constructs to create super blocks based on language;
   d. wherein applying fuzzy set theory constructs to partition each super block into blocks using primary index relationships and each block into sub blocks using secondary index relationships and each sub block into mini blocks using tertiary index relationships; and probabilistically filtering relevant pages using index relationships;
   e. indexing an improved environment of each partition of said hierarchical set based on the probable value of each web page and then selecting as output the highest valued web pages;
   f. establishing a glyph database means with a collection of all keywords and clusters based on language; wherein glyph database executes software instructions to interactively interpret numerical and text data and convert the interpreted data into a probable search pattern;
   g. correlating a plurality of probabilistic spatial environments based on said probable search pattern, and executing a set of software instructions to search the pattern database in order to identify said probable search pattern, and upon finding a match, performing a cherry picking process by reading, parsing, and analyzing in behalf of the end user word by word each sentence and web page to create the best answer and then sending the preprocessed said best answer to the end user's browser as output.

3. A method of executing a word search on a computer with a software program mimicking the human brain by adding knowledge, wisdom and understanding to simulate deductive reasoning to create a language based equation and a geospatial based equation to buffer between an Internet browser and a search engine to interpret numerical and text data and convert the interpreted data into statistical glyphs objects representing the mathematical equation used to determine an optimal partition of the Internet, and then employs a search strategy to find and supply missing gaps of information, and dynamically valorizes, reorganizes, commercializes and measures end user's satisfaction, and hierarchically prioritizes said statistical glyph objects as a search pattern used to obtain an optimal match in response to an end user valid request, the methods comprising the steps of:

a. assigning a unique value from lowest to highest to each site and web page;
   b. establishing a pattern database means with a collection of all hierarchical index relationships wherein pattern database executes software instructions employing set theory constructs to process the impact of each valid search pattern to create a probabilistic spatial environment;
   c. organizing and distributing the Internet into a hierarchical set, using the pattern database, performing a set of software instructions to create a plurality of super blocks; and applying set theory constructs to partition each super block into blocks using primary index relationships; and each block into sub blocks using secondary index relationships; and each sub block into mini blocks using tertiary index relationships; and filtering relevant pages using index relationships;
   d. correlating at least one probabilistic spatial environment to map an improved environment;
   e. indexing each said improved environment of said hierarchical set based on the unique value of each web page and then selecting as output the highest valued web pages;
   f. establishing a glyph database means with a collection of all keywords and clusters; wherein glyph database executes software instructions using a search strategy to interpret numerical and text data and convert the interpreted data into a valid search pattern; and
   g. executing a set of software instructions to search the pattern database in order to identify said valid search pattern, and upon finding a match automatically sending the preprocessed calculated results to the end user's browser as output.

4. The method of claim 3, further comprising the step of scanning each request and determining based on the quality of the keyword combination whether at least one superset (i), secondary set (i, j), and tertiary subset (i, j, k) of the partitions exists in the pattern database, and thus having readily available and preprocessed the optimal response, requiring no further calculations, bypassing the usage of existing search engine capabilities.

5. A method of executing a word search on a computer with a software program mimicking the human brain by adding knowledge, understanding and wisdom to simulate deductive reasoning to create a language based equation and a geospatial based equation to buffer between an Internet browser and a search engine to interpret numerical and text data and convert the interpreted data into statistical glyphs objects representing the mathematical equation used to determine the optimal partition of the Internet, and then find and supply missing gaps of information, and which dynamically valorizes, reorganizes, commercializes, measures end user's satisfaction, and then hierarchically prioritizes said statistical glyphs objects as a search pattern used to obtain an optimal match in response to an end user valid request, the method comprising the steps of:

a. assigning a unique value from lowest to highest to each site and web page;
   b. organizing the Internet environment into quality partitions from lowest to highest establishing a glyph database means with a collection of all keywords and clusters;
   c. establishing a search pattern database means with a collection of all hierarchical index relationships;
   d. processing the impact of a managerial hierarchical related group of index relationships to create an equation that shrinks the size of the search environment by purifying the search process by using a primary, secondary and tertiary index relationships;
   e. correlating a plurality of spatial environments to map an improved probabilistic environment;
   f. distributing the Internet environment using human brain tendencies into a plurality of super blocks;
   g. restricting relevant pages within each super block using the primary index relationship into blocks;
   h. dividing each block using the secondary index relationship into sub blocks;
   i. subdividing each sub-block using the tertiary index relationship into mini blocks;
   j. dissecting each mini block into individual elements;
   j. assigning to each request a dominant tendency of the brain and anchor glyph that yields the destination;
   k. synergistically combining for each request the dominant tendency of the brain and the anchor glyph to select a search strategy that creates a managerial hierarchical set; and
   l. modifying each said request by identifying for each static and dynamic request the best suited search pattern within said search pattern database and automatically sending the preprocessed calculated results to the end of a user's browser as output.

6. The method of claim 5, comprising an additional step of identifying key words and clusters that confound and restrict the search as zero cluster glyphs.

7. The method of claim 6, comprising an additional step of assigning a vector magnitude to each statistical glyphs objects based on frequency of occurrence from lowest to highest.

8. The method of claim 7, comprising the additional step of defining a series of environment domains; and
   applying site quality filters to select the highest valued site and pages within each environment domain of the series of environment domains.

9. The method of claim 8, comprising an additional step of mapping each search pattern into a managerial hierarchical set.

10. The method of claim 9, comprising an additional step of permitting at least one significant request to belong to a session.

11. The method of claim 10, comprising an additional step of grouping static request glyph values into dynamic session glyph values.

12. The method of claim 11, comprising an additional step of maximizing and minimizing said dynamic session glyphs values based on end user usage patterns of behavior.

13. The method of claim 12, comprising an additional step of solving for missing gaps of information that improve the session.

14. The method of claim 5, comprising an additional step of modifying each search request by transforming each request into a vague search that maps, plots and probabilistically traces each page of the Internet into a super block using the search strategy to create a relevant environment that eliminates from calculation any web page that does not belong to the super block and then ranks and stores each web page of the super block from the lowest to the highest within the managerial hierarchical set.

15. The method of claim 14, comprising an additional steps of:
    modifying each search request by transforming each vague search into a concise search that maps, plots and probabilistically traces each page of said super block into a block using the primary index relationship to create an improved environment that eliminates from calculation any web page that does not belong to the block and then ranks and stores each web page of the block from lowest to highest within a superset;
    analyzing for each block a selected number of top links information to derive human knowledge by measuring the primary index relationship to find a first group of key featured associations and then solving for missing gaps of information to expand the glyph equation, which by default is the top links; and
    eliminating the primary index relationship from further filtering.

16. The method of claim 15, comprising additional steps of:
    modifying each search request by transforming each concise search into a precise search that maps, plots and probabilistically traces each page of the blocks into a sub block using the secondary index relationship to create an optimal environment that eliminates from calculation any web page that does not belong to the sub block and then ranks and stores each web page of the sub block from lowest to highest within a set;
    and performing human wisdom analysis by correlating the top paragraph reference sources of each index relationship of said sub block to find the second group of key featured associations to expand the glyph equation; and
    eliminating the secondary index relationship from further filtering.

17. The method of claim 16, comprising an additional steps of:
    modifying each search request by transforming each precise search into an optimal search that maps, plots and probabilistically traces each page of the sub block into a mini block using the tertiary index relationship to create an optimal solution that eliminates from calculation any web page that does not belong to the mini block and then ranks and stores each web page of the mini block from lowest to highest within a subset; and
        adding human understanding by analyzing each page within each partial environment based on trending of the mini blocks to find the third group of key featured associations to expand the glyph equation; and
    eliminating the tertiary index relationship from further filtering.

18. The method of claim 17, comprising an additional steps of:
    modifying the each search request by performing a cherry picking process by reading, parsing and analyzing on behalf of the end user word by word each sentence, paragraph and web page to create the best answer, of the mini block making exact comparison of the end user's typed glyphs and the key featured associations and the missing gaps of information obtained while changing the vague search into an optimal search; and
    assigning to each page a deductive reasoning content score based on trending that is added to the inductive reasoning popularity and commercial scores to derive the final value; and
    picking the highest final valued page as the best answer and then using the final value to sort the pages of the mini block in ascending order and send a selected top number of pages to the end user's browser as output; default ranking and sorting each page belonging to each partition of the Internet from highest to lowest.

19. The method of claim 18, comprising an additional steps of:
    storing each page belonging to each partition and then creating a partial master index that maps each data set.

20. The method of claim 19, comprising an additional step of combining a plurality of consecutive related requests into a dynamic request by altering each statistical glyphs object, page and site, into a super glyph, super page and super site, with multiple popularity and content score values based on trending.

21. The method of claim 20, comprising an additional step of instantiating new search patterns not found in the search pattern database by creating a managerial hierarchical data set to obtain answer and store the information in said search pattern database.

22. The method of claim 14, comprising additional steps of:
    distributing the Internet using human brain tendencies into a plurality of super blocks to create a relevant environment that eliminates from calculation any web page that does not belong to the super block and then ranks and stores each web page of super block from lowest to highest within said managerial hierarchical data set;
    each vague search creating a super block that maps a relevant environment with the lowest information certainty value;
    each super block becoming a join pyramid object that uses rules of semantics and English grammar and search strategy business rules to rank, probabilistically map and index each page belonging to the join pyramid into a managerial hierarchical set that is stored in the join pyramid partial master index.

23. The method of claim 22, comprising an additional step of restricting relevant pages within each super block into blocks using the primary index relationship to create an improved environment that eliminates from calculation any web page that does not belong to the block and then ranks and stores each web page of the block from lowest to highest within a superset, such that each concise search creates a block which maps an improved environment with the second information certainty value, and each block becomes a simple pyramid object by adding first key featured associations and filters the relevant environment using the primary index relationship and then ranks, probabilistically maps and indexes each page belonging to the simple pyramid into a superset data set that is stored in the simple pyramid partial master index.

24. The method of claim 23, comprising an additional step of dividing each block into sub blocks using the secondary index relationship to create an optimal environment that eliminates from calculation any web page that does not belong to the sub block and then ranks and stores each web page of the sub block from lowest to highest into a set, such that each precise search creates a sub block that maps an optimal environment with the third information certainty value, and such that each sub block becomes a hybrid pyramid object by adding second key featured associations and filters the improved environment using the secondary index relationship and then ranks, probabilistically maps and indexes each page belonging to the hybrid pyramid into the set data set that is stored in the hybrid pyramid partial master index.

25. The method of claim 24, comprising an additional step of subdividing each sub block into mini blocks using the tertiary index relationship into sub blocks to create an optimal environment that eliminates from calculation any web page that does not belong to the mini block and then ranks and stores each web page of the mini block from lowest to highest into a subset, such that each optimal search creates a mini block that maps an optimal solution with the fourth information certainty value and contains 100 web pages, and such that each mini block becomes a complex pyramid object by adding third key featured associations and filters the optimal environment using the tertiary index relationship and then ranks, probabilistically maps and indexes each page belonging to the complex pyramid into the subset data set that is stored in the complex pyramid partial master index.

26. The method of claim 25, comprising an additional step of performing the cherry picking process by reading, parsing and analyzing on behalf of an end user word by word each sentence and web page of the mini block making exact comparison of the end user typed glyphs and the key featured associations and the missing gaps of information obtained while changing the vague search into an optimal search, such that each answer search creates an element that maps the final destination and has the highest information certainty value;

such that each element becomes an optimal pyramid and selects the top web pages of the optimal solution by assigning to each page a deductive reasoning content score that is added to the inductive reasoning popularity and commercial scores to derive the final value and then selects the highest final valued page as the best answer and the remaining web pages in ascending order and sends the top pages to the end user browser as output which by default is 10.

27. The method of claim 5, comprising an additional step of using valid super glyph parameters to identify a valid vague search within the search pattern database in order to expand the glyph equation.

28. The method of claim 27, comprising an additional step of using valid super glyph parameters to identify a valid concise search within the search pattern database in order to expand the glyph equation.

29. The method of claim 28, comprising an additional step of using the valid super glyph parameters to identify a valid precise search within the search pattern database in order to expand the glyph equation.

30. The method of claim 29, comprising an additional step of using valid super glyph parameters to identify a valid optimal search within the search pattern database in order to expand the glyph equation.

31. The method of claim 30, comprising an additional step of using valid super glyph parameters to identify an answer search within the search pattern database and then sending the preprocessed top pages as output.

32. The method of claim 31, comprising an additional step of updating existing search patterns at incipiency as web crawlers detect significant difference changes in the environment and the updating with the latest information each managerial hierarchical set and the corresponding partial master indices of the chain of command in real time.

* * * * *